US009894372B2

United States Patent
Puri et al.

(10) Patent No.: US 9,894,372 B2
(45) Date of Patent: Feb. 13, 2018

(54) CONTENT ADAPTIVE SUPER RESOLUTION PREDICTION GENERATION FOR NEXT GENERATION VIDEO CODING

(71) Applicant: INTEL CORPORATION, Santa Clara, CA (US)

(72) Inventors: Atul Puri, Redmond, WA (US); Neelesh N. Gokhale, Seattle, WA (US)

(73) Assignee: Intel Corporation, Santa Clara, CA (US)

(*) Notice: Subject to any disclaimer, the term of this patent is extended or adjusted under 35 U.S.C. 154(b) by 586 days.

(21) Appl. No.: 14/333,938

(22) Filed: Jul. 17, 2014

(65) Prior Publication Data
US 2014/0328400 A1    Nov. 6, 2014

Related U.S. Application Data

(63) Continuation-in-part of application No. PCT/US2013/078114, filed on Dec. 27, 2013, which
(Continued)

(51) Int. Cl.
| | |
|---|---|
| H04N 19/51 | (2014.01) |
| H04N 19/593 | (2014.01) |
| H04N 19/44 | (2014.01) |
| H04N 19/503 | (2014.01) |
| H04N 19/176 | (2014.01) |
| H04N 19/119 | (2014.01) |
| H04N 19/147 | (2014.01) |

(Continued)

(52) U.S. Cl.
CPC ........... *H04N 19/44* (2014.11); *H04N 19/105* (2014.11); *H04N 19/119* (2014.11); *H04N 19/12* (2014.11); *H04N 19/122* (2014.11); *H04N 19/136* (2014.11); *H04N 19/139* (2014.11); *H04N 19/147* (2014.11); *H04N 19/172* (2014.11); *H04N 19/176* (2014.11); *H04N 19/46* (2014.11); *H04N 19/513* (2014.11); *H04N 19/527* (2014.11); *H04N 19/573* (2014.11); *H04N 19/61* (2014.11); *H04N 19/82* (2014.11); *H04N 19/85* (2014.11); *H04N 19/91* (2014.11)

(58) Field of Classification Search
None
See application file for complete search history.

(56) References Cited

U.S. PATENT DOCUMENTS

| | | | | |
|---|---|---|---|---|
| 5,731,840 A * | 3/1998 | Kikuchi | ................. | H04N 7/52 375/240.02 |
| 2006/0227863 A1* | 10/2006 | Adams | ................. | H04N 19/176 375/240.01 |

(Continued)

FOREIGN PATENT DOCUMENTS

| | | |
|---|---|---|
| WO | 2011050998 A1 | 5/2011 |
| WO | 2011158225 A1 | 12/2011 |

OTHER PUBLICATIONS

European Search Report for EP13075091, dated Jun. 8, 2016, 11 pages.

(Continued)

*Primary Examiner* — Christopher S Kelley
*Assistant Examiner* — Kaitlin A Retallick
(74) *Attorney, Agent, or Firm* — Jordan IP Law, LLC

(57) ABSTRACT

Techniques related to super resolution prediction generation for video coding are described.

24 Claims, 23 Drawing Sheets

Related U.S. Application Data is a continuation-in-part of application No. PCT/US2013/069960, filed on Nov. 13, 2013.

(60) Provisional application No. 61/758,314, filed on Jan. 30, 2013, provisional application No. 61/725,576, filed on Nov. 13, 2012.

(51) Int. Cl.

| | | |
|---|---|---|
| *H04N 19/46* | (2014.01) | |
| *H04N 19/122* | (2014.01) | |
| *H04N 19/136* | (2014.01) | |
| *H04N 19/85* | (2014.01) | |
| *H04N 19/82* | (2014.01) | |
| *H04N 19/12* | (2014.01) | |
| *H04N 19/172* | (2014.01) | |
| *H04N 19/513* | (2014.01) | |
| *H04N 19/61* | (2014.01) | |
| *H04N 19/91* | (2014.01) | |
| *H04N 19/573* | (2014.01) | |
| *H04N 19/105* | (2014.01) | |
| *H04N 19/139* | (2014.01) | |
| *H04N 19/527* | (2014.01) | |

(56) References Cited

U.S. PATENT DOCUMENTS

| | | | |
|---|---|---|---|
| 2008/0056356 A1* | 3/2008 | Wang | H04N 19/105 375/240.12 |
| 2011/0170792 A1* | 7/2011 | Tourapis | H04N 13/004 382/236 |
| 2011/0254921 A1* | 10/2011 | Pahalawatta | H04N 13/0029 348/43 |
| 2011/0274368 A1* | 11/2011 | Kondo | G06T 3/4053 382/264 |
| 2012/0195376 A1 | 8/2012 | Wu et al. | |

OTHER PUBLICATIONS

Office Action for European Patent Application No. 13075091.2, dated Jun. 9, 2017, 4 pages.

* cited by examiner

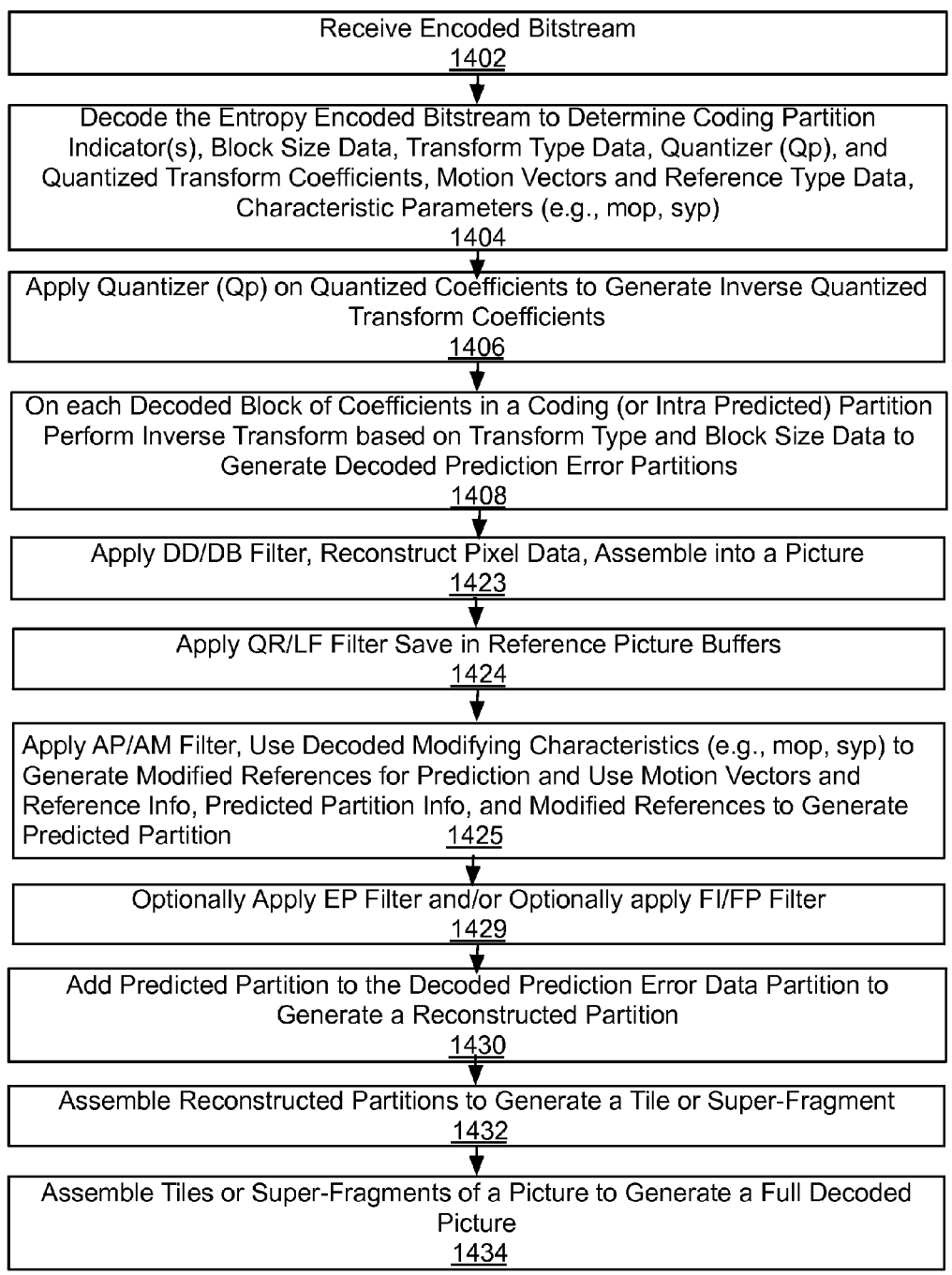

2000
GENERATE, VIA A SYNTHESIZING ANALYZER AND SYNTHESIZED
PICTURE GENERATION AND BUFFER MODULE, A PLURALITY OF
SUPER RESOLUTION BASED REFERENCE PICTURES
2002
GENERATE MOTION DATA ASSOCIATED WITH A PREDICTION
PARTITION OF A CURRENT PICTURE
2004
PERFORM MOTION COMPENSATION
2006
FIG. 20

2100

Motion compensate a previously generated super resolution frame to generate a motion compensated super resolution reference frame
2102

Upsample a currently decoded frame to generate an upsampled super resolution reference frame
2104

Blend the motion compensated super resolution reference frame and the upsampled super resolution reference frame to generate a current super resolution frame
2106

De-interleave the current super resolution frame to provide a plurality of super resolution based reference pictures for motion estimation of a next frame
2108

Store the plurality of super resolution based reference pictures
2110

FIG. 21

CONTENT ADAPTIVE SUPER RESOLUTION PREDICTION GENERATION FOR NEXT GENERATION VIDEO CODING

RELATED APPLICATIONS

The present application is a continuation-in-part of international application no. PCT/US2013/078114, filed 27 Dec. 2013, which in turn claims the benefit of U.S. Provisional Application No. 61/758,314 filed 30 Jan. 2013; the present application also is a continuation-in-part of PCT/US13/69905 filed 13 Nov. 2013, which in turn claims the benefit of U.S. Provisional Application No. 61/725,576 filed 13 Nov. 2012 as well as U.S. Provisional Application No. 61/758,314 filed 30 Jan. 2013; the contents of which are expressly incorporated herein in their entirety.

BACKGROUND

A video encoder compresses video information so that more information can be sent over a given bandwidth. The compressed signal may then be transmitted to a receiver having a decoder that decodes or decompresses the signal prior to display.

High Efficient Video Coding (HEVC) is the latest video compression standard, which is being developed by the Joint Collaborative Team on Video Coding (JCT-VC) formed by ISO/IEC Moving Picture Experts Group (MPEG) and ITU-T Video Coding Experts Group (VCEG). HEVC is being developed in response to the previous H.264/AVC (Advanced Video Coding) standard not providing enough compression for evolving higher resolution video applications. Similar to previous video coding standards, HEVC includes basic functional modules such as intra/inter prediction, transform, quantization, in-loop filtering, and entropy coding.

The ongoing HEVC standard may attempt to improve on limitations of the H.264/AVC standard such as limited choices for allowed prediction partitions and coding partitions, limited allowed multiple references and prediction generation, limited transform block sizes and actual transforms, limited mechanisms for reducing coding artifacts, and inefficient entropy encoding techniques. However, the ongoing HEVC standard may use iterative approaches to solving such problems.

For instance, with ever increasing resolution of video to be compressed and expectation of high video quality, the corresponding bitrate/bandwidth required for coding using existing video coding standards such as H.264 or even evolving standards such as H.265/HEVC, is relatively high. The aforementioned standards use expanded forms of traditional approaches to implicitly address the insufficient compression/quality problem, but often the results are limited.

The present description, developed within the context of a Next Generation Video (NGV) codec project, addresses the general problem of designing an advanced video codec that maximizes the achievable compression efficiency while remaining sufficiently practical for implementation on devices. For instance, with ever increasing resolution of video and expectation of high video quality due to availability of good displays, the corresponding bitrate/bandwidth required using existing video coding standards such as earlier MPEG standards and even the more recent H.264/AVC standard, is relatively high. H.264/AVC was not perceived to be providing high enough compression for evolving higher resolution video applications.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 13 illustrates an example bitstream;

FIG. 14 is a flow diagram illustrating an example decoding process;

FIG. 20 is a flow diagram illustrating an example encoding process; and

FIG. 21 is a flow diagram illustrating an example decoding process, all arranged in accordance with at least some implementations of the present disclosure.

DETAILED DESCRIPTION

Figure 1:
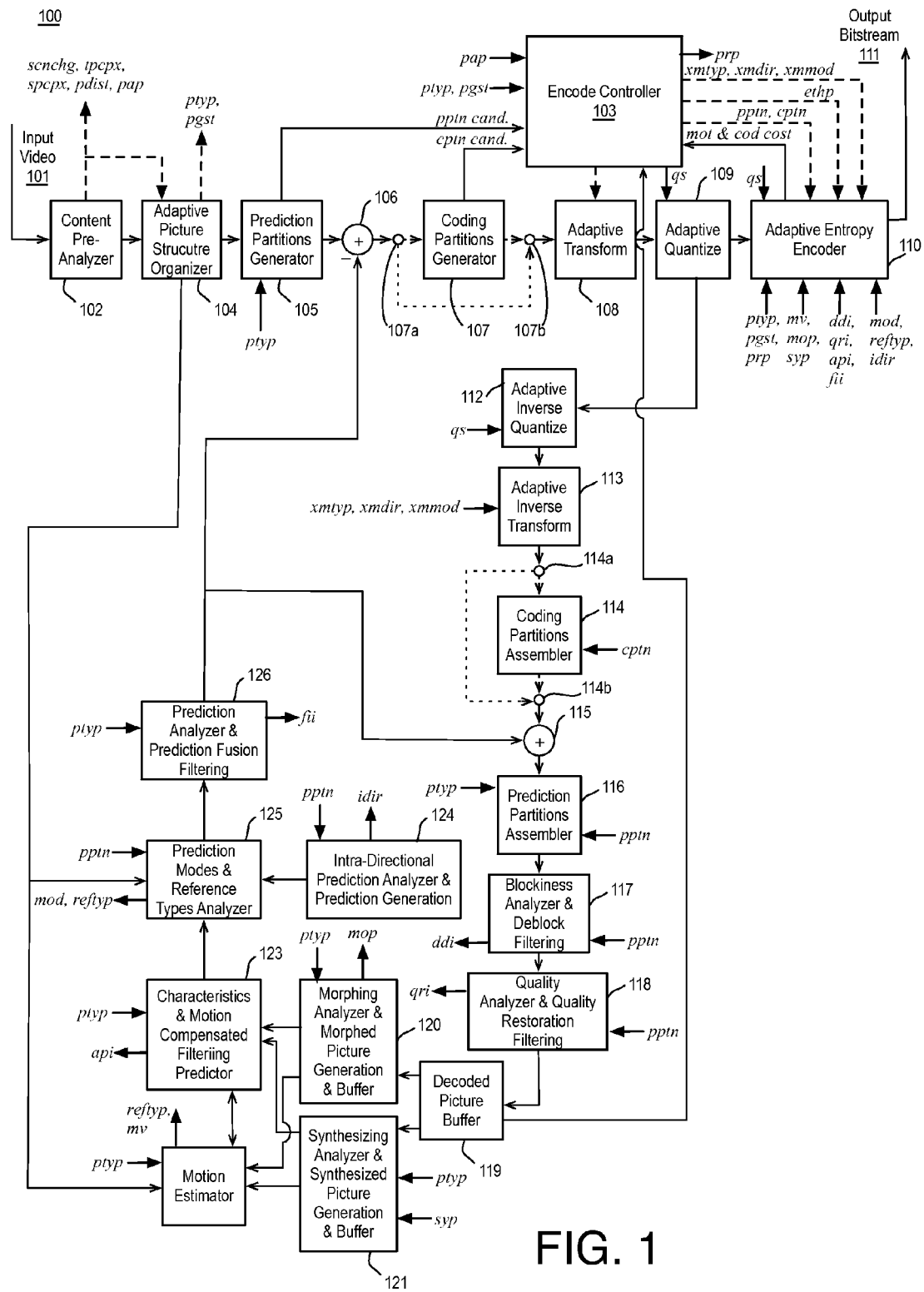
FIG. 1 is an illustrative diagram of an example next generation video encoder.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.); and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to super resolution prediction generation for video coding.

As discussed above, the H.264/AVC coding standard while it represents improvement over past MPEG standards, it is still very limiting in choices of prediction due to the following reasons: the choices for allowed prediction partitions are very limited; the accuracy of prediction for prediction partitions is limited; and the allowed multiple references predictions are very limited as they are discrete based on past decoded frames rather than accumulation of resolution over many frames. The aforementioned limitations of the state of the art standards such as H.264 are recognized by the ongoing work in HEVC that uses an iterative approach to fixing these limitations.

Further, the problem of improved prediction is currently being solved in an ad hoc manner by using decoded multiple references in the past and/or future for motion compensated prediction in interframe coding of video. This is done with the hope that in the past or future frames, there might be some more similar areas to the area of current frame being predicted than in the past frame (for P-pictures/slices), or in the past and future frames (for B-pictures/slices).

As will be described in greater detail below, some forms of prediction, such as the Super Resolution Prediction procedures of this disclosure, may not be supportable by existing standards. The present disclosure was developed within the context of Next Generation Video (NGV) codec project to addresses the problem of designing a new video coding scheme that maximizes compression efficiency while remaining practical for implementation on devices. Specifically, we introduce a new type of prediction called Super Resolution prediction that integrates resolution from multiple frames (providing improved prediction which in turn reduces prediction error) improving the overall video coding efficiency.

More specifically, techniques described herein may differ from standards based approaches as it naturally incorporates significant content based adaptivity in video coding process to achieve higher compression. By comparison, standards based video coding approaches typically tend to squeeze higher gains by adaptations and fine tuning of legacy approaches. For instance, all standards based approaches heavily rely on adapting and further tweaking of motion compensated interframe coding as the primary means to reduce prediction differences to achieve gains. On the other hand, some video coding implementations disclosed herein, in addition to exploiting interframe differences due to motion, also exploits other types of interframe differences (gain, blur, registration) that naturally exist in typical video scenes, as well as prediction benefits of frames synthesized from past decoded frames only or a combination of past and future decoded frames. In some video coding implementations disclosed herein, the synthesized frames used for prediction include Dominant Motion Compensated (DMC) frames, Super Resolution (SR) frames, and PI (Projected Interpolation) frames. Besides the issue of exploiting other sources of interframe differences besides motion, some video coding implementations disclosed herein differ from standards in other ways as well.

Overall the SR systems described by this disclosure may make good tradeoffs between gains achievable and complexity as compared to existing theoretical SR approaches published in the literature, and simple direct multiple reference prediction approach used by other standards.

As used herein, the term "coder" may refer to an encoder and/or a decoder. Similarly, as used herein, the term "coding" may refer to performing video encoding via an encoder and/or performing video decoding via a decoder. For example, a video encoder and video decoder may both be examples of coders capable of coding video data. In addition, as used herein, the term "codec" may refer to any process, program or set of operations, such as, for example, any combination of software, firmware, and/or hardware that may implement an encoder and/or a decoder. Further, as used herein, the phrase "video data" may refer to any type of data associated with video coding such as, for example, video frames, image data, encoded bit stream data, or the like.

FIG. 1 is an illustrative diagram of an example next generation video encoder 100, arranged in accordance with at least some implementations of the present disclosure. As shown, encoder 100 may receive input video 101. Input video 101 may include any suitable input video for encoding such as, for example, input frames of a video sequence. As shown, input video 101 may be received via a content pre-analyzer module 102. Content pre-analyzer module 102 may be configured to perform analysis of the content of video frames of input video 101 to determine various types of parameters for improving video coding efficiency and speed performance. For example, content pre-analyzer module 102 may determine horizontal and vertical gradient information (e.g., Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation, or the like. The parameters generated by content pre-analyzer module 102 may be used by encoder 100 (e.g., via encode controller 103) and/or quantized and communicated to a decoder. As shown, video frames and/or other data may be transmitted from content pre-analyzer module 102 to adaptive picture organizer module 104, which may determine the picture type (e.g., I-, P-, or F/B-picture) of each video frame and reorder the video frames as needed. In some examples, adaptive picture organizer module 104 may include a frame portion generator configured to generate frame portions. In some examples, content pre-analyzer module 102 and adaptive picture organizer module 104 may together be considered a pre-analyzer subsystem of encoder 100.

As shown, video frames and/or other data may be transmitted from adaptive picture organizer module 104 to prediction partitions generator module 105. In some examples, prediction partitions generator module 105 may divide a frame or picture into tiles or super-fragments or the like. In some examples, an additional module (e.g., between modules 104 and 105) may be provided for dividing a frame or picture into tiles or super-fragments. Prediction partitions generator module 105 may divide each tile or super-fragment into potential prediction partitionings or partitions. In some examples, the potential prediction partitionings may be determined using a partitioning technique such as, for example, a k-d tree partitioning technique, a bi-tree partitioning technique, or the like, which may be determined based on the picture type (e.g., I-, P-, or F/B-picture) of individual video frames, a characteristic of the frame portion being partitioned, or the like. In some examples, the determined potential prediction partitionings may be partitions for prediction (e.g., inter- or intra-prediction) and may be described as prediction partitions or prediction blocks or the like.

In some examples, a selected prediction partitioning (e.g., prediction partitions) may be determined from the potential prediction partitionings. For example, the selected prediction partitioning may be based on determining, for each potential prediction partitioning, predictions using characteristics and motion based multi-reference predictions or intra-predictions, and determining prediction parameters. For each potential prediction partitioning, a potential prediction error may be determined by differencing original pixels with prediction pixels and the selected prediction partitioning may be the potential prediction partitioning with the minimum prediction error. In other examples, the selected prediction partitioning may be determined based on a rate distortion optimization including a weighted scoring based on number of bits for coding the partitioning and a prediction error associated with the prediction partitioning.

As shown, the original pixels of the selected prediction partitioning (e.g., prediction partitions of a current frame) may be differenced with predicted partitions (e.g., a prediction of the prediction partition of the current frame based on a reference frame or frames and other predictive data such as inter- or intra-prediction data) at differencer 106. The determination of the predicted partitions will be described further below and may include a decode loop as shown in FIG. 1. Any residuals or residual data (e.g., partition prediction error data) from the differencing may be transmitted to coding partitions generator module 107. In some examples, such as for intra-prediction of prediction partitions in any picture type (I-, F/B- or P-pictures), coding partitions generator module 107 may be bypassed via switches 107a and 107b. In such examples, only a single level of partitioning may be performed. Such partitioning may be described as prediction partitioning (as discussed) or coding partitioning or both. In various examples, such partitioning may be performed via prediction partitions generator module 105 (as discussed) or, as is discussed further herein, such partitioning may be performed via a k-d tree intra-prediction/coding partitioner module or a bi-tree intra-prediction/coding partitioner module implemented via coding partitions generator module 107.

In some examples, the partition prediction error data, if any, may not be significant enough to warrant encoding. In other examples, where it may be desirable to encode the partition prediction error data and the partition prediction error data is associated with inter-prediction or the like, coding partitions generator module 107 may determine coding partitions of the prediction partitions. In some examples, coding partitions generator module 107 may not be needed as the partition may be encoded without coding partitioning (e.g., as shown via the bypass path available via switches 107a and 107b). With or without coding partitioning, the partition prediction error data (which may subsequently be described as coding partitions in either event) may be transmitted to adaptive transform module 108 in the event the residuals or residual data require encoding. In some examples, prediction partitions generator module 105 and coding partitions generator module 107 may together be considered a partitioner subsystem of encoder 100. In various examples, coding partitions generator module 107 may operate on partition prediction error data, original pixel data, residual data, or wavelet data.

Coding partitions generator module 107 may generate potential coding partitionings (e.g., coding partitions) of, for example, partition prediction error data using bi-tree and/or k-d tree partitioning techniques or the like. In some examples, the potential coding partitions may be transformed using adaptive or fixed transforms with various block sizes via adaptive transform module 108 and a selected coding partitioning and selected transforms (e.g., adaptive or fixed) may be determined based on a rate distortion optimization or other basis. In some examples, the selected coding partitioning and/or the selected transform(s) may be determined based on a predetermined selection method based on coding partitions size or the like.

For example, adaptive transform module 108 may include a first portion or component for performing a parametric transform to allow locally optimal transform coding of small to medium size blocks and a second portion or component for performing globally stable, low overhead transform coding using a fixed transform, such as a discrete cosine transform (DCT) or a picture based transform from a variety of transforms, including parametric transforms, or any other configuration as is discussed further herein. In some examples, for locally optimal transform coding a Parametric Haar Transform (PHT) may be performed, as is discussed further herein. In some examples, transforms may be performed on 2D blocks of rectangular sizes between about 4×4 pixels and 64×64 pixels, with actual sizes depending on a number of factors such as whether the transformed data is luma or chroma, or inter or intra, or if the determined transform used is PHT or DCT or the like.

As shown, the resultant transform coefficients may be transmitted to adaptive quantize module 109. Adaptive quantize module 109 may quantize the resultant transform coefficients. Further, any data associated with a parametric transform, as needed, may be transmitted to either adaptive quantize module 109 (if quantization is desired) or adaptive entropy encoder module 110. Also as shown in FIG. 1, the quantized coefficients may be scanned and transmitted to adaptive entropy encoder module 110. Adaptive entropy encoder module 110 may entropy encode the quantized coefficients and include them in output bitstream 111. In some examples, adaptive transform module 108 and adaptive quantize module 109 may together be considered a transform encoder subsystem of encoder 100.

As also shown in FIG. 1, encoder 100 includes a local decode loop. The local decode loop may begin at adaptive inverse quantize module 112. Adaptive inverse quantize module 112 may be configured to perform the opposite operation(s) of adaptive quantize module 109 such that an inverse scan may be performed and quantized coefficients may be de-scaled to determine transform coefficients. Such an adaptive quantize operation may be lossy, for example. As shown, the transform coefficients may be transmitted to an adaptive inverse transform module 113. Adaptive inverse transform module 113 may perform the inverse transform as that performed by adaptive transform module 108, for example, to generate residuals or residual values or partition prediction error data (or original data or wavelet data, as discussed) associated with coding partitions. In some examples, adaptive inverse quantize module 112 and adaptive inverse transform module 113 may together be considered a transform decoder subsystem of encoder 100.

As shown, the partition prediction error data (or the like) may be transmitted to optional coding partitions assembler 114. Coding partitions assembler 114 may assemble coding partitions into decoded prediction partitions as needed (as shown, in some examples, coding partitions assembler 114 may be skipped via switches 114a and 114b such that decoded prediction partitions may have been generated at adaptive inverse transform module 113) to generate prediction partitions of prediction error data or decoded residual prediction partitions or the like.

As shown, the decoded residual prediction partitions may be added to predicted partitions (e.g., prediction pixel data) at adder 115 to generate reconstructed prediction partitions. The reconstructed prediction partitions may be transmitted to prediction partitions assembler 116. Prediction partitions assembler 116 may assemble the reconstructed prediction partitions to generate reconstructed tiles or super-fragments. In some examples, coding partitions assembler module 114 and prediction partitions assembler module 116 may together be considered an un-partitioner subsystem of encoder 100.

The reconstructed tiles or super-fragments may be transmitted to blockiness analyzer and deblock filtering module 117. Blockiness analyzer and deblock filtering module 117 may deblock and dither the reconstructed tiles or super-fragments (or prediction partitions of tiles or super-fragments). The generated deblock and dither filter parameters may be used for the current filter operation and/or coded in output bitstream 111 for use by a decoder, for example. The output of blockiness analyzer and deblock filtering module 117 may be transmitted to a quality analyzer and quality restoration filtering module 118. Quality analyzer and quality restoration filtering module 118 may determine QR filtering parameters (e.g., for a QR decomposition) and use the determined parameters for filtering. The QR filtering parameters may also be coded in output bitstream 111 for use by a decoder. As shown, the output of quality analyzer and quality restoration filtering module 118 may be transmitted to decoded picture buffer 119. In some examples, the output of quality analyzer and quality restoration filtering module 118 may be a final reconstructed frame that may be used for prediction for coding other frames (e.g., the final reconstructed frame may be a reference frame or the like). In some examples, blockiness analyzer and deblock filtering module 117 and quality analyzer and quality restoration filtering module 118 may together be considered a filtering subsystem of encoder 100.

In encoder 100, prediction operations may include inter- and/or intra-prediction. As shown in FIG. 1(a), inter-prediction may be performed by one or more modules including morphing analyzer and morphed picture generation module 120, synthesizing analyzer and generation module 121, and characteristics and motion filtering predictor module 123. Morphing analyzer and morphed picture generation module 120 may analyze a current picture to determine parameters for changes in gain, changes in dominant motion, changes in registration, and changes in blur with respect to a reference frame or frames with which it may be coded. The determined morphing parameters may be quantized/de-quantized and used (e.g., by morphing analyzer and morphed picture generation module 120) to generate morphed reference frames that that may be used by motion estimator module 122 for computing motion vectors for efficient motion (and characteristics) compensated prediction of a current frame. Synthesizing analyzer and generation module 121 may generate super resolution (SR) pictures and projected interpolation (PI) pictures or the like for motion for determining motion vectors for efficient motion compensated prediction in these frames.

Motion estimator module 122 may generate motion vector data based on morphed reference frame(s) and/or super resolution (SR) pictures and projected interpolation (PI) pictures along with the current frame. In some examples, motion estimator module 122 may be considered an inter-prediction module. For example, the motion vector data may be used for inter-prediction. If inter-prediction is applied, characteristics and motion compensated filtering predictor module 123 may apply motion compensation as part of the local decode loop as discussed.

Intra-prediction may be performed by intra-directional prediction analyzer and prediction generation module 124. Intra-directional prediction analyzer and prediction generation module 124 may be configured to perform spatial directional prediction and may use decoded neighboring partitions. In some examples, both the determination of direction and generation of prediction may be performed by intra-directional prediction analyzer and prediction generation module 124. In some examples, intra-directional prediction analyzer and prediction generation module 124 may be considered an intra-prediction module.

As shown in FIG. 1, prediction modes and reference types analyzer module 125 may allow for selection of prediction modes from among, "skip", "auto", "inter", "split", "multi", and "intra", for each prediction partition of a tile (or superfragment), all of which may apply to P- and F/B-pictures. In addition to prediction modes, it also allows for selection of reference types that can be different depending on "inter" or "multi" mode, as well as for P- and F/B-pictures. The prediction signal at the output of prediction modes and reference types analyzer module 125 may be filtered by prediction analyzer and prediction fusion filtering module 126. Prediction analyzer and prediction fusion filtering module 126 may determine parameters (e.g., filtering coefficients, frequency, overhead) to use for filtering and may perform the filtering. In some examples, filtering the prediction signal may fuse different types of signals representing different modes (e.g., intra, inter, multi, split, skip, and auto). In some examples, intra-prediction signals may be different than all other types of inter-prediction signal(s) such that proper filtering may greatly enhance coding efficiency. In some examples, the filtering parameters may be encoded in output bitstream 111 for use by a decoder. The filtered prediction signal may provide the second input (e.g., prediction partition(s)) to differencer 106, as discussed above, that may determine the prediction difference signal (e.g., partition prediction error) for coding discussed earlier. Further, the same filtered prediction signal may provide the second input to adder 115, also as discussed above. As discussed, output bitstream 111 may provide an efficiently encoded bitstream for use by a decoder for the presentment of video.

FIG. 1 illustrates example control signals associated with operation of video encoder 100, where the following abbreviations may represent the associated information:
  scnchg Scene change information
  spcpx Spatial complexity information
  tpcpx Temporal complexity information
  pdist Temporal prediction distance information
  pap Pre Analysis parameters (placeholder for all other pre analysis parameters except scnchg, spcpx, tpcpx, pdist)
  ptyp Picture types information
  pgst Picture group structure information
  pptn cand. Prediction partitioning candidates
  cptn cand. Coding Partitioning Candidates
  prp Preprocessing
  xmtyp Transform type information
  xmdir Transform direction information
  xmmod Transform mode
  ethp One eighth (⅛th) pel motion prediction
  pptn Prediction Partitioning
  cptn Coding Partitioning
  mot&cod cost Motion and Coding Cost
  qs quantizer information set (includes Quantizer parameter (Qp), Quantizer matrix (QM) choice)
  mv Motion vectors
  mop Morphing Parameters
  syp Synthesizing Parameters
  ddi Deblock and dither information
  qri Quality Restoration filtering index/information
  api Adaptive Precision filtering index/information
  flu Fusion Filtering index/information
  mod Mode information
  reftyp Reference type information
  idir Intra Prediction Direction The various signals and data items that may need to be sent to the decoder, e.g., pgst, ptyp, prp, pptn, cptn, modes, reftype, ethp, xmtyp, xmdir, xmmod, idir, my, qs, mop, syp, ddi, qri, api, fii, quant coefficients and others may then be entropy encoded by adaptive entropy encoder 110 that may include different entropy coders collectively referred to as an entropy encoder subsystem. While these control signals are illustrated as being associated with specific example functional modules of encoder 100 in FIG. 1, other implementations may include a different distribution of control signals among the functional modules of encoder 300. The present disclosure is not limited in this regard and, in various examples, implementation of the control signals herein may include the undertaking of only a subset of the specific example control signals shown, additional control signals, and/or in a different arrangement than illustrated.

Figure 2:
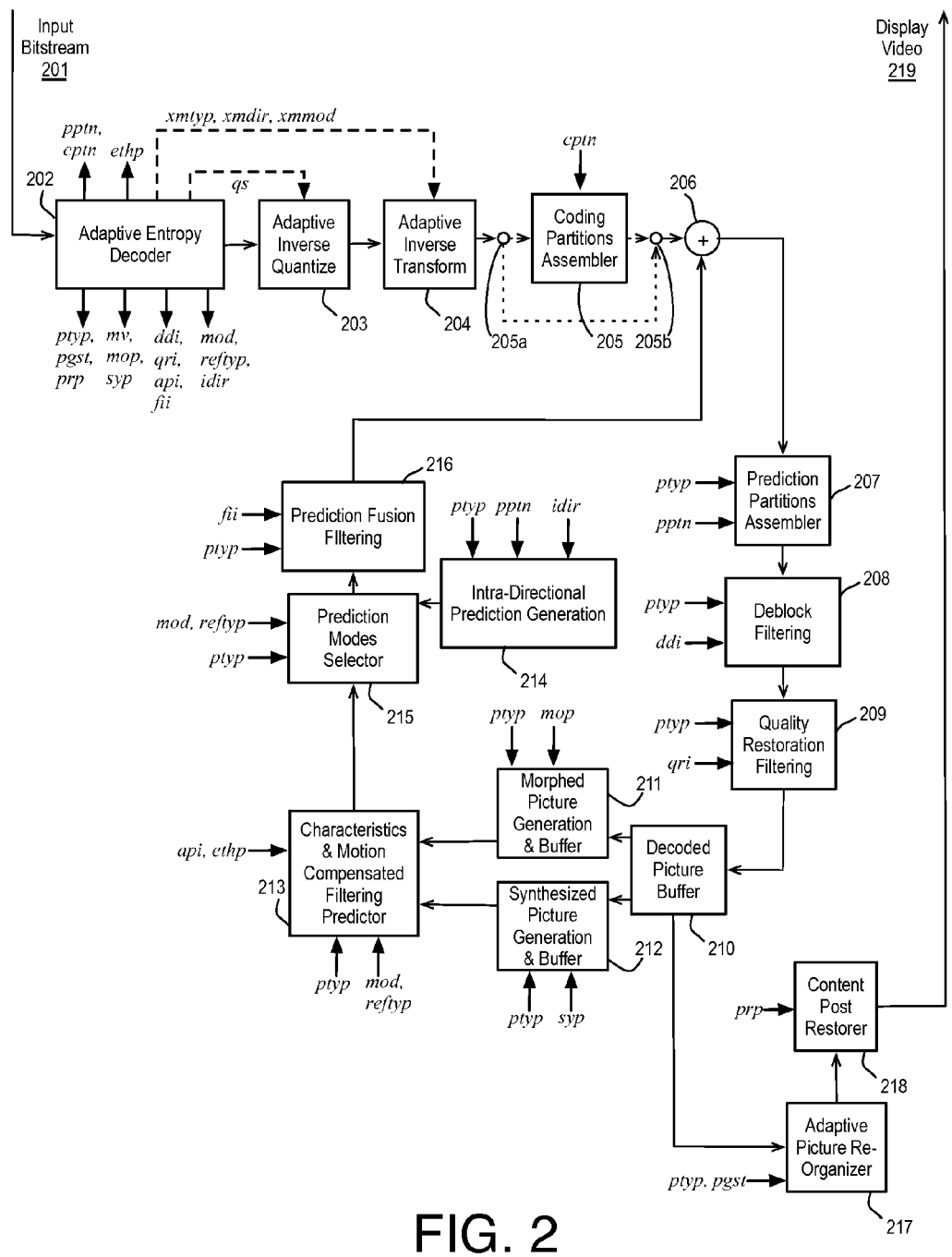
FIG. 2 is an illustrative diagram of an example next generation video decoder.

FIG. 2 is an illustrative diagram of an example next generation video decoder 200, arranged in accordance with at least some implementations of the present disclosure. As shown, decoder 200 may receive an input bitstream 201. In some examples, input bitstream 201 may be encoded via encoder 100 and/or via the encoding techniques discussed herein. As shown, input bitstream 201 may be received by an adaptive entropy decoder module 202. Adaptive entropy decoder module 202 may decode the various types of encoded data (e.g., overhead, motion vectors, transform coefficients, etc.). In some examples, adaptive entropy decoder 202 may use a variable length decoding technique. In some examples, adaptive entropy decoder 202 may perform the inverse operation(s) of adaptive entropy encoder module 110 discussed above.

The decoded data may be transmitted to adaptive inverse quantize module 203. Adaptive inverse quantize module 203 may be configured to inverse scan and de-scale quantized coefficients to determine transform coefficients. Such an adaptive quantize operation may be lossy, for example. In some examples, adaptive inverse quantize module 203 may be configured to perform the opposite operation of adaptive quantize module 109 (e.g., substantially the same operations as adaptive inverse quantize module 112). As shown, the transform coefficients (and, in some examples, transform data for use in a parametric transform) may be transmitted to an adaptive inverse transform module 204. Adaptive inverse transform module 204 may perform an inverse transform on the transform coefficients to generate residuals or residual values or partition prediction error data (or original data or wavelet data) associated with coding partitions. In some examples, adaptive inverse transform module 204 may be configured to perform the opposite operation of adaptive transform module 108 (e.g., substantially the same operations as adaptive inverse transform module 113). In some examples, adaptive inverse transform module 204 may perform an inverse transform based on other previously decoded data, such as, for example, decoded neighboring partitions. In some examples, adaptive inverse quantize module 203 and adaptive inverse transform module 204 may together be considered a transform decoder subsystem of decoder 200.

As shown, the residuals or residual values or partition prediction error data may be transmitted to coding partitions assembler 205. Coding partitions assembler 205 may assemble coding partitions into decoded prediction partitions as needed (as shown, in some examples, coding partitions assembler 205 may be skipped via switches 205a and 205b such that decoded prediction partitions may have been generated at adaptive inverse transform module 204). The decoded prediction partitions of prediction error data (e.g., prediction partition residuals) may be added to predicted partitions (e.g., prediction pixel data) at adder 206 to generate reconstructed prediction partitions. The reconstructed prediction partitions may be transmitted to prediction partitions assembler 207. Prediction partitions assembler 207 may assemble the reconstructed prediction partitions to generate reconstructed tiles or super-fragments. In some examples, coding partitions assembler module 205 and prediction partitions assembler module 207 may together be considered an un-partitioner subsystem of decoder 200.

The reconstructed tiles or super-fragments may be transmitted to deblock filtering module 208. Deblock filtering module 208 may deblock and dither the reconstructed tiles or super-fragments (or prediction partitions of tiles or super-fragments). The generated deblock and dither filter parameters may be determined from input bitstream 201, for example. The output of deblock filtering module 208 may be transmitted to a quality restoration filtering module 209. Quality restoration filtering module 209 may apply quality filtering based on QR parameters, which may be determined from input bitstream 201, for example. As shown in FIG. 2, the output of quality restoration filtering module 209 may be transmitted to decoded picture buffer 210. In some examples, the output of quality restoration filtering module 209 may be a final reconstructed frame that may be used for prediction for coding other frames (e.g., the final reconstructed frame may be a reference frame or the like). In some examples, deblock filtering module 208 and quality restoration filtering module 209 may together be considered a filtering subsystem of decoder 200.

As discussed, compensation due to prediction operations may include inter- and/or intra-prediction compensation. As shown, inter-prediction compensation may be performed by one or more modules including morphing generation module 211, synthesizing generation module 212, and characteristics and motion compensated filtering predictor module 213. Morphing generation module 211 may use de-quantized morphing parameters (e.g., determined from input bitstream 201) to generate morphed reference frames. Synthesizing generation module 212 may generate super resolution (SR) pictures and projected interpolation (PI) pictures or the like based on parameters determined from input bitstream 201. If inter-prediction is applied, characteristics and motion compensated filtering predictor module 213 may apply motion compensation based on the received frames and motion vector data or the like in input bitstream 201.

Intra-prediction compensation may be performed by intra-directional prediction generation module 214. Intra-directional prediction generation module 214 may be configured to perform spatial directional prediction and may use decoded neighboring partitions according to intra-prediction data in input bitstream 201.

As shown in FIG. 2, prediction modes selector module 215 may determine a prediction mode selection from among, "skip", "auto", "inter", "multi", and "intra", for each prediction partition of a tile, all of which may apply to P- and F/B-pictures, based on mode selection data in input bitstream 201. In addition to prediction modes, it also allows for selection of reference types that can be different depending on "inter" or "multi" mode, as well as for P- and F/B-pictures. The prediction signal at the output of prediction modes selector module 215 may be filtered by prediction fusion filtering module 216. Prediction fusion filtering module 216 may perform filtering based on parameters (e.g., filtering coefficients, frequency, overhead) determined via input bitstream 201. In some examples, filtering the prediction signal may fuse different types of signals representing different modes (e.g., intra, inter, multi, skip, and auto). In some examples, intra-prediction signals may be different than all other types of inter-prediction signal(s) such that proper filtering may greatly enhance coding efficiency. The filtered prediction signal may provide the second input (e.g., prediction partition(s)) to differencer 206, as discussed above.

As discussed, the output of quality restoration filtering module 209 may be a final reconstructed frame. Final reconstructed frames may be transmitted to an adaptive picture re-organizer 217, which may re-order or re-organize frames as needed based on ordering parameters in input bitstream 201. Re-ordered frames may be transmitted to content post-restorer module 218. Content post-restorer module 218 may be an optional module configured to perform further improvement of perceptual quality of the decoded video. The improvement processing may be performed in response to quality improvement parameters in input bitstream 201 or it may be performed as standalone operation. In some examples, content post-restorer module 218 may apply parameters to improve quality such as, for example, an estimation of film grain noise or residual blockiness reduction (e.g., even after the deblocking operations discussed with respect to deblock filtering module 208). As shown, decoder 200 may provide display video 219, which may be configured for display via a display device (not shown).

FIG. 2 illustrates example control signals associated with operation of video decoder 200, where the indicated abbreviations may represent similar information as discussed with respect to FIG. 1 above. While these control signals are illustrated as being associated with specific example functional modules of decoder 200 in FIG. 2, other implementations may include a different distribution of control signals among the functional modules of encoder 100. The present disclosure is not limited in this regard and, in various examples, implementation of the control signals herein may include the undertaking of only a subset of the specific example control signals shown, additional control signals, and/or in a different arrangement than illustrated.

While FIGS. 1 through 2 illustrate particular encoding and decoding modules, various other coding modules or components not depicted may also be utilized in accordance with the present disclosure. Further, the present disclosure is not limited to the particular components illustrated in FIGS. 1 and 2 and/or to the manner in which the various components are arranged. Various components of the systems described herein may be implemented in software, firmware, and/or hardware and/or any combination thereof. For example, various components of encoder 100 and/or decoder 200 may be provided, at least in part, by hardware of a computing System-on-a-Chip (SoC) such as may be found in a computing system such as, for example, a mobile phone.

Further, it may be recognized that encoder 100 may be associated with and/or provided by a content provider system including, for example, a video content server system, and that output bitstream 111 may be transmitted or conveyed to decoders such as, for example, decoder 200 by various communications components and/or systems such as transceivers, antennae, network systems, and the like not depicted in FIGS. 1 and 2. It may also be recognized that decoder 200 may be associated with a client system such as a computing device (e.g., a desktop computer, laptop computer, tablet computer, convertible laptop, mobile phone, or the like) that is remote to encoder 100 and that receives input bitstream 201 via various communications components and/or systems such as transceivers, antennae, network systems, and the like not depicted in FIGS. 1 and 2. Therefore, in various implementations, encoder 100 and decoder subsystem 200 may be implemented either together or independent of one another.

Figure 3A:
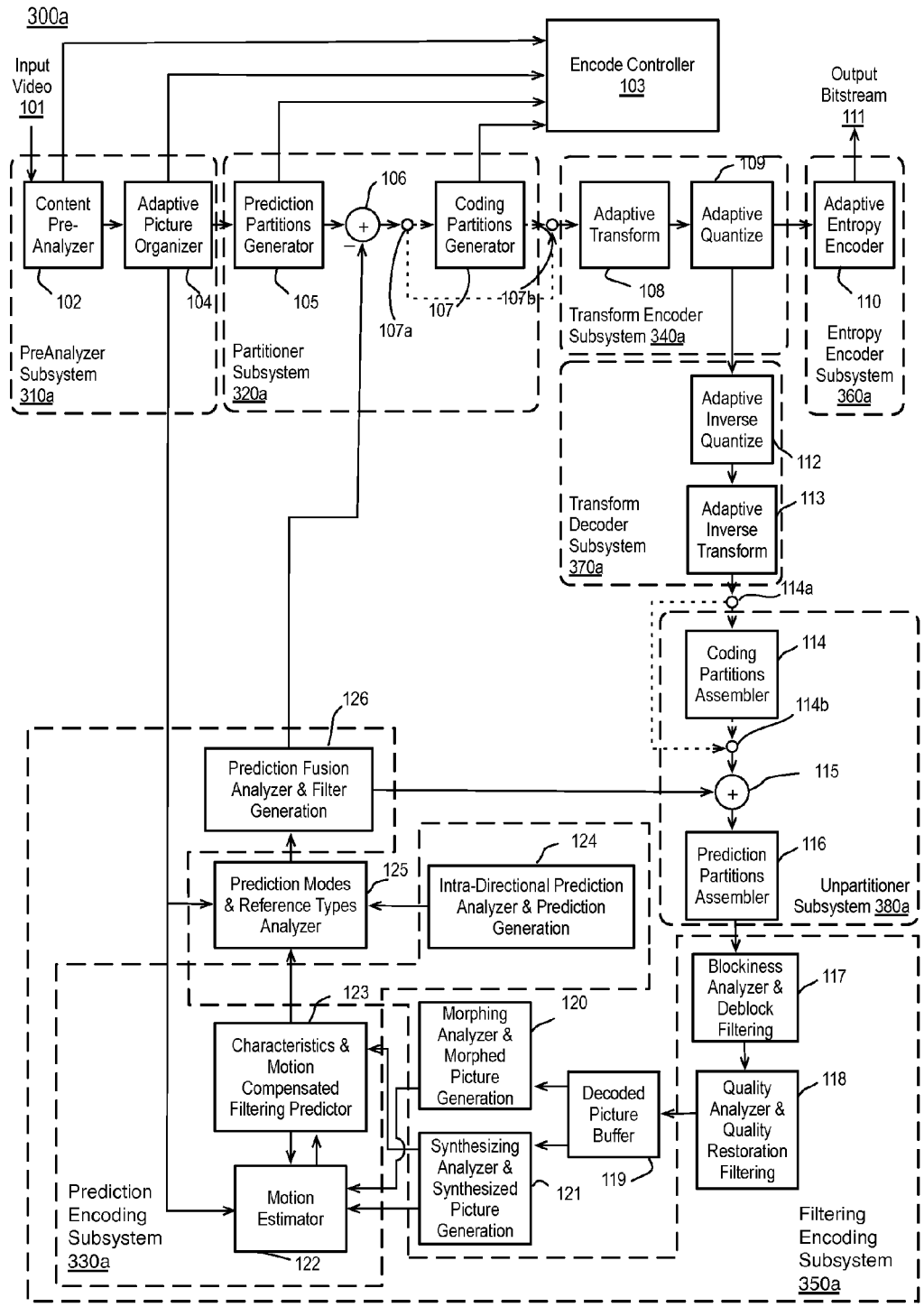
FIG. 3(a) is an illustrative diagram of an example next generation video encoder and subsystems.

FIG. 3(a) is an illustrative diagram of an example next generation video encoder 300a, arranged in accordance with at least some implementations of the present disclosure. FIG. 3(a) presents a similar encoder to that shown in FIGS. 1(a) and 1(b), and similar elements will not be repeated for the sake of brevity. As shown in FIG. 3(a), encoder 300a may include preanalyzer subsystem 310a, partitioner subsystem 320a, prediction encoding subsystem 330a, transform encoder subsystem 340a, filtering encoding subsystem 350a, entropy encoder system 360a, transform decoder subsystem 370a, and/or unpartitioner subsystem 380a. Preanalyzer subsystem 310a may include content pre-analyzer module 102 and/or adaptive picture organizer module 104. Partitioner subsystem 320a may include prediction partitions generator module 105, and/or coding partitions generator 107. Prediction encoding subsystem 330a may include motion estimator module 122, characteristics and motion compensated filtering predictor module 123, and/or intra-directional prediction analyzer and prediction generation module 124. Transform encoder subsystem 340a may include adaptive transform module 108 and/or adaptive quantize module 109. Filtering encoding subsystem 350a may include blockiness analyzer and deblock filtering module 117, quality analyzer and quality restoration filtering module 118, motion estimator module 122, characteristics and motion compensated filtering predictor module 123, and/or prediction analyzer and prediction fusion filtering module 126. Entropy coding subsystem 360a may include adaptive entropy encoder module 110. Transform decoder subsystem 370a may include adaptive inverse quantize module 112 and/or adaptive inverse transform module 113. Unpartitioner subsystem 380a may include coding partitions assembler 114 and/or prediction partitions assembler 116.

Partitioner subsystem 320a of encoder 300a may include two partitioning subsystems: prediction partitions generator module 105 that may perform analysis and partitioning for prediction, and coding partitions generator module 107 that may perform analysis and partitioning for coding. Another partitioning method may include adaptive picture organizer 104 which may segment pictures into regions or slices may also be optionally considered as being part of this partitioner.

Prediction encoder subsystem 330a of encoder 300a may include motion estimator 122 and characteristics and motion compensated filtering predictor 123 that may perform analysis and prediction of "inter" signal, and intra-directional prediction analyzer and prediction generation module 124 that may perform analysis and prediction of "intra" signal. Motion estimator 122 and characteristics and motion compensated filtering predictor 123 may allow for increasing predictability by first compensating for other sources of differences (such as gain, global motion, registration), followed by actual motion compensation. They may also allow for use of data modeling to create synthesized frames (super resolution, and projection) that may allow better predictions, followed by use of actual motion compensation in such frames.

Transform encoder subsystem 340a of encoder 300a may perform analysis to select the type and size of transform and may include two major types of components. The first type of component may allow for using parametric transform to allow locally optimal transform coding of small to medium size blocks; such coding however may require some overhead. The second type of component may allow globally stable, low overhead coding using a generic/fixed transform such as the DCT, or a picture based transform from a choice of small number of transforms including parametric transforms. For locally adaptive transform coding, PHT (Parametric Haar Transform) may be used. Transforms may be performed on 2D blocks of rectangular sizes between 4×4 and 64×64, with actual sizes that may depend on a number of factors such as if the transformed data is luma or chroma, inter or intra, and if the transform used is PHT or DCT. The resulting transform coefficients may be quantized, scanned and entropy coded.

Entropy encoder subsystem 360a of encoder 300a may include a number of efficient but low complexity components each with the goal of efficiently coding a specific type of data (various types of overhead, motion vectors, or transform coefficients). Components of this subsystem may belong to a generic class of low complexity variable length coding techniques, however, for efficient coding, each component may be custom optimized for highest efficiency. For instance, a custom solution may be designed for coding of "Coded/Not Coded" data, another for "Modes and Ref Types" data, yet another for "Motion Vector" data, and yet another one for "Prediction and Coding Partitions" data. Finally, because a very large portion of data to be entropy coded is "transform coefficient" data, multiple approaches for efficient handling of specific block sizes, as well as an algorithm that may adapt between multiple tables may be used.

Filtering encoder subsystem 350a of encoder 300a may perform analysis of parameters as well as multiple filtering of the reconstructed pictures based on these parameters, and may include several subsystems. For example, a first subsystem, blockiness analyzer and deblock filtering module 117 may deblock and dither to reduce or mask any potential block coding artifacts. A second example subsystem, quality analyzer and quality restoration filtering module 118, may perform general quality restoration to reduce the artifacts due to quantization operation in any video coding. A third example subsystem, which may include motion estimator 122 and characteristics and motion compensated filtering predictor module 123, may improve results from motion compensation by using a filter that adapts to the motion characteristics (motion speed/degree of blurriness) of the content. A fourth example subsystem, prediction fusion analyzer and filter generation module 126, may allow adaptive filtering of the prediction signal (which may reduce spurious artifacts in prediction, often from intra prediction) thereby reducing the prediction error which needs to be coded.

Encode controller module 103 of encoder 300a may be responsible for overall video quality under the constraints of given resources and desired encoding speed. For instance, in full RDO (Rate Distortion Optimization) based coding without using any shortcuts, the encoding speed for software encoding may be simply a consequence of computing resources (speed of processor, number of processors, hyperthreading, DDR3 memory etc.) availability. In such case, encode controller module 103 may be input every single combination of prediction partitions and coding partitions and by actual encoding, and the bitrate may be calculated along with reconstructed error for each case and, based on lagrangian optimization equations, the best set of prediction and coding partitions may be sent for each tile of each frame being coded. The full RDO based mode may result in best compression efficiency and may also be the slowest encoding mode. By using content analysis parameters from content preanalyzer module 102 and using them to make RDO simplification (not test all possible cases) or only pass a certain percentage of the blocks through full RDO, quality versus speed tradeoffs may be made allowing speedier encoding. Up to now we have described a variable bitrate (VBR) based encoder operation. Encode controller module 103 may also include a rate controller that can be invoked in case of constant bitrate (CBR) controlled coding.

Lastly, preanalyzer subsystem 310a of encoder 300a may perform analysis of content to compute various types of parameters useful for improving video coding efficiency and speed performance. For instance, it may compute horizontal and vertical gradient information (Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation etc. The parameters generated by preanalyzer subsystem 310a may either be consumed by the encoder or be quantized and communicated to decoder 200.

While subsystems 310a through 380a are illustrated as being associated with specific example functional modules of encoder 300a in FIG. 3(a), other implementations of encoder 300a herein may include a different distribution of the functional modules of encoder 300a among subsystems 310a through 380a. The present disclosure is not limited in this regard and, in various examples, implementation of the example subsystems 310a through 380a herein may include the undertaking of only a subset of the specific example functional modules of encoder 300a shown, additional functional modules, and/or in a different arrangement than illustrated.

Figure 3B:
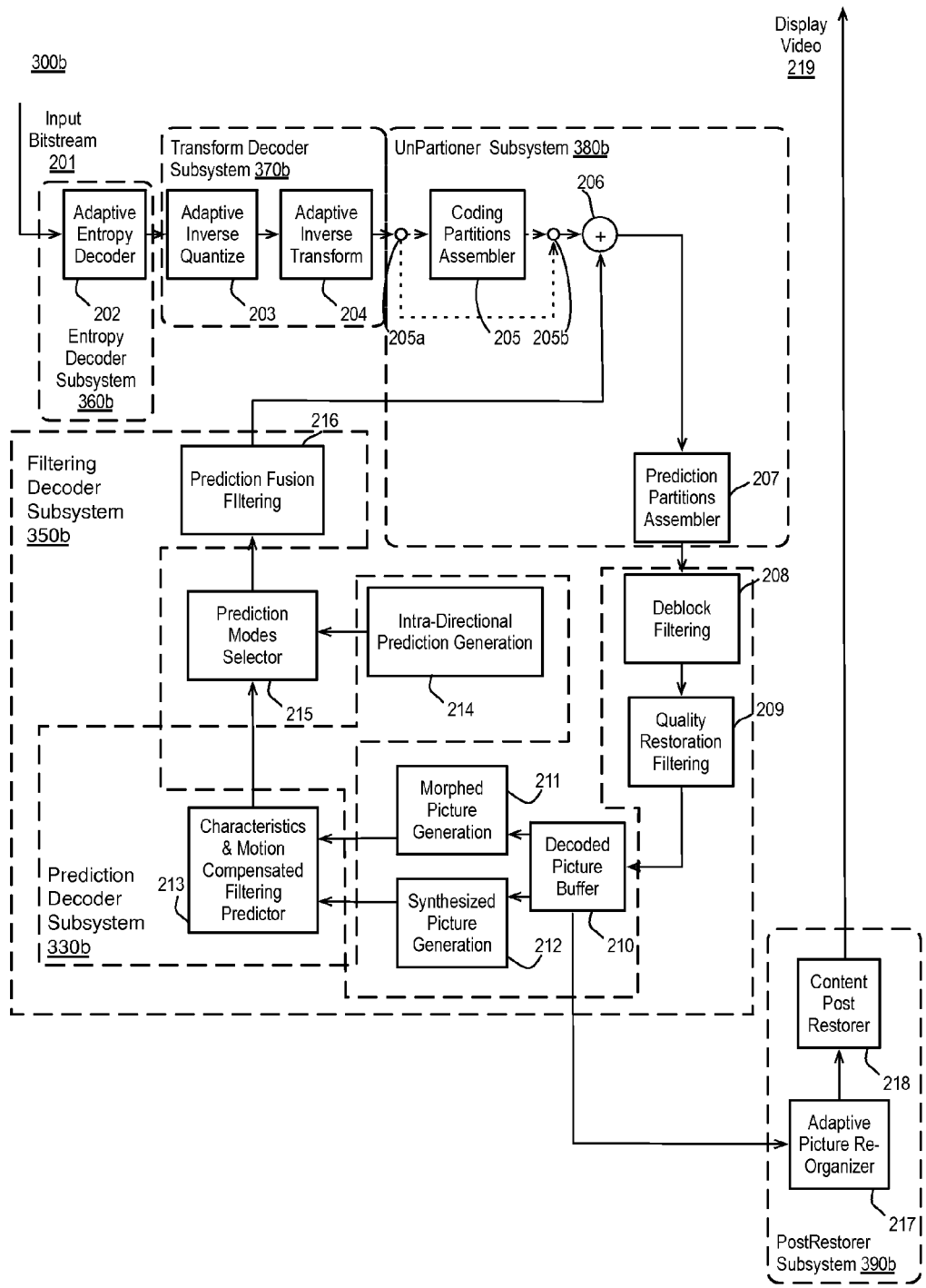
FIG. 3(b) is an illustrative diagram of an example next generation video decoder and subsystems.

FIG. 3(b) is an illustrative diagram of an example next generation video decoder 300b, arranged in accordance with at least some implementations of the present disclosure. FIG. 3(b) presents a similar decoder to that shown in FIG. 2, and similar elements will not be repeated for the sake of brevity. As shown in FIG. 3(b), decoder 300b may include prediction decoder subsystem 330b, filtering decoder subsystem 350b, entropy decoder subsystem 360b, transform decoder subsystem 370b, unpartitioner_2 subsystem 380b, unpartitioner_1 subsystem 351b, filtering decoder subsystem 350b, and/or postrestorer subsystem 390b. Prediction decoder subsystem 330b may include characteristics and motion compensated filtering predictor module 213 and/or intra-directional prediction generation module 214. Filtering decoder subsystem 350b may include deblock filtering module 208, quality restoration filtering module 209, characteristics and motion compensated filtering predictor module 213, and/or prediction fusion filtering module 216. Entropy decoder subsystem 360b may include adaptive entropy decoder module 202. Transform decoder subsystem 370b may include adaptive inverse quantize module 203 and/or adaptive inverse transform module 204. Unpartitioner_2 subsystem 380b may include coding partitions assembler 205. Unpartitioner_1 subsystem 351b may include prediction partitions assembler 207. Postrestorer subsystem 790 may include content post restorer module 218 and/or adaptive picture re-organizer 217.

Entropy decoding subsystem 360b of decoder 300b may perform the inverse operation of the entropy encoder subsystem 360a of encoder 300a, i.e., it may decode various data (types of overhead, motion vectors, transform coefficients) encoded by entropy encoder subsystem 360a using a class of techniques loosely referred to as variable length decoding. Specifically, various types of data to be decoded may include "Coded/Not Coded" data, "Modes and Ref Types" data, "Motion Vector" data, "Prediction and Coding Partitions" data, and "Transform Coefficient" data.

Transform decoder subsystem 370b of decoder 300b may perform inverse operation to that of transform encoder subsystem 340a of encoder 300a. Transform decoder subsystem 370b may include two types of components. The first type of example component may support use of the parametric inverse PHT transform of small to medium block sizes, while the other type of example component may support inverse DCT transform for all block sizes. The PHT transform used for a block may depend on analysis of decoded data of the neighboring blocks. Output bitstream 111 and/or input bitstream 201 may carry information about partition/block sizes for PHT transform as well as in which direction of the 2D block to be inverse transformed the PHT may be used (the other direction uses DCT). For blocks coded purely by DCT, the partition/block sizes information may be also retrieved from output bitstream 111 and/or input bitstream 201 and used to apply inverse DCT of appropriate size.

Unpartitioner subsystem 380b of decoder 300b may perform inverse operation to that of partitioner subsystem 320a of encoder 300a and may include two unpartitioning subsystems, coding partitions assembler module 205 that may perform unpartitioning of coded data and prediction partitions assembler module 207 that may perform unpartitioning for prediction. Further if optional adaptive picture organizer module 104 is used at encoder 300a for region segmentation or slices, adaptive picture re-organizer module 217 may be needed at the decoder.

Prediction decoder subsystem 330b of decoder 300b may include characteristics and motion compensated filtering predictor module 213 that may perform prediction of "inter" signal and intra-directional prediction generation module 214 that may perform prediction of "intra" signal. Characteristics and motion compensated filtering predictor module 213 may allow for increasing predictability by first compensating for other sources of differences (such as gain, global motion, registration) or creation of synthesized frames (super resolution, and projection), followed by actual motion compensation.

Filtering decoder subsystem 350b of decoder 300b may perform multiple filtering of the reconstructed pictures based on parameters sent by encoder 300a and may include several subsystems. The first example subsystem, deblock filtering module 208, may deblock and dither to reduce or mask any potential block coding artifacts. The second example subsystem, quality restoration filtering module 209, may perform general quality restoration to reduce the artifacts due to quantization operation in any video coding. The third example subsystem, characteristics and motion compensated filtering predictor module 213, may improve results from motion compensation by using a filter that may adapt to the motion characteristics (motion speed/degree of blurriness) of the content. The fourth example subsystem, prediction fusion filtering module 216, may allow adaptive filtering of the prediction signal (which may reduce spurious artifacts in prediction, often from intra prediction) thereby reducing the prediction error which may need to be coded.

Postrestorer subsystem 390b of decoder 300b is an optional block that may perform further improvement of perceptual quality of decoded video. This processing can be done either in response to quality improvement parameters sent by encoder 100, or it can be standalone decision made at the postrestorer subsystem 390b. In terms of specific parameters computed at encoder 100 that can be used to improve quality at postrestorer subsystem 390b may be estimation of film grain noise and residual blockiness at encoder 100 (even after deblocking). As regards the film grain noise, if parameters can be computed and sent via output bitstream 111 and/or input bitstream 201 to decoder 200, then these parameters may be used to synthesize the film grain noise. Likewise, for any residual blocking artifacts at encoder 100, if they can be measured and parameters sent via output bitstream 111 and/or bitstream 201, postrestorer subsystem 390b may decode these parameters and may use them to optionally perform additional deblocking prior to display. In addition, encoder 100 also may have access to scene change, spatial complexity, temporal complexity, motion range, and prediction distance information that may help in quality restoration in postrestorer subsystem 390b.

While subsystems 330b through 390b are illustrated as being associated with specific example functional modules of decoder 300b in FIG. 3(b), other implementations of decoder 300b herein may include a different distribution of the functional modules of decoder 300b among subsystems 330b through 390b. The present disclosure is not limited in this regard and, in various examples, implementation of the example subsystems 330b through 390b herein may include the undertaking of only a subset of the specific example functional modules of decoder 300b shown, additional functional modules, and/or in a different arrangement than illustrated.

Figure 4:
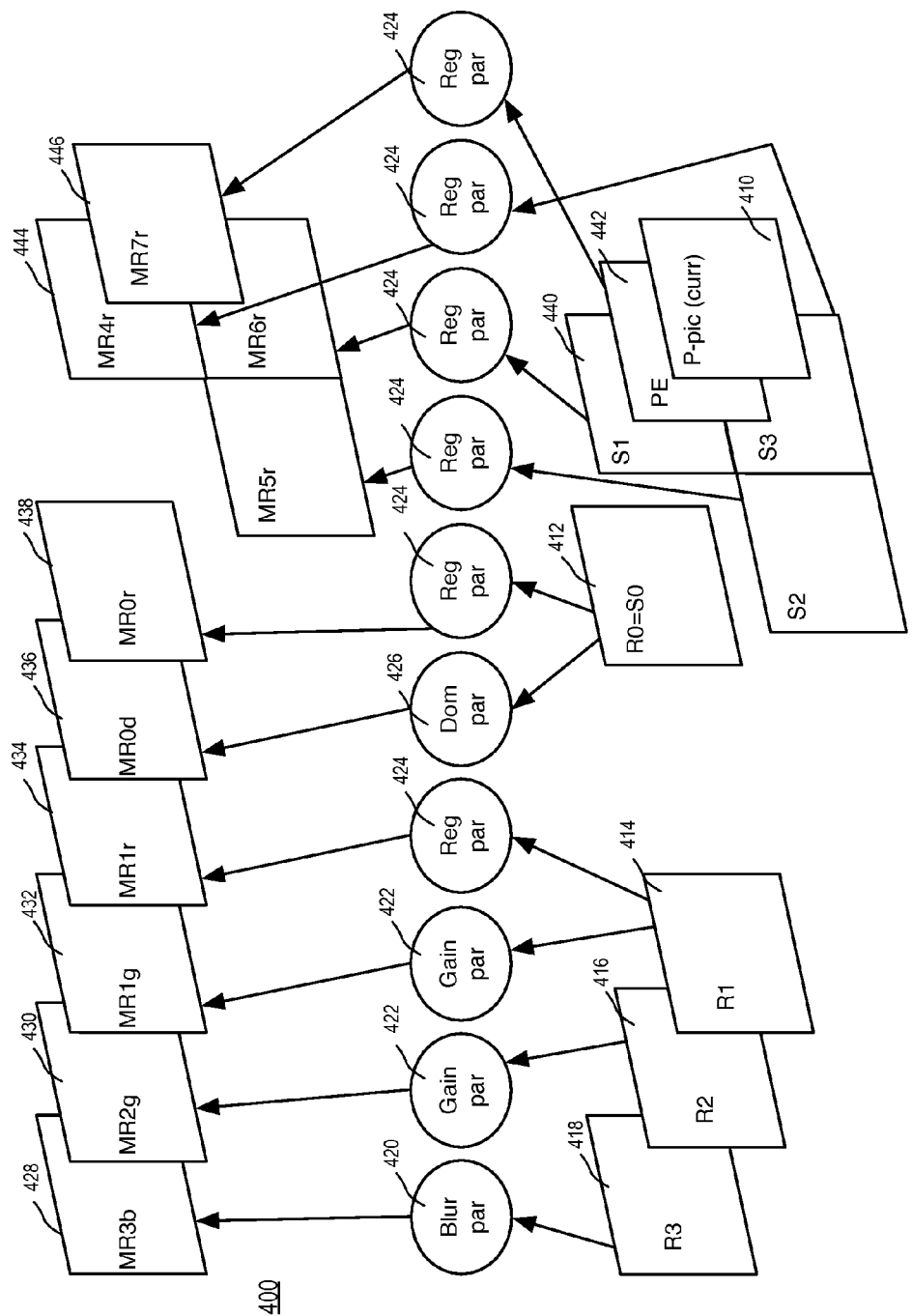
FIG. 4 is an illustrative diagram of modified prediction reference pictures.

FIG. 4 is an illustrative diagram of modified prediction reference pictures 400, arranged in accordance with at least some implementations of the present disclosure. As shown, the output of quality analyzer and quality restoration filtering may be a final reconstructed frame that may be used for prediction for coding other frames (e.g., the final reconstructed frame may be a reference frame or the like).

The proposed implementation of the NGV coder (e.g., encoder 100 and/or decoder 200) may implement P-picture coding using a combination of Morphed Prediction References 428 through 438 (MR0 through 3) and/or Synthesized Prediction References 412 and 440 through 446 (S0 through S3, MR4 through 7). NGV coding involves use of 3 picture types referred to as I-pictures, P-pictures, and F/B-pictures. In the illustrated example, the current picture to be coded (a P-picture) is shown at time t=4. During coding, the proposed implementation of the NGV coder (e.g., encoder 100 and/or decoder 200) may and use one or more of 4 previously decoded references R0 412, R1 414, R2 416, and R3 418. Unlike other solutions that may simply use these references directly for prediction, the proposed implementation of the NGV coder (e.g., encoder 100 and/or decoder 200) may generate modified (morphed or synthesized) references from such previously decoded references and then use motion compensated coding based at least in part on such generated modified (morphed or synthesized) references.

As will be described in greater detail below, in some examples, the proposed implementation of the NGV coder (e.g., encoder 100 and/or decoder 200) may incorporate a number of components and the combined predictions generated by these components in an efficient video coding algorithm. For example, proposed implementation of the NGV coder may include one or more of the following features: 1. Gain Compensation (e.g., explicit compensation for changes in gain/brightness in a scene); 2. Blur Compensation: e.g., explicit compensation for changes in blur/sharpness in a scene; 3. Dominant/Global Motion Compensation (e.g., explicit compensation for dominant motion in a scene); 4. Registration Compensation (e.g., explicit compensation for registration mismatches in a scene); 5. Super Resolution (e.g., explicit model for changes in resolution precision in a scene); 6. Projection (e.g., explicit model for changes in motion trajectory in a scene); the like, and/or combinations thereof.

In the illustrated example, if inter-prediction is applied, a characteristics and motion filtering predictor module may apply motion compensation to a current picture 410 (e.g., labeled in the figure as P-pic (carr)) as part of the local decode loop. In some instances, such motion compensation may be based at least in part on future frames (not shown) and/or previous frame R0 412 (e.g., labeled in the figure as R0), previous frame R1 414 (e.g., labeled in the figure as R1), previous frame R2 416 (e.g., labeled in the figure as R2), and/or previous frame R3 418 (e.g., labeled in the figure as R3).

For example, in some implementations, prediction operations may include inter- and/or intra-prediction. Inter-prediction may be performed by one or more modules including a morphing analyzer and generation module and/or a synthesizing analyzer and generation module. Such a morphing analyzer and generation module may analyze a current picture to determine parameters for changes in blur 420 (e.g., labeled in the figure as Blur par), changes in gain 422 (e.g., labeled in the figure as Gain par), changes in registration 424 (e.g., labeled in the figure as Reg par), and changes in dominant motion 426 (e.g., labeled in the figure as Dom par), or the like with respect to a reference frame or frames with which it is to be coded.

The determined morphing parameters 420, 422, 424, and/or 426 may be used to generate morphed reference frames. Such generated morphed reference frames may be stored and may be used for computing motion vectors for efficient motion (and characteristics) compensated prediction of a current frame. In the illustrated example, determined morphing parameters 420, 422, 424, and/or 426 may be used to generate morphed reference frames, such as blur compensated morphed reference frame 428 (e.g., labeled in the figure as MR3b), gain compensated morphed reference frame 430 (e.g., labeled in the figure as MR2g), gain compensated morphed reference frame 432 (e.g., labeled in the figure as MR1g), registration compensated morphed reference frame 434 (e.g., labeled in the figure as MR1r), dominant motion compensated morphed reference frame 436 (e.g., labeled in the figure as MR0d), and/or registration compensated morphed reference frame 438 (e.g., labeled in the figure as MR0r), the like or combinations thereof, for example.

Similarly, a synthesizing analyzer and generation module may generate super resolution (SR) pictures 440 (e.g., labeled in the figure as S0 (which is equal to previous frame R0 412), S1, S2, S3) and projected interpolation (PI) pictures 442 (e.g., labeled in the figure as PE) or the like for determining motion vectors for efficient motion compensated prediction in these frames. Such generated synthesized reference frames may be stored and may be used for computing motion vectors for efficient motion (and characteristics) compensated prediction of a current frame.

Additionally or alternatively, the determined morphing parameters 420, 422, 424, and/or 426 may be used to morph the generate synthesis reference frames super resolution (SR) pictures 440 and/or projected interpolation (PI) pictures 442. For example, a synthesizing analyzer and generation module may generate morphed registration compensated super resolution (SR) pictures 444 (e.g., labeled in the figure as MR4r, MR5r, and MR6r) and/or morphed registration compensated projected interpolation (PI) pictures 446 (e.g., labeled in the figure as MR7r) or the like from the determined registration morphing parameter 424. Such generated morphed and synthesized reference frames may be stored and may be used for computing motion vectors for efficient motion (and characteristics) compensated prediction of a current frame.

In some implementations, changes in a set of characteristics (such as gain, blur, dominant motion, registration, resolution precision, motion trajectory, the like, or combinations thereof, for example) may be explicitly computed. Such a set of characteristics may be computed in addition to local motion. In some cases previous and next pictures/slices may be utilized as appropriate; however, in other cases such a set of characteristics may do a better job of prediction from previous picture/slices. Further, since there can be error in any estimation procedure, (e.g., from multiple past or multiple past and future pictures/slices) a modified reference frame associated with the set of characteristics (such as gain, blur, dominant motion, registration, resolution precision, motion trajectory, the like, or combinations thereof, for example) may be selected that yields the best estimate. Thus, the proposed approach that utilizes modified reference frames associated with the set of characteristics (such as gain, blur, dominant motion, registration, resolution precision, motion trajectory, the like, or combinations thereof, for example) may explicitly compensate for differences in these characteristics. The proposed implementation may address the problem of how to improve the prediction signal, which in turn allows achieving high compression efficiency in video coding.

Gain Compensation

By one detailed example, often in video scenes, frame to frame differences are caused not only due to movement of objects but also due to changes in gain/brightness. Sometimes such changes in brightness can be global due to editing effects such as a fade-in, a fade-out, or due to a crossfade. However, in many more cases, such changes in brightness are local for instance due to flickering lights, camera flashes, explosions, colored strobe lights in a dramatic or musical performance, etc.

The compensation of interframe changes in brightness, whether global or local, can potentially improve compression efficiency in video coding. However, the brightness change parameters (gain and offset) are applied both at a video encoder and a decoder so that both should be efficiently communicating with low bit-cost from encoder to decoder via the bitstream and the processing complexity for the decoder should be minimized. In the past, only techniques for global brightness change have been disclosed, but local compensation in brightness changes have not been successfully addressed.

The following equation relates brightness of a pixel $s_t(i,j)$ at (i,j) location in frame 't' to brightness of a pixel at the same location (i,j) in a previous frame 't−1', with 'a' and 'b' being the gain and offset factors. Motion is assumed to be small and only the brightness changes are modeled.

$$s_t(i,j) = a \times s_{t-1}(i,j) + b \quad (1)$$

Taking the expected value of $s_t(i,j)$ and $(s_t^2(i,j))$, and following a method of equating first and second moments of current frame and the previous frame, the value of gain 'a' and offset 'b' can then be calculated as:

$$a = \frac{\sqrt{(E(s_t^2(i,j)) - (E(s_t(i,j)))^2}}{\sqrt{(E(s_{t-1}^2(i,j)) - (E(s_{t-1}(i,j)))^2}} \quad (2)$$

$$b = E(s_t(i,j)) - a \times E(s_{t-1}(i,j)) \quad (3)$$

Once 'a' and 'b' are calculated as per equation (2), they are quantized (for efficient transmission), encoded and sent to the decoder. At the decoder, decoded dequantized values of 'a', and 'b' are put back into equation (1), and using decoded values of pixels in the previous frame, a gain compensated modified version of a previous reference frame is calculated that is lower in error than the original previous frame, and is then used for generating (gain compensated) motion compensated prediction. To the (inverse transformed, and dequantized) decoded prediction error blocks, the corresponding predictions from modified previous reference frames are added to generate the final decoded frame (or blocks of the frame).

For local motion compensation, instead of a single set of (a, b) parameters, multiple sets of parameters are computed and transmitted along with the map of which portion of the frame corresponds to which parameters, and to the decoder and used for gain compensation as described.

Blur/Registration Compensation

By one detailed example, methods for compensation of Registration and Blur are described below although the terms can be used interchangeably.

Registration Compensation:

A stationary video camera imaging a scene might still result in shaky or unstable video that differs frame to frame due to environmental factors (such as wind), vibrations from nearby objects, a shaky hand, or a jittery capture process, rather than global movement of the scene or motion of large objects in the scene. This results in frame to frame registration differences, the compensation of which (in addition to other forms of compensation such as gain, global/dominant motion, and local motion compensation) may result in improvement of compression efficiency of video coding.

For computing registration parameters between a current frame and a previous reference frame, Wiener filtering can be employed. Let x(n) be the input signal, y(n) be the output, and h(n) represent filter coefficients.

$$\text{Filter output: } y(n) = \sum_{k=0}^{N-1} h(k)x(n-k) \quad (4)$$

$$\text{Error signal: } e(n) = d(n) - y(n) \quad (5)$$

In matrix notation, h is the vector of filter coefficients. The cross-correlation row vector (between source frame and reference frame):

$$R_{dx} = E[d(n)x(n)^T] \quad (6)$$

The autocorrelation matrix (based on block data):

$$R_{xx} = E[x(n)x(n)^T] \quad (7)$$

The Wiener Hopf equation to solve for h as then as follows. The Wiener Hopf equation determines optimum filter coefficients in mean square error, and the resulting filter is called the 'wiener' filter.

$$h = R_{xx}^{-1} R_{dx} \quad (8)$$

Blur Compensation:

A fast camera pan of a scene may, due to charge integration, result in blurry image. Further, even if a camera is still, or in motion, if a scene involves fast moving objects, for instance football players in a football game, the objects can appear blurry as the temporal resolution of the imaging is not sufficient. In both of the aforementioned cases, compensation of blur prior to or in conjunction with other forms of compensation, may improve compression efficiency of video coding.

For motion blur estimation, a Lucy-Richardson method can be used. It is an iterative algorithm for successively computing reduced blur frame (X) at iteration i, from Y the source frame, using B, the blur operator (blur frame using estimated blur vectors) and B* an adjoint operator. The operator B* can be roughly thought of as the same as B as B* can be replaced by B resulting in roughly the same visual quality.

$$X_{i+1} = X_i \cdot B^*\left(\frac{Y}{B(X_i)}\right), X_0 = Y \qquad (9)$$

Global/Dominant Motion Compensation

By one detailed example, since global motion in video can present a challenge to block based on prediction (due to larger prediction resulting from a translatory motion model, and a significant amount of motion vector overhead), an alternative approach was developed that directly estimates/compensates global motion due to its potential of being able to better adapt to nontranslatory/complex motion, and a more compact representation of motion parameters is now available as needed such as once per picture. Among the choice of motion models for Global Motion, the two models that offer significant benefits are the Affine Model, and the Perspective Model. The affine model uses six parameters, and is able to address a large range of complex motions, while the perspective model is more complex and flexible, but can use up to eight parameters. The affine model may be sufficient for many cases and can allows global compensation for motion of types such as translation, zoom, shear, and rotation.

Mathematically the affine transform process is described by the following equations that use affine parameters a, b, c, d, e, f to map a set of points (x,y) in previous frame to a modified set of points (x', y').

$$x_i' = a \cdot x_i + b \cdot y_i + c \qquad (10)$$

$$y_i' = d \cdot x_i + e \cdot y_i + f \qquad (11)$$

For efficient transmission of global motion parameters to the decoder, the model is transmitted as 3 motion trajectories, one for top-left corner of the picture, one for top-right corner of the picture, and one for bottom-left corner of the picture. Affine parameters are calculated (fixed point arithmetic) for a virtual picture which is assumed to be of width and height of nearest power of 2 number which greater than the coded picture. This removes divisions required at the decoder.

Assume for three vertices (x0, y0), (x1, y1), (x2, y2) corresponding motion trajectories mt0, mt1, and mt2 are given and can be represented as (dx0, dy0), (dx1, dy1), and (dx2, dy2) say in ⅛ pel units. The affine parameters A, B, C, D, E, and F can then be calculated as follows.

$$C = dx0 \qquad (12)$$

$$F = dy0 \qquad (13)$$

$$A = W^*((x1+dx1)-(x0+dx0))/W \qquad (14)$$

$$B = W^*((x2+dx2)-(x0+dx0))/W \qquad (15)$$

$$D = H^*(((y1+dy1)-(y0+dy0))/H) \qquad (16)$$

$$E = H^*(((y2+dy2)-(y0+dy0))/H) \qquad (17)$$

While use of affine model based Global Motion Estimation/Compensation (GME/C) was a notable improvement for scenes with global motion over use of block based translatory motion, in reality both block based local and global motion is combined for best coding efficiency results. Further, the affine model can also be applied for motion compensation of non-overlapping tiles, or regions/objects in a scene. This results in multiple global motion parameter sets, and the process is referred to as performing dominant motion compensation (DC).

For instance, with ever increasing resolution of video to be compressed and expectation of high video quality, the corresponding bitrate/bandwidth required for coding using existing video coding standards such as H.264 or even evolving standards such as H.265/HEVC, is relatively high. The aforementioned standards use expanded forms of traditional approaches to implicitly address the insufficient compression/quality problem, but often the results are limited.

The proposed implementation improves video compression efficiency by improving interframe prediction, which in turn reduces interframe prediction difference (error signal) that needs to be coded. The less the amount of interframe prediction difference to be coded, the less the amount of bits required for coding, which effectively improves the compression efficiency as it now takes less bits to store or transmit the coded prediction difference signal. Instead of being limited to motion predictions only, the proposed NCV codec may be highly adaptive to changing characteristics (such as gain, blur, dominant motion, registration, resolution precision, motion trajectory, the like, or combinations thereof, for example) of the content by employing, in addition or in the alternative to motion compensation, approaches to explicitly compensate for changes in the characteristics of the content. Thus by explicitly addressing the root cause of the problem the NGV codec may address a key source of limitation of standards based codecs, thereby achieving higher compression efficiency.

This change in interframe prediction output may be achieved due to ability of the proposed NCV codec to compensate for a wide range of reasons for changes in the video content. Typical video scenes vary from frame to frame due to many local and global changes (referred to herein as characteristics). Besides local motion, there are many other characteristics that are not sufficiently addressed by current solutions that may be addressed by the proposed implementation.

The proposed implementation may explicitly compute changes in a set of characteristics (such as gain, blur, dominant motion, registration, resolution precision, motion trajectory, the like, or combinations thereof, for example) in addition to local motion, and thus may do a better job of prediction from previous picture/slices than only using local motion prediction from previous and next pictures/slices. Further, since there can be error in any estimation procedure, from multiple past or multiple past and future pictures/slices the NGV coder may choose the frame that yields the best by explicitly compensating for differences in various characteristics.

In particular, the proposed implementation of the NGV coder may include features: i. explicit compensation for changes in gain/brightness in a scene; ii. explicit compensation for changes in blur/sharpness in a scene; iii. explicit compensation for dominant motion in a scene; iv. explicit compensation for registration mismatches in a scene; v. explicit model for changes in resolution precision in a scene; and/or vi. explicit model for changes in motion trajectory in a scene.

Tables 1 and 2, shown below, illustrate one example of codebook entries. A full codebook of entries may provide a full or substantially full listing of all possible entries and coding thereof. In some examples, the codebook may take into account constraints as described above. In some examples, data associated with a codebook entry for prediction modes and/or reference types may be encoded in a bitstream for use at a decoder as discussed herein.

TABLE 1

Example Prediction References in P-pictures

| No. | Ref Types for P-picture for Inter-Prediction mode |
|---|---|
| 0. | MR0r (=past SR0) |
| 1. | MR1r |
| 2. | MR2r |
| 3. | MR2g |
| 4. | MR4r (past SR1) |
| 5. | MR5r (past SR2) |
| 6. | MR6r (past SR3) |
| 7. | MR0d |
| 8. | MR1g |
| 9. | MR3b |

TABLE 2

Example Prediction References in F-pictures

| No. | Ref Types for F-picture for Inter-Prediction mode |
|---|---|
| 0. | MR0r |
| 1. | MR7r (=Proj Interpol) |
| 2. | MR3r (=future SR0) |
| 3. | MR1r |
| 4. | MR4r (=Future SR1) |
| 5. | MR5r (=Future SR2) |
| 6. | MR6r (=Future SR3) |
| 7. | MR0d |
| 8. | MR3d |
| 9. | MR0g/MR3g |
| 10. | MR3b |

In operation, the proposed implementation of the NGV coder (e.g., encoder 100 and/or decoder 200) may operate so that prediction mode and/or reference type data may be defined using symbol-run coding or a codebook or the like. The prediction mode and/or reference type data may be transform encoded using content adaptive or discrete transform in various examples to generate transform coefficients. Also as discussed, data associated with partitions (e.g., the transform coefficients or quantized transform coefficients), overhead data (e.g., indicators as discussed herein for transform type, adaptive transform direction, and/or a transform mode), and/or data defining the partitions and so on may be encoded (e.g., via an entropy encoder) into a bitstream. The bitstream may be communicated to a decoder, which may use the encoded bitstream to decode video frames for display. On a local basis (such as block-by-block within a macroblock or a tile, or on a partition-by-partition within a tile or a prediction unit, or fragments within a superfragment or region) the best mode may be selected for instance based at least in part on Rate Distortion Optimization (RDO) or based at least in part on pre-analysis of video, and the identifier for the mode and needed references may be encoded within the bitstream for use by the decoder.

In operation, the proposed implementation of the NGV coder (e.g., encoder 100 and/or decoder 200) may use one or more of the above components besides the usual local motion compensation with respect to decoded past and/or future, picture/slices. As such the implementation does not mandate a specific solution for instance for Gain compensation, or for any other characteristics compensated reference frame generation.

Figure 5:
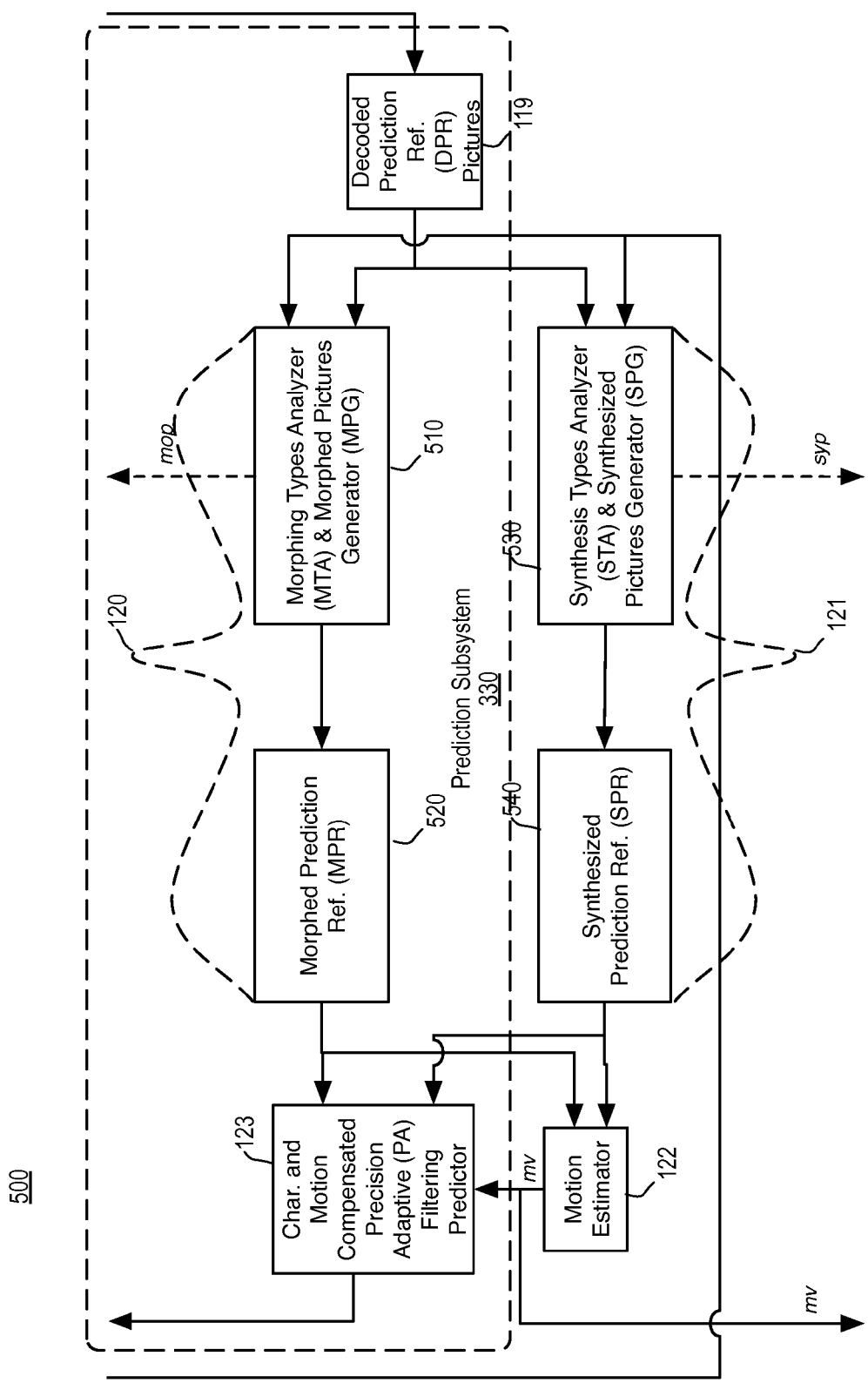
FIG. 5 is an illustrative diagram of an example encoder subsystem.

FIG. 5 is an illustrative diagram of an example encoder prediction subsystem 330 for performing characteristics and motion compensated prediction, arranged in accordance with at least some implementations of the present disclosure. As illustrated, encoder prediction subsystem 330 of encoder 500 may include decoded picture buffer 119, morphing analyzer and generation module 120, synthesizing analyzer and generation module 121, motion estimator module 122, and/or characteristics and motion compensated precision adaptive filtering predictor module 123.

As shown, the output of quality analyzer and quality restoration filtering may be transmitted to decoded picture buffer 119. In some examples, the output of quality analyzer and quality restoration filtering may be a final reconstructed frame that may be used for prediction for coding other frames (e.g., the final reconstructed frame may be a reference frame or the like). In encoder 500, prediction operations may include inter- and/or intra-prediction. As shown in FIG. 5, inter-prediction may be performed by one or more modules including morphing analyzer and generation module 120, synthesizing analyzer and generation module 121, and/or characteristics and motion compensated precision adaptive filtering predictor module 123.

Morphing analyzer and generation module 120 may include a morphing types analyzer (MTA) and a morphed pictures generator (MPG) 510 as well as a morphed prediction reference (MPR) buffer 520. Morphing types analyzer (MTA) and a morphed pictures generator (MPG) 510 may analyze a current picture to determine parameters for changes in gain, changes in dominant motion, changes in registration, and changes in blur with respect to a reference frame or frames with which it is to be coded. The determined morphing parameters may be quantized/de-quantized and used (e.g., by morphing analyzer and generation module 120) to generate morphed reference frames. Such generated morphed reference frames may be stored in morphed prediction reference (MPR) buffer 520 and may be used by motion estimator module 122 for computing motion vectors for efficient motion (and characteristics) compensated prediction of a current frame.

Synthesizing analyzer and generation module 121 may include a synthesis types analyzer (STA) and synthesized pictures generator 530 as well as a synthesized prediction reference (MPR) buffer 540. Synthesis types analyzer (STA) and synthesized pictures generator 530 may generate super resolution (SR) pictures and projected interpolation (PI) pictures or the like for determining motion vectors for efficient motion compensated prediction in these frames. Such generated synthesized reference frames may be stored in synthesized prediction reference (MPR) buffer 540 and may be used by motion estimator module 122 for computing motion vectors for efficient motion (and characteristics) compensated prediction of a current frame.

Motion estimator module 122 may generate motion vector data based at least in part on morphed reference frame(s) and/or super resolution (SR) pictures and projected interpolation (PI) pictures along with the current frame. In some examples, motion estimator module 122 may be considered an inter-prediction module. For example, the motion vector data may be used for inter-prediction. If inter-prediction is applied, characteristics and motion filtering predictor module 123 may apply motion compensation as part of the local decode loop as discussed.

Figure 6:
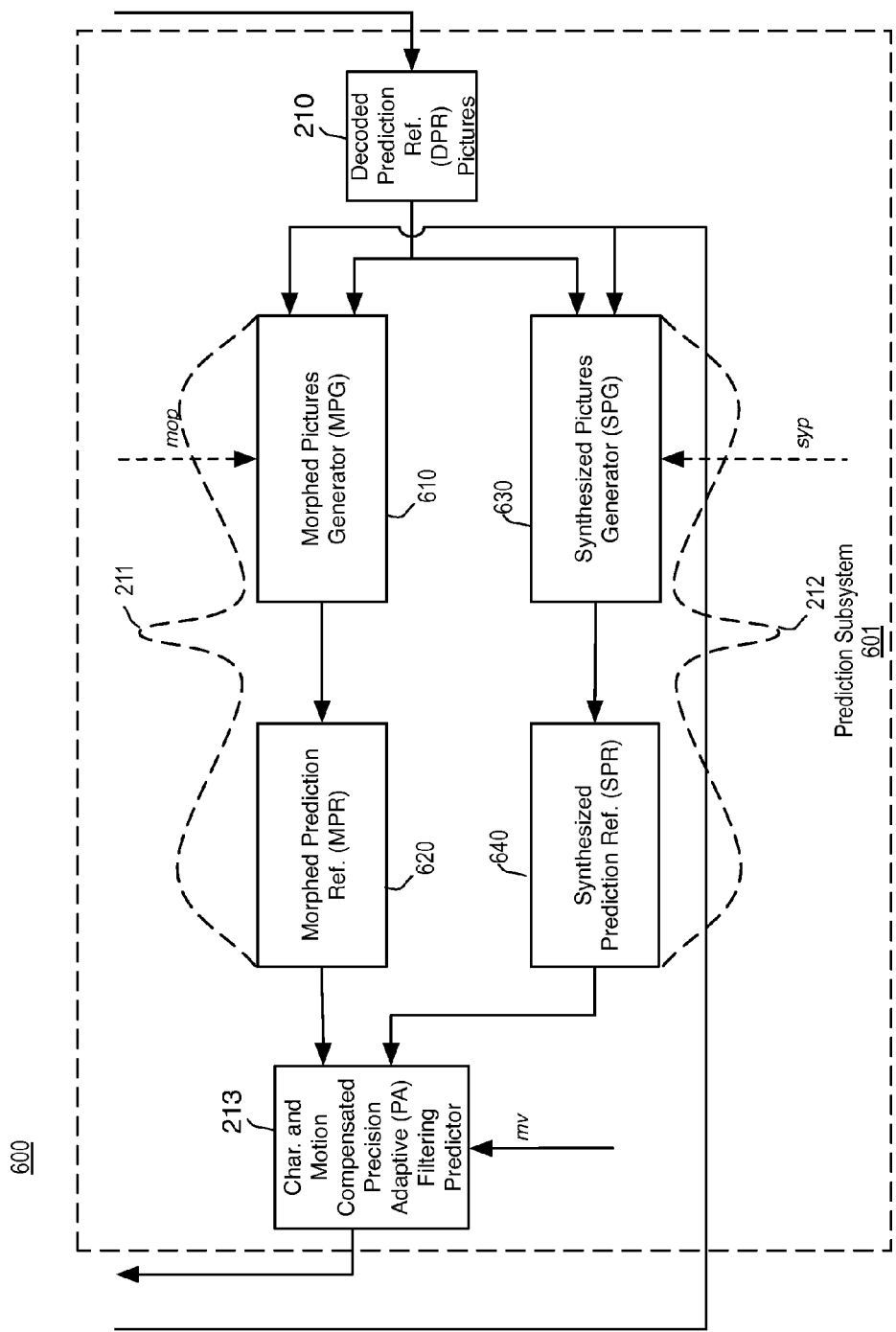
FIG. 6 is an illustrative diagram of an example encoder subsystem.

FIG. 6 is an illustrative diagram of an example decoder prediction subsystem 601 for performing characteristics and motion compensated prediction, arranged in accordance with at least some implementations of the present disclosure. As illustrated, decoder prediction subsystem 601 of decoder 600 may include decoded picture buffer 210, morphing analyzer and generation module 211, synthesizing analyzer and generation module 212, and/or characteristics and motion compensated precision adaptive filtering predictor module 213.

As shown, the output of quality restoration filtering module may be transmitted to decoded picture buffer 210. In some examples, the output of quality restoration filtering module may be a final reconstructed frame that may be used for prediction for coding other frames (e.g., the final reconstructed frame may be a reference frame or the like). As discussed, compensation due to prediction operations may include inter- and/or intra-prediction compensation. As shown, inter-prediction compensation may be performed by one or more modules including morphing analyzer and generation module 211, synthesizing analyzer and generation module 212, and/or characteristics and motion compensated precision adaptive filtering predictor module 213.

Morphing analyzer and generation module 211 may include a morphed pictures generator (MPG) 610 as well as a morphed prediction reference (MPR) buffer 620. Morphed pictures generator (MPG) 610 may use de-quantized morphing parameters (e.g., determined from input bitstream) to generate morphed reference frames. Such generated morphed reference frames may be stored in morphed prediction reference (MPR) buffer 620 and may be used by characteristics and motion compensated precision adaptive filtering predictor module 213.

Synthesizing analyzer and generation module 212 may include a synthesized pictures generator 630 as well as a synthesized prediction reference (MPR) buffer 640. Synthesized pictures generator 630 may be configured to generate one or more types of synthesized prediction reference pictures such as super resolution (SR) pictures and projected interpolation (PI) pictures or the like based at least in part on parameters determined from input bitstream 201. Such generated synthesized reference frames may be stored in synthesized prediction reference (MPR) buffer 540 and may be used by motion compensated filtering predictor module 213.

If inter-prediction is applied, characteristics and motion compensated filtering predictor module 213 may apply motion compensation based at least in part on morphed reference frame(s) and/or super resolution (SR) pictures and projected interpolation (PI) pictures along with the current frame.

Figure 7:
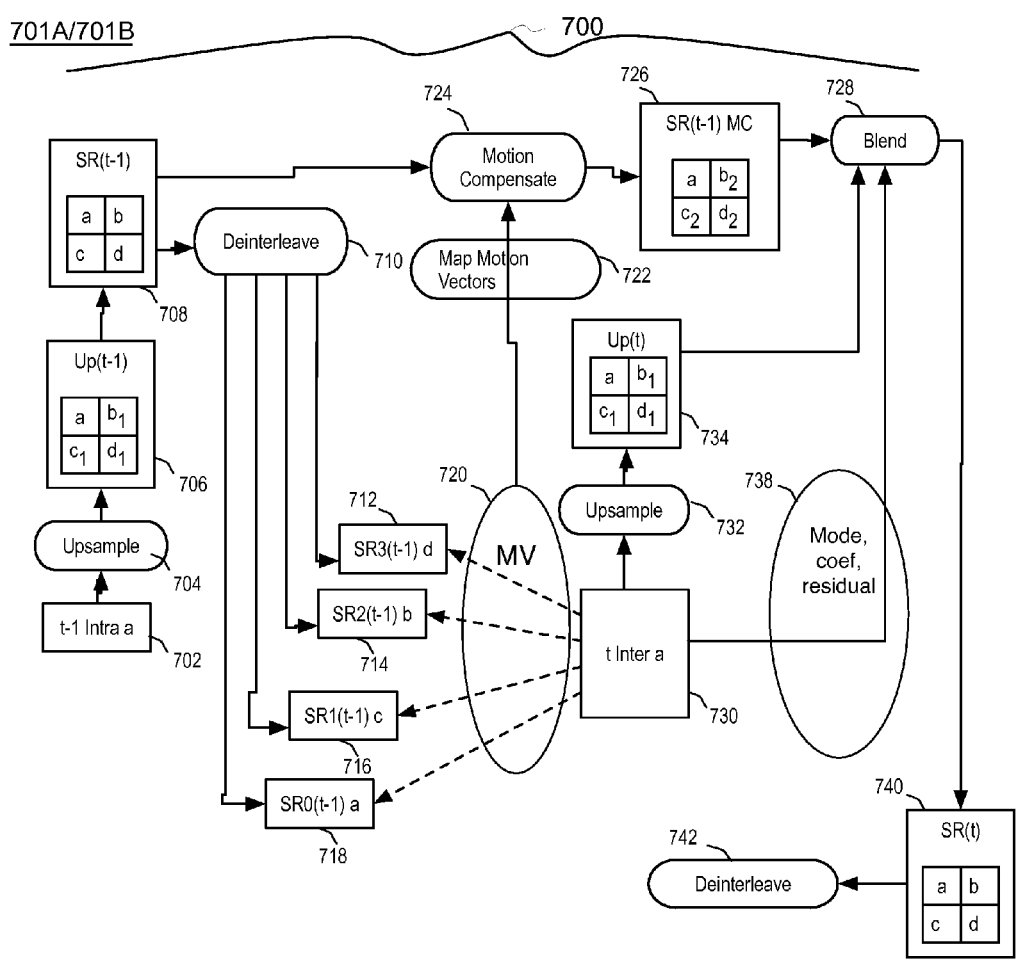
FIG. 7 is a flow diagram illustrating an example coding process.

FIG. 7 is an illustrative diagram of an example encoder super resolution subsystem 700 for performing motion compensated prediction, arranged in accordance with at least some implementations of the present disclosure. As illustrated, encoder super resolution subsystem 700 may include one or more upsample modules 704/732, one or more deinterleave modules 710/742, a map motion vectors module 722, a motion compensation module 724, and/or a blend module 728.

Content Adaptive Super Resolution Prediction Algorithm

Below, is listed one Super Resolution (SR) procedure 701A, including the following operations, which may be carried out via system 700:

1. First SR Hypothesis: First SR hypothesis may be created by up-sampling (e.g., via upsample module 704) the intra picture (e.g., illustrated item 702) using a high quality up-sampling filter. An SR Picture (e.g., illustrated item 708) may be twice in resolution. The coded Intra image may be the TopLeft Pixel(a). The TopRight (b1), BottomLeft (c1), BottomRight(d1) pixels may be the up-sampled hypothesis.

For example, such upsampling may be performed consistent with the upsampling filter listed below:

Upsampling Filter

TABLE 14

Example Upsampling Filter

| Coeff [indx] | 11 | −50 | 220 | 220 | −50 | 11 |
|---|---|---|---|---|---|---|
| indx | 0 | 1 | 2 | 3 | 4 | 5 |

For example, such upsampling may be performed consistent with the upsampling operations listed below:

Upsampling Operation $b_1[i][j]$=(Coeff[0]*$a[i][j-2]$+Coeff[1]*$a[i][j-1]$+Coeff[2]*$a[i][j]$+Coeff[3]*$a[i][j+1]$+Coeff[4]*$a[i][j+2]$+Coeff[5]*$a[i][j+3]$)*181)>>16

$c_1[[i][j]$=(Coeff[0]*$a[i-2][j]$+Coeff[1]*$a[i-1][j]$+Coeff[2]*$a[i][j]$+Coeff[3]*$a[i+1][j]$+Coeff[4]*$a[i+2][j]$+Coeff[5]*$a[i+3][j]$)*181)>>16

$d_1[[i][j]$=(Coeff[0]*$c_1[i][j-2]$+Coeff[1]*$c_1[i][j-1]$+Coeff[2]*$c_1[i][j]$+Coeff[3]*$c_1[i][j+1]$+Coeff[4]*$c_1[i][j+2]$+Coeff[5]*$c_1[i][j+3]$)*181)>>16

2. De-interleave (e.g., via deinterleave module 710) the SR image into 4 original resolution pictures (e.g., illustrated item 712-718) for motion estimation.

3. Use de-interleaved SR images (e.g., illustrated item 712-718) as references SR0-3 for coding the inter picture (e.g., illustrated item 730).

4. Create a new SR picture by using the coded inter picture (e.g., illustrated item 730) as the TopLeft pixel.

5. Map (e.g., via map motion vectors module 722) coded motion vectors (e.g., illustrated item 720) to SR resolution.

For example, map motion vectors module 722 may perform consistent with the operations listed below in Table 15:

TABLE 15

Example of MV Adjustment based on phase of a set of SR samples MMapB( )

| a MV Reference | SR0 | | | | | | | | SR1 | SR2 | SR3 |
|---|---|---|---|---|---|---|---|---|---|---|---|
| a MV Phase (y, x) | 0.0 | 0.1 | 0.2 | 0.3 | 0.4 | 0.5 | 0.6 | 0.7 | * | * | * |
| | 1.0 | 1.1 | 1.2 | 1.3 | 1.4 | 1.5 | 1.6 | 1.7 | | | |
| | 2.0 | 2.1 | 2.2 | 2.3 | 2.4 | 2.5 | 2.6 | 2.7 | | | |
| | 3.0 | 3.1 | 3.2 | 3.3 | 3.4 | 3.5 | 3.6 | 3.7 | | | |
| | 4.0 | 4.1 | 4.2 | 4.3 | 4.4 | 4.5 | 4.6 | 4.7 | | | |
| | 5.0 | 5.1 | 5.2 | 5.3 | 5.4 | 5.5 | 5.6 | 5.7 | | | |
| | 6.0 | 6.1 | 6.2 | 6.3 | 6.4 | 6.5 | 6.6 | 6.7 | | | |
| | 7.0 | 7.1 | 7.2 | 7.3 | 7.4 | 7.5 | 7.6 | 7.7 | | | |

TABLE 15-continued

Example of MV Adjustment based on phase of a set of SR samples MMapB( )

| a MV Reference | | | SR0 | | | | | SR1 | SR2 | SR3 |
|---|---|---|---|---|---|---|---|---|---|---|
| $b_2$ Reference | SR1 | 1 | 1 | SR0 | 0 | 0 | SR1 | 1 | SR0 | SR3 | SR2 |
| | 1 | 1 | 1 | 0 | 0 | 0 | 1 | 1 | | | |
| | 1 | 1 | 1 | 0 | 0 | 0 | 1 | 1 | | | |
| | SR3 | 3 | 3 | SR2 | 2 | 2 | SR3 | 3 | | | |
| | 3 | 3 | 3 | 2 | 2 | 2 | 3 | 3 | | | |
| | 3 | 3 | 3 | 2 | 2 | 2 | 3 | 3 | | | |
| | SR1 | 1 | 1 | SR0 | 0 | 0 | SR1 | 1 | | | |
| | 1 | 1 | 1 | 0 | 0 | 0 | 1 | 1 | | | |
| $b_2$ MVx Adjust | 0 | 0 | 0 | +4 | +4 | +4 | 0 | 0 | +8 | 0 | +8 |
| | 0 | 0 | 0 | +4 | +4 | +4 | 0 | 0 | | | |
| | 0 | 0 | 0 | +4 | +4 | +4 | 0 | 0 | | | |
| | 0 | 0 | 0 | +4 | +4 | +4 | 0 | 0 | | | |
| | 0 | 0 | 0 | +4 | +4 | +4 | 0 | 0 | | | |
| | 0 | 0 | 0 | +4 | +4 | +4 | 0 | 0 | | | |
| | 0 | 0 | 0 | +4 | +4 | +4 | 0 | 0 | | | |
| | 0 | 0 | 0 | +4 | +4 | +4 | 0 | 0 | | | |
| $b_2$ MVy Adjust | 0 | 0 | 0 | 0 | 0 | 0 | 0 | 0 | 0 | 0 | 0 |
| | 0 | 0 | 0 | 0 | 0 | 0 | 0 | 0 | | | |
| | 0 | 0 | 0 | 0 | 0 | 0 | 0 | 0 | | | |
| | -4 | -4 | -4 | -4 | -4 | -4 | -4 | -4 | | | |
| | -4 | -4 | -4 | -4 | -4 | -4 | -4 | -4 | | | |
| | -4 | -4 | -4 | -4 | -4 | -4 | -4 | -4 | | | |
| | 0 | 0 | 0 | 0 | 0 | 0 | 0 | 0 | | | |
| | 0 | 0 | 0 | 0 | 0 | 0 | 0 | 0 | | | |

6. Generate (e.g., via motion compensation module 724) a MC SR Hypothesis (e.g., illustrated item 726) using prediction from previous SR picture for the TopRight(b2), BottomLeft(c2), BottomRight(d2) pixels.

For example, motion compensation module 724 may perform consistent with the operations listed below:

SR Motion Compensation (assuming 4×4 block size and ⅛ Pel Motion)

1. Compute Phase of transmitted Motion vector of given block $aPhx = aMVx \& 0x7$ $aPhy = aMVy \& 0x7$ 2. Lookup Ref Frame and Motion Offset for pixels $b_2$, (and similarly for $c_2$, & $d_2$) using transmitted Ref Frame selection and Motion phase.

$bRef[i/4][j/4] = MMapB\_Reference(aRef[i/4][j/4], aPhx, aPhy)$ $bOffx = MMapB\_MVxAdjust(aRef[i/4][j/4], aPhx, aPhy)$ $bOffy = MMapB\_MVyAdjust(aRef[i/4][j/4], aPhx, aPhy)$ 3. Compute new motion vector for pixels $b_2$, (and similarly for $c_2$, & $d_2$)

$bMVx[i/4][j/4] = aMVx[i/4][j/4] + boffx$ $bMVy[i/4][j/4] = aMVy[i/4][j/4] + boffy$ 4. Compute motion compensated block with respect to reference frame bRef using Motion Vector (bMVx, bMVy)

7. Generate (e.g., via upsample module 732) a Non MC SR hypothesis (e.g., illustrated item 734) by up-sampling the coded inter picture (e.g., illustrated item 730).

8. Generate (e.g., via blend module 728) Final SR (e.g., illustrated item 740) using video coding (e.g., mode, reference, number of transform coefficients) information (e.g., illustrated item 738) from decoded bitstream.

a. If block may be coded intra, copy the Non MC SR block to Final SR.

b. If block may be skipped, copy the MC SR block to Final SR.

c. Else find blending factor using mode, reference, & number of transform coefficients.

i. Blend MC SR and Non MC SR block using blending factors to create Final SR block.

For example, blend module 728 may perform consistent with the operations listed below in table 16:

Blending Factors

TABLE 16

Blending Factors based on 4 × 4 blocks

| Blk Mode | Scaled Num Coeff | Reference Frame | $W^1$ | $W^2$ |
|---|---|---|---|---|
| Intra | * | * | 4 | 0 |
| Inter | >=4 | * | 4 | 0 |
| Inter | 1-3 | SR0-3 | 2 | 2 |
| Inter | 1-3 | !(SR0-3) | 4 | 0 |
| Inter | 0 | SR0-3 | 1 | 3 |
| Inter | 0 | !(SR0-3) | 4 | 0 |
| Skip | * | * | 0 | 4 |

(e.g., inter refers to modes of M_AUTO, M_INTER & M_MULTI)

9. De-interleave (e.g., via deinterleave modules 742) the SR image (e.g., illustrated item 740) into 4 original resolution pictures for motion estimation of next frame.

For example, deinterleave modules 742 may perform consistent with the operations listed below:

SR Pixel Generation $b[i][j] = (W_1 * b_1[i][j] + W_2 * b_2[i][j] + 2) >> 2$ $c[i][j] = (W_1 * c_1[i][j] + W_2 * c_2[i][j] + 2) >> 2$ $d[i][j] = (W_1 * d_1[i][j] + W_2 * d_2[i][j] + 2) >> 2$ 10. Use de-interleaved SR images as references SR0-3 for coding the inter picture.

Content Adaptive Super Resolution Prediction Algorithm

Alternate Embodiment

Additionally or alternatively, system 700 may implement Super Resolution (SR) procedure 701B, including the following operations:

1. First SR Hypothesis: First SR hypothesis may be created by up-sampling the intra picture using a high quality up-sampling filter. An SR Picture may be twice in resolution. The coded Intra image may be the TopLeft Pixel(a). The TopRight (b1), BottomLeft (c1), BottomRight(d1) pixels may be the up-sampled hypothesis.

2. De-interleave the SR image into 4 original resolution pictures for motion estimation.

3. Use de-interleaved SR images as references SR0-3 for coding the inter picture.

4. Create new SR picture by using the coded inter picture as the TopLeft pixel.

5. Map coded motion vectors to SR resolution.

6. Generate a MC SR Hypothesis using prediction from previous SR picture for the TopRight(b2), BottomLeft(c2), BottomRight(d2) pixels.

7. Generate a Non MC SR hypothesis by up-sampling the coded inter picture.

8. Up-sample coded inter residual data to correct MC SR picture.

9. Fix the prediction using residual data and coding information.
   a. If block may be coded intra, copy Non MC SR block to Final SR image.
   b. If block may be skipped, copy MC SR block to Final SR image.
   c. If residual data may be coded, add up-sampled residual to MC SR Block to create Final SR block.

10. De-interleave the SR image into 4 original resolution pictures for motion estimation.

11. Use de-interleaved SR images as references SR0-3 for coding the inter picture.

In general, Super Resolution (SR) may be a technique used to create a high resolution reconstruction image of single video frame using many past frames of the video to help fill the missing information. The goal of a good Super Resolution technique may be to be able to produce a reconstructed image better than upsampling alone when tested with known higher resolution video. Classical approaches use iterative techniques and have not found application because of complexity. Faster approaches use upsampling and motion analysis to create a SR frame. All algorithms work with raw video data in pixel domain and usually include Motion Estimation (typically after decoding the compressed video). The complexity of SR methods in addition to video decode may be too high for most applications. There have been various claims regarding the improved visual quality of SR techniques but the quantitative video quality gain of the faster techniques may be negligible.

Some Super Resolution (SR) generation techniques described herein may use coded video codec data to create an inloop Super Resolution frame. The inloop Super Resolution frame may be used again within the coding loop as the name implies. The use of SR in coding loop provides significant gain in the low resolution video coding and thus in the reconstructed Super Resolution video. Process 701A and/or 701B may combine and uses all NGV coding information (e.g., like modes intra, motion, coeff, etc.) along with current decoded frame and past frames (e.g., or future frames if available) to create a high resolution reconstruction of the current frame being decoded. Thus the proposed techniques may be fast not requiring any motion estimation or analysis at the decoder. Process 701A and/or 701B may shift most of the analysis and motion estimation to the encoder as in typical asymmetric compression schemes. The visual quality of the displayed Super Resolution video may have most or all the same benefits as from previous techniques, and there may be reduction in jaggies and increased in perceived resolution.

Even though there might be information transmitted to better create or utilize the SR Frame, the algorithms discussed herein may have no knowledge of the true high resolution image at the decoder. The encoder for typical encoding may have no knowledge of the true high resolution image.

FIG. 8(*a*) is an illustrative diagram of an example Spatial-Temporal Weighting element 800A, arranged in accordance with at least some implementations of the present disclosure. As illustrated, Spatial-Temporal Weighting element 800A may include two inputs, the first that takes in a block of pixels, and the other that takes in another block of pixels. Each of the first set of pixels may be scaled by weighting factor w1 while each the second set of pixels may be scaled by a weighting factor w2=(1−w1) that may be add and normalized to generate a new block each of the same size which includes a weighted combination of pixels form the original two blocks. The block diagram shows a b1 block of 4×4 pixels and a b2 block of 4×4 pixels being combined for instance to generate a weighted block following the equation above that shows generation of b[i][j]. This operation can be applied to blocks of other phases discussed above (blocks c1, c2, and d1, d2) as well.

Figure 8A:
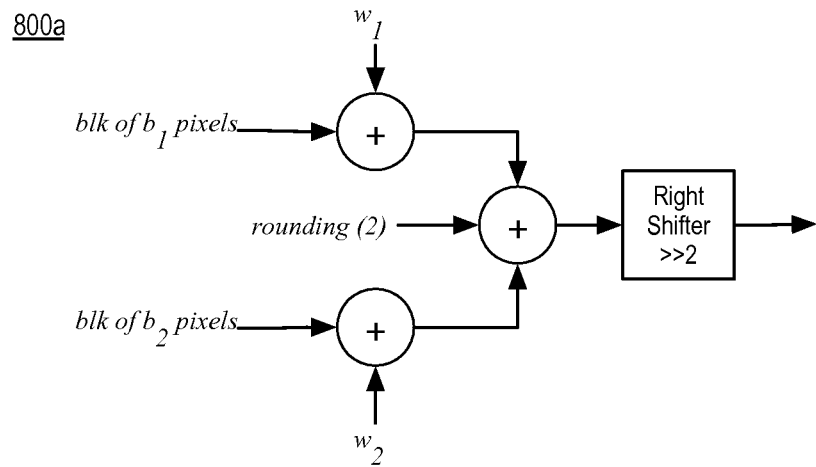
FIG. 8(a) is an illustrative diagram of an example Spatial-Temporal Weighting element.

FIG. 8(*b*) is an illustrative diagram of an example Spatio-Temporal Weighted Blender 800B, arranged in accordance with at least some implementations of the present disclosure. As illustrated, Spatial-Temporal Weighted Blender 800B may use 3 Spatial-Temporal Weighting element 800A units of FIG. 8A to simultaneously process 3 weighted blended blocks from the 6 blocks at its input.

Figure 8B:
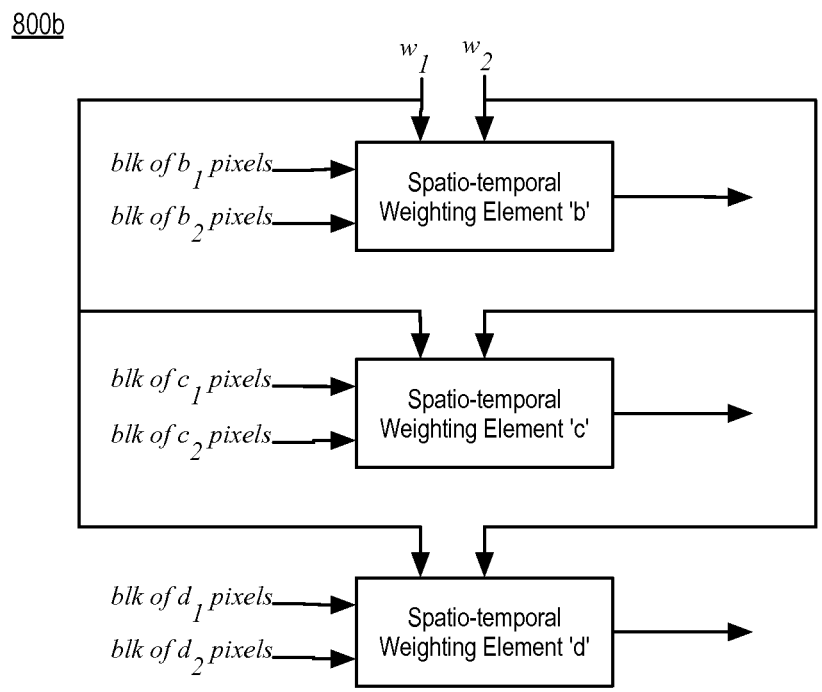
FIG. 8(b) is an illustrative diagram of an example Spatio-Temporal Weighted Blender.

As will be discussed in greater detail below, Spatial-Temporal Weighted Blender 800B of FIG. 8B may be used by SR Ref Pict Gen & Buf (e.g., item 906) of the encoder in FIG. 10 and the decoder of FIG. 11.

Figure 9A:
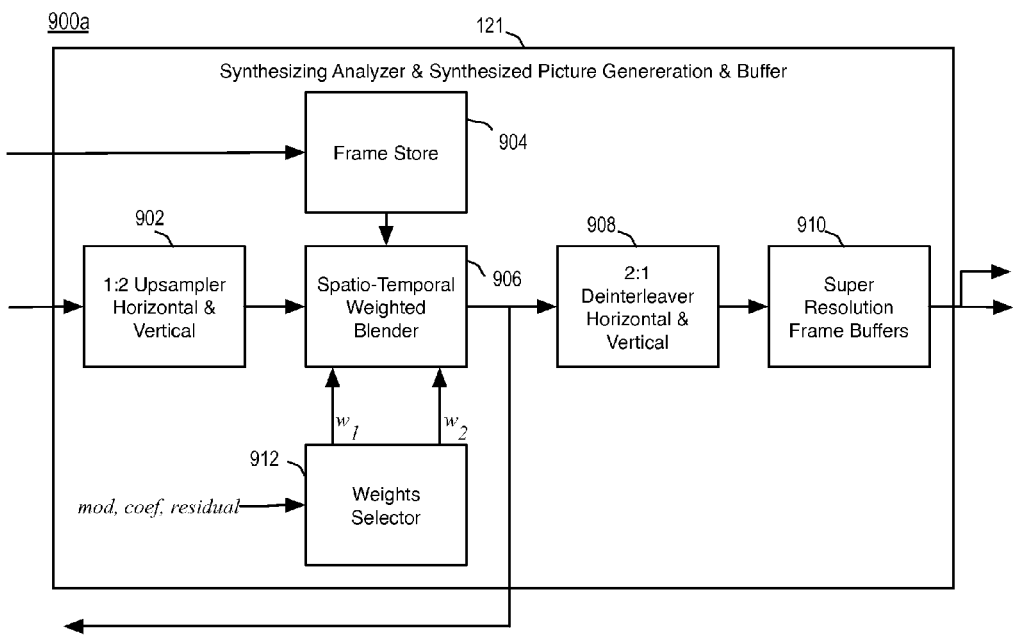
FIG. 9(a) is an illustrative diagram of an example encoder synthesizing analyzer and synthesized picture generation and buffer subsystem.

FIG. 9(*a*) is an illustrative diagram of an example encoder subsystem 900*a*, arranged in accordance with at least some implementations of the present disclosure. Encoder subsystem 900*a* may include 1:2 upsampler horizontal and vertical module 902, frame store module 904, spatio-temporal weighted blender module 906, 2:1 deinterleaver horizontal and vertical module 908, super resolution frame buffers module 910, and/or weights selector module 912. As shown, encoder subsystem 900*a* may be considered a synthesizing analyzer and synthesized picture generation and buffer module 121 of encoder 100.

In the illustrated implementation, 1:2 upsampler horizontal and vertical 902 may be capable of upsampling a picture at a 1:2 ratio in both horizontal and vertical directions.

In the illustrated implementation, frame store 904 may be capable of storing a frame, such as reference frames, past decoded frames, past encoded frames, or the like.

In the illustrated implementation, spatio-temporal weighted blender module 906 may be capable of weighting an upsampled picture by a weight. Spatio-temporal weighted blender module 906 may be capable of weighting a stored frame by one minus a weight. Spatio-temporal weighted blender module 906 may be capable of blending, summing, and scaling a weighted upsampled picture and a weighted stored frame.

In the illustrated implementation, 2:1 deinterleaver horizontal and vertical module 908 may be capable of deinterleaving, at a 2:1 ratio in both horizontal and vertical directions, a blended frame.

In the illustrated implementation, super resolution frame buffers module 910 may be capable of buffering super resolution frames.

In the illustrated implementation, weights selector module 912 may be capable of selecting a weighting factor.

Figure 9B:
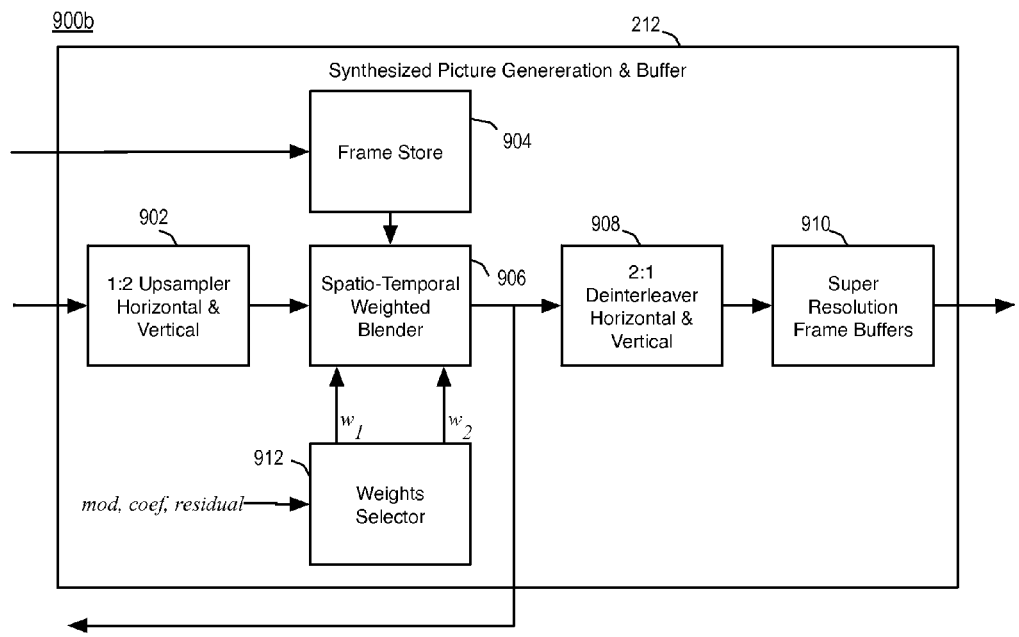
FIG. 9(b) is an illustrative diagram of an example decoder synthesized picture generation and buffer subsystem.

FIG. 9(b) is an illustrative diagram of an example decoder subsystem 900b, arranged in accordance with at least some implementations of the present disclosure. Encoder subsystem 900a may include 1:2 upsampler horizontal and vertical module 902, frame store module 904, spatio-temporal weighted blender module 906, 2:1 deinterleaver horizontal and vertical module 908, super resolution frame buffers module 910, and/or weights selector module 912. As shown, encoder subsystem 900b may be considered a synthesized picture generation and buffer module 212 of decoder 200.

In the illustrated implementation, 1:2 upsampler horizontal and vertical 902 may be capable of upsampling a picture at a 1:2 ratio in both horizontal and vertical directions.

In the illustrated implementation, frame store 904 may be capable of storing a frame, such as reference frames, past decoded frames, past encoded frames, or the like.

In the illustrated implementation, spatio-temporal weighted blender module 906 may be capable of weighting an upsampled picture by a weight. Spatio-temporal weighted blender module 906 may be capable of weighting a stored frame by one minus a weight. Spatio-temporal weighted blender module 906 may be capable of blending, summing, and scaling a weighted upsampled picture and a weighted stored frame.

In the illustrated implementation, 2:1 deinterleaver horizontal and vertical module 908 may be capable of deinterleaving, at a 2:1 ratio in both horizontal and vertical directions, a blended frame.

In the illustrated implementation, super resolution frame buffers module 910 may be capable of buffering super resolution frames.

In the illustrated implementation, weights selector module 912 may be capable of selecting a weighting factor.

Figure 10:
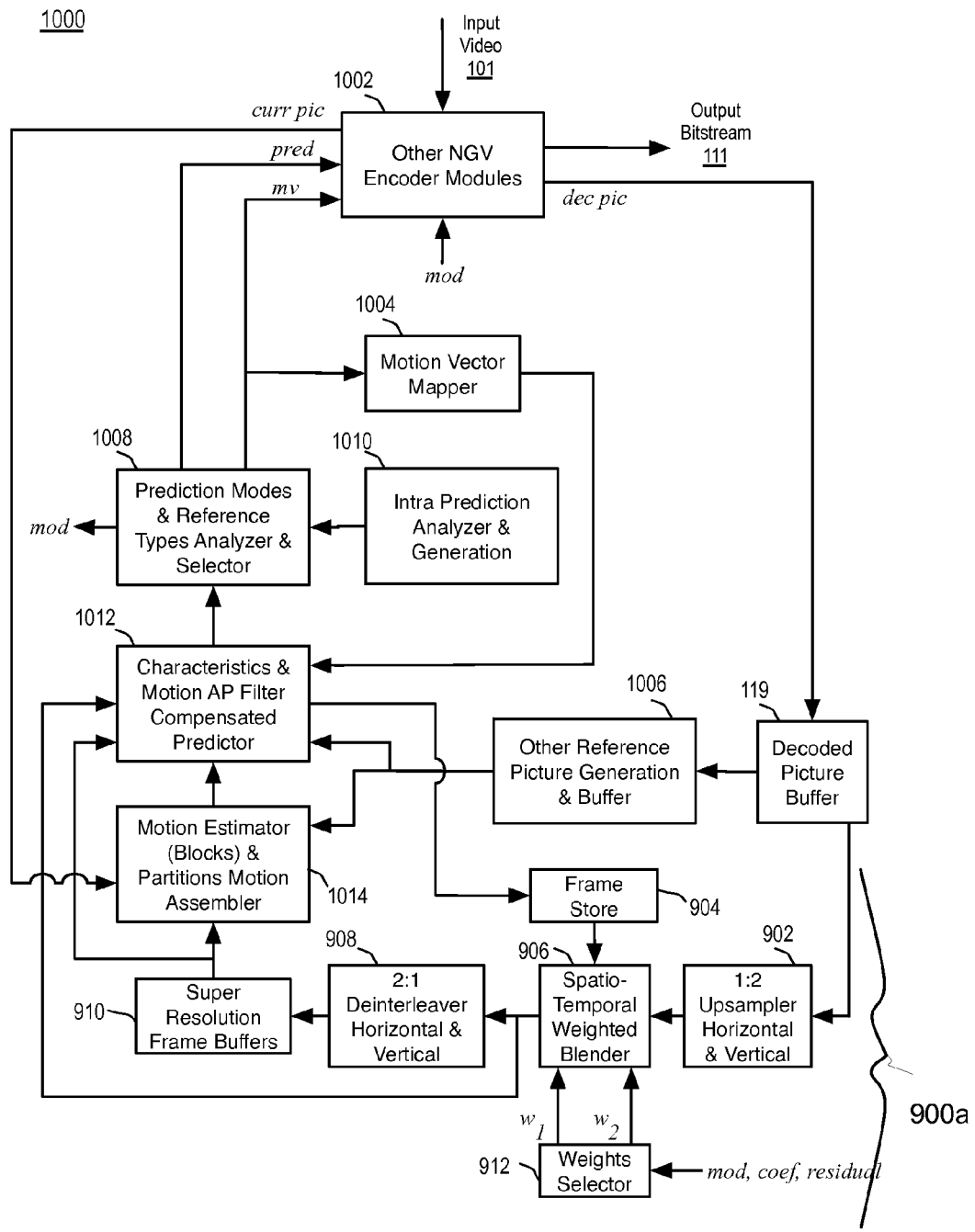
FIG. 10 is an illustrative diagram of an example next generation video encoder.

FIG. 10 is an illustrative diagram of an example encoder 1000, arranged in accordance with at least some implementations of the present disclosure. Next generation video encoder 1000 may include input video 101, output bitstream 111, decoded picture buffer module 119, 1:2 upsampler horizontal and vertical module 902, frame store module 904, spatio-temporal weighted blender module 906, 2:1 deinterleaver horizontal and vertical module 908, super resolution frame buffers module 910, weights selector module 912, other NGV encoder modules 1002, motion vector mapper module 1004, other reference picture generation and buffer module 1006, prediction modes and reference types analyzer and selector module 1008, intra prediction analyzer and generation module 1010, characteristics and motion AP filter compensated predictor module 1012, and/or motion estimator (blocks) and partitions motion assembler module 1014.

As illustrated, video (vidsrc) may be input into a unit (e.g., other NGV encoder modules 1002) that effectively includes the non SR components of the encoder (e.g., Picture Structure Organizer, Prediction Coding Partitioner & Assembler, Subtractor, Encode Controller, Transform coder (e.g., Encoder/Decoder), Entropy Encoder, Deblock (DB) Filtering Analyzer & Generator, and Quality Restoration (QR) Filtering Analyzer & Generator). The output of this unit may be shown as encoded bitstream (btstr). The prediction loop may be shown external to this unit in order to show how SR integrates in this loop and may be described next.

A decoded picture (dec pic) may be input to Decoded Picture) Buffer 119 and may be used by SR Ref Pict Gen & Buf 900a that includes an 1:2 Upsampler Horizontal & Vertical 902, Spatio-Temporal Weighted Blender 906, 2:1 Deinterleaver Hor & Vert, and SR Frame Buffers 908 (SR0 Frm a, SR1 Frm b, SR2 Frm c, and SR3 Frm d). The 1:2 Upsampler 902 upsamples decoded picture by factor of 2 in each direction resulting in a picture that may be 4 times the size of the dec pic. Example filters used for this upsampling were discussed earlier. Next, the Wtd Blender 906 creates a blending of this frame by weighting it by w1, with another frame of same size (from Frame Store) by weighting it by w2=(1−w1), summing and scaling. The blended frame may be then 2:1 deinterleaved in each direction to separate it into 4 smaller frames that may be then stored into SR0 Frm a, SR1 Frm b, SR2 Frm c, and SR3 Frm d, that may be then used as reference pictures by Motion Estimator & Partitions motion Assembler 1014, at the other input of which may be the next picture to be coded. Also, input to the Motion Estimator 1014 may be other reference pictures, for instance for other Synthesized Prediction, or Morphed Prediction Generation that may be not discussed here.

Motion Estimator 1014 performs motion estimation on blocks (that may be then used to form partitions) resulting in motion vectors of partitions that may be then provided to the Characteristics & Motion AP (Adaptive Precision) Filtering Compensated Predictor 1012 to generate motion compensated partition predictions wrt to each of the 4, SR frames and may be input to Pred Mode & Refs Analyzer & Selector 1008 to select on a partition basis the best prediction from the SR choices as well as other synthesized prediction and morphed prediction choices, as well as intra prediction choice. The output of the Pred Mode & Refs Analyzer & Selector 1008 not only includes the best prediction but also the corresponding motion vectors that may be needed to be encoded and sent to the decoder. The motion vectors may be then mapped to account for shift in phases for each of SR1 (b pixel block), SR2 (c pixel block), SR3 (d pixel block) frames with respect to SR0 (a pixel block) frame and input to the Char & Motion AP Filt Compensator 1012 that allows use of these motion vectors and the 4 input SR pictures to generate a single higher resolution (4 times normal picture) motion compensated SR frame that may be used for weighted filtering discussed earlier. The motion vectors, mode and reference info may be encoded and included in the bitstream. The generated prediction may be used by encoder 1000 to difference with the original signal followed by transform encoding and entropy encoding, followed by transform decoding, and adding back the prediction to generate decoded pictures, thus completing the encoding loop.

Referring to both FIGS. 1 and 10, in operation, video to be compressed may be input to Content PreAnalyzer 102 and then to Adaptive Picture Structure Organizer 104. Content PreAnalyzer 102 may perform analysis of the scene being coded, providing at its output, information about scene changes (scnchg), temporal complexity (tpcpx), spatial complexity (spcpx), temporal prediction distance (pdist), and others. Further, the original video frames at the output of Content PreAnalyzer 102 may be input to Adaptive Picture Structure Organizer 104, which may output control signals indicating picture group structure (pgst), and accordingly picture types (ptyp) of each picture in the group, as well as reordered pictures in encoding order as needed. For reference NGV encoding uses 3 picture types, I- (intra), P- (predictive), and F- (functional) pictures. F-pictures may be noncausal and require reordering of frames for encoding at the encoder (and display at the decoder).

A frame to be coded may be divided into processing units called tiles. Two tile sizes, 32×32, and 64×64, with 64×64 size used for all standard definition and higher size video for coding of all picture types (I-, P-, or F-) and for coding of I- and F-pictures of all sizes, while 32×32 size may be used for P-pictures of lower resolution sequences, may be utilized.

If a picture being coded may be an I-picture, every tile may be further divided in Prediction Partitions Generator 105 into KdTree based partitions that can divide a space (till smallest size may be reached) in one dimension at a time, into either no further division, division into two equal halves, division into two parts ¼ and ¾ of the space, or division into two parts that may be ¾ and ¼ of the space. So, with I-pictures using 64×64 as the largest size (and allowing smallest size of 4×4), a very large number of partitionings of a tile can be generated if no other constraints may be imposed. For example, a constraint that can be placed on 64×64 tile may be that the first pair of cuts may be already pre-decided to halve the space in each dimension. This amounts to starting with a 64×64 and dividing it into 32×32 size subtiles and then subpartitioning each 32×32 by KdTree partitioning; other restrictions may be also possible to reduce number of combinations. These partitions of an I-picture tile may be referred to as prediction partitions, as each tile partitioning may be used for spatial prediction (directional angular prediction or other types of prediction) and coding of prediction differences. Likewise P-picture tiles can also be partitioned in this manner for prediction. A caveat in case of P-pictures may be that for lower resolutions, P-picture partitions start with 32×32 tile and KdTree based partitions may be not used, but rather a simpler B-Tree partitioning may be used. Bi-Tree partitioning divides a space into 2 equal parts only, one dimension at a time, alternating between the two dimensions.

Further P-picture partitions may be mainly predicted using motion (with one or more references) rather than spatial prediction, although some subpartitions can use intra spatial prediction may be also supported to deal with, for instance, uncovered background. For standard definition to higher picture sizes, P-pictures start with 64×64 tile sizes only. Finally, F-pictures also use Bi-Tree partitioning use 64×64 tile sizes for generating prediction partitions that mainly use motion (with one or more partitions), although some subpartitions can also use spatial prediction (for intra coding). In NGV coding, there may be much more to generation of inter prediction than simply using motion vectors to generate prediction and may be discussed elsewhere. In P- and F-picture coding, each sub-partition's prediction may be identified by including a prediction mode (skip, auto, inter, multi, and intra). The output of Prediction Partitions Generator 105 may be literally hundreds of potential partitionings (more or less depending on limits placed) of a tile. These partitionings may be indexed as 1 . . . m and may be provided to Encode Controller 103 to select the best possible prediction partitioning.

The partitioned original blocks may be differenced with prediction blocks (the details of generation of prediction blocks may be discussed later), by, for example, difference 106, to determine if there may be any residual signal worth encoding. Thus not all subpartitions of a tile actually need to be coded (using transform coding) as prediction may have been sufficient for certain subpartitions.

The partitions that can't be compensated by prediction alone require further subpartitioning into smaller partitions for transform coding. For P- and F-pictures, this subpartitioning for coding may be accomplished using Coding Partitions Generator 107 that uses Bi-tree partitioning for coding of prediction difference partitions that require further division, others can simply be coded by motion compensation. In P- or F-pictures, only in some cases (very simple content and/or large quantizer step sizes), the coding partitions may equal the size of the entire tile, the same size used by prediction partitions in these cases. Thus, some P- and F-picture tile may contain no coding partitioning, one coding partitioning, or multiple coding partitionings. These partitionings may be indexed as 1 . . . n and may be provided to Encode Controller 103 to select the best possible combination of prediction and coding partitioning from given choices. As regards I-picture tiles, there may be only prediction partitioning followed by actual transform coding with no further coding partitioning per se, or in other words coding partitioning may be skipped.

The next two blocks (Adaptive Transform 108, and Adaptive Quantize 109) and portion of Encode Controller 103 that perform Quantizer Adaptation were collectively referred to in FIG. 3(a) as Transform Encoder Subsystem 340a, and may be described next.

The partitioning (after prediction partitions for I-pictures, and coding partitions for P- and F-pictures) undergo transform coding in Adaptive Transform 108 unit that performs either forward hybrid PHT transform or forward DCT Transform on rectangular blocks. For HPHT transform, small to medium block sizes may be supported while for DCT transform a large number of block sizes may be supported. The choice of partition/block size, as well as the transform (HPHT vs DCT) employed may be dependent on results of RDO analysis. For HPHT transform some overhead may be needed to identify the direction, either horizontal or vertical in which DCT may be applied while the PHT may be applied in the orthogonal direction, as well as the mode (at least for intra coding where mode can be based on decoded pixels or prediction difference pixels). The actual PHT transform basis used for transforming a particular block may be content adaptive as it depends on decoded neighboring pixels. Since both encoder and decoder require calculation of the same basis matrix, the complexity of calculation may be kept low by allowing a limited number of good transforms known (to both encoder and decoder) that one can select from. As regards the Quantizer Adapter in Encode Controller 103, it performs analysis of content to come up with locally adaptive quantization parameters that may be then represented by a multi-level map that can be efficiently coded and included in the bitstream. The computed quantizer set (qs, and a matrix applied to coefficient block) may be used by Adaptive Quantize 109 unit to perform scaling of coefficients.

The various signals and data items that need to be sent to the decoder, ie, pgst, ptyp, pip, pptn, cptn, modes, reftype, ethp, xmtyp, xmdir, xmmod, idir, my, qs, mop, syp, ddi, qri, api, quant coefficients and others may be then entropy encoded by Content and Context Adaptive Entropy Encoder 110 that in fact includes 7 different entropy coders collectively referred to as Entropy Encoder in FIG. 1.

The encoder of FIG. 1 includes a local decoding loop in the encoder. An important observation needs to be made however that depending on how RDO may be operating, not all of hundreds or more partitionings of a tile may need to be fully coded (sometimes lookup of bitcounts may be sufficient). After the best partitioning of a tile may be however determined, certainly in that case fullcoding may be necessary. The first two units in the decoding loop may be Adaptive Inverse Quantize 112, and Adaptive Inverse Transform 113 (collectively referred to as Transform Decoder Subsystem 370a). The operation of Adaptive Inverse Quantize 112 may be opposite of Adaptive Quantizer 109 unit and basically it unscales the scaled transform coefficients (a lossy process). Further Adaptive Inverse Transform 113 inverts the dequantized transform coefficient blocks to generate blocks of reconstructed prediction difference pixels. For P- and F-pictures, the decoded pixel difference blocks may be re-assembled by Coding Partitions Assembler 114 in the right order. For I-picture tile partitionings, the coding partitions re-assembly process may be skipped. Next in the local decoding loop in the encoder, the prediction signal (inter or intra) may be added to decoded partitions, using the adder 115, and the reconstructed partitions at the output of adder may be assembled by Prediction Partitions Assembler 116.

Next set of steps involve filtering, and intermingling of filtering and prediction generation. Specifically the reconstructed partitions may be deblocked and dithered by Recon Blockiness Analyzer & DD Filt Gen 117; the parameters for analysis ddi may be used for filtering operation and may be also coded and sent to the decoder via the bitstream. The deblocked recon output may be then handed over to quality improvement filter referred to here as Recon Quality Analyzer & QR Filt Gen 118, which computes QR filtering parameters and uses them for filtering. These parameters may be also coded and sent via the bitstream to the decoder. The QR filtered output may be the final reconstructed frame that may be also used as a prediction for coding future frames.

The prediction process includes two main type of prediction: inter prediction, and intra prediction. Inter prediction in FIG. 1 corresponds to a collection of components such as Char and Motion AP Filter Analyzer & ¼ & ⅛ Pel Compensated Predictor, Motion Estimator 4×4 Blocks to ¼ & ⅛ pel Acc 122, Morph Gen & Loc Buf, Synth Gen & Pic Buf, Morph Analyzer & Gen 120, and Synth Analyzer & Gen 121. NGV Codec employs several types of Morphing to generate local buffers/prediction pictures that allow compensation for Gain, Dominant Motion, Registration, Blur prior to motion compensated prediction, as well as several types of synthesized frames (SR (Super Resolution) Pictures, PI (Projected Interpolation) pictures among others) in which motion compensated prediction can result in even higher gains. Morph Analyzer & Gen 120 performs the task of analysis of current picture by computing parameters for changes in gain, changes in dominant motion, changes in registration, and changes in blur with respect to reference frame with which it may be to be coded. The computed mop parameters may be quantized/dequantized and used to generate morphed reference frames that may be used by the motion estimator for computing motion vectors for efficient motion (and characteristics) compensated prediction of current frame. Likewise, Synth Analyzer and Gen 121 performs the task of analysis for generating SR pictures and PI pictures for motion for use by the motion estimator for computing motion vectors for efficient motion compensated prediction in these frames. The details of specific morphing algorithms to compute gain, dominant motion, registration and blur may be outside of the scope of this discussion. Likewise, details of specific techniques for generation of synthesized pictures such as DMC and PI may be outside of the scope of current discussion, while the generation of SR may be the topic of this disclosure and will be discussed in detail a little later.

The intra prediction may be performed via spatial directional prediction and uses decoded neighboring partitions, and since here both the analysis of direction and actual generation of prediction takes place it may be referred to here as Intra Directional Pred Analyzer & Pred Gen 124.

The Prediction Modes and Reference Types Analyzer 125 allows for selection of prediction modes from among, "skip", "auto", "inter", "multi", and "inter", for each partition of tile, all of which apply to P- and F-pictures; this may be shown in Table 11. In addition to prediction modes, it also allows for selection of reference types that can be different depending on "inter" or "multi" mode, as well as for P- and F-pictures; the detailed list of ref types may be shown in Tables 2(a) and 2(b) for P-pictures, and Tables 3(a), 3(b), 3(c), and 3(d) for F-pictures.

TABLE 11

Prediction modes for Partitions of a Tile in P- and F- pictures

| No. | Prediction mode |
|---|---|
| 0. | Intra |
| 1. | Skip |
| 2. | Split |
| 3. | Auto |
| 4. | Inter |
| 5. | Multi |

TABLE 12(a)

Ref Types for Partitions of Tile that have "inter" mode in P-pictures

| No. | Ref Types for Partitions with "inter" mode |
|---|---|
| 0. | MR0n (=past SR0) |
| 1. | MR1n |
| 2. | MR2n |
| 3. | MR3n |
| 4. | MR5n (past SR1) |
| 5. | MR6n (past SR2) |
| 6. | MR7n (past SR3) |
| 7. | MR0d |
| 8. | MR0g |

TABLE 12(b)

Ref Types for Partitions of Tile that have "multi" mode in P-pictures

| No. | Ref Types for partitions with "multi" mode (first Ref Past none, second Ref:) |
|---|---|
| 0. | MR1n |
| 1. | MR2n |
| 2. | MR3n |

TABLE 13(a)

Ref Types for Partitions of Tile that have "inter" mode in F-pictures

| No. | Ref Types for partitions with "inter" mode |
|---|---|
| 0. | MR0n |
| 1. | MR7n (=proj F) |
| 2. | MR3n (=future SR0) |
| 3. | MR1n |
| 4. | MR4n (=Future SR1) |
| 5. | MR5n (=Future SR2) |
| 6. | MR6n (=Future SR3) |
| 7. | MR0d |
| 8. | MR3d |
| 9. | MR0g/MR3g |

TABLE 13(b)

Ref Types for Partitions of Tile that have "multi" mode and Dir 0 in F-pictures

| No. | Ref Types for partitions with "multi" mode and Dir 0 (first Ref Past-none, second Ref:) |
|---|---|
| 0. | MR3n (=future SR0) |
| 1. | MR1n |
| 2. | MR4n (=Future SR1) |
| 3. | MR5n (=Future SR2) |
| 4. | MR6n (=Future SR3) |
| 5. | MR7n (=proj F) |
| 6. | MR3d |
| 7. | MR3g |

TABLE 13(c)

Ref Types for Partitions of Tile that have "multi" mode and Dir 1 in F-pictures

| No. | Ref Types for partitions with "multi" mode and Dir 1 (first Ref MR0n, second Ref:) |
|---|---|
| 0. | MR7n (=proj F) |

TABLE 13(d)

Ref Types for Partitions of Tile that have "multi" mode and Dir 2 in F-pictures

| No. | Ref Types for partitions with Multi-mode and Dir 2 (first Ref MR3n, second Ref:) |
|---|---|
| 0. | MR7n (=proj F) |

The prediction signal at the output of Pred Modes & Ref Types Analyzer & Selector 125 can be filtered by the unit Pred Fusion Analyzer and FI Filt Gen 126 that first analyzes to determine parameters (filtering coefficients, frequency, overhead) to use for this filtering and then actually performs this filtering. The purpose of filtering the prediction signal may be to fuse different types of signal representing different modes, ie, intra, inter, multi, skip, and auto. Since typically, intra prediction signal looks very different than all other types of inter signal/s, properly filtering can be a big contributor to coding efficiency. The filtering parameters, fii, may be encoded in the bitstream 111 for use by the decoder. The filtered prediction forms the second input to the difference 115 that computes the prediction difference signal for coding discussed earlier. Also, the same filtered prediction signal forms a second input to the adder 106, the first input of which may be quantized/dequantized decoded difference signal.

Finally the Context and Content Adaptive Entropy Encoder 110 may be used to encode various types of control data/signals, parameters, modes and ref types, motion vectors, and transform coefficients. It may be based on a generic class of low complexity entropy coders called adaptive variable length coders (vlc). The data to be entropy coded may be divided in to several categories (7 in our case), and starting from generic vlc coders, specialized coders may be developed for each category. This concludes the description of NGV Video Encoder.

Figure 11:
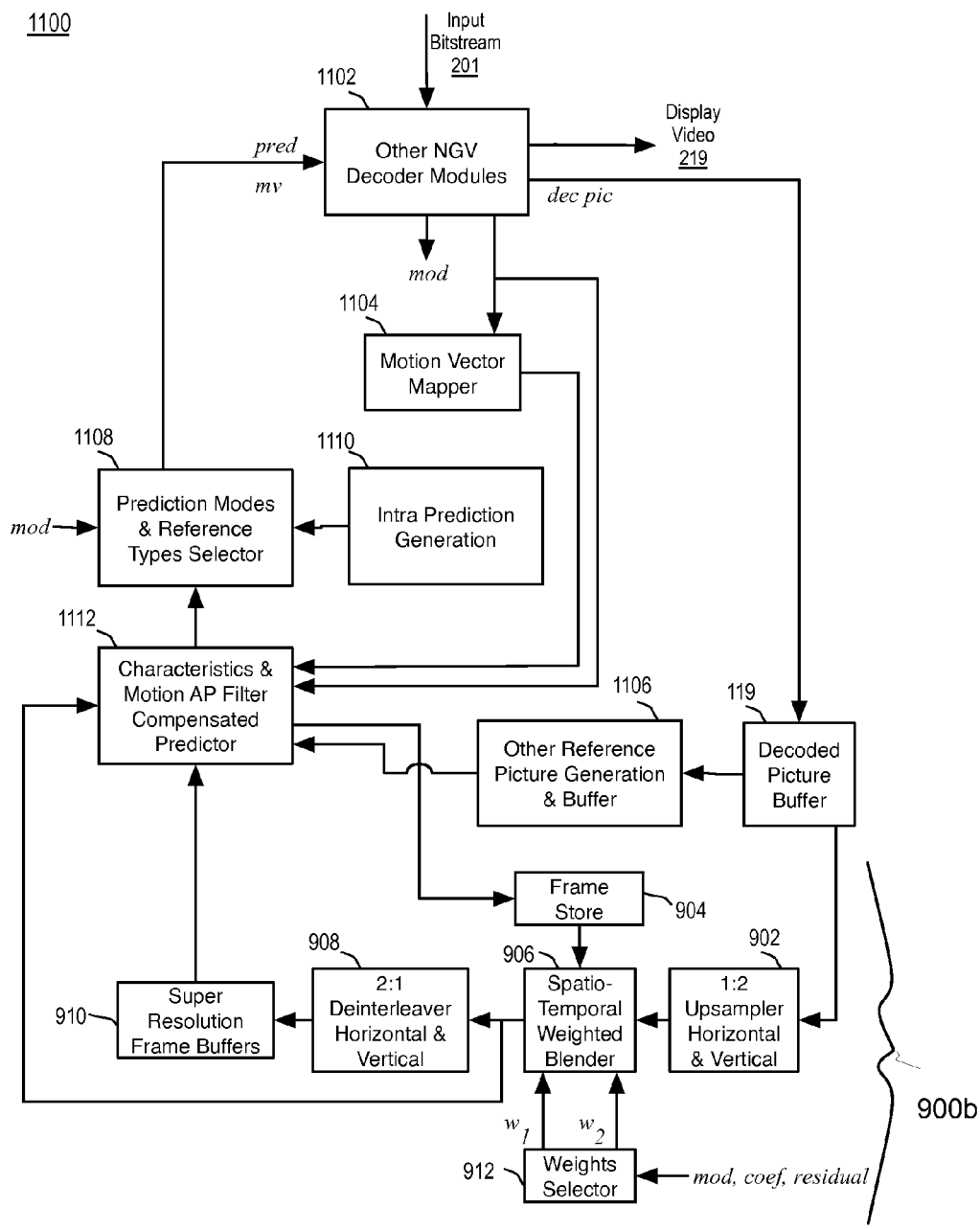
FIG. 11 is an illustrative diagram of an example next generation video decoder.

FIG. 11 is an illustrative diagram of an example decoder 1100, arranged in accordance with at least some implementations of the present disclosure. Next generation video encoder 1100 may include input bitstream 201, display video 219, decoded picture buffer module 119, 1:2 upsampler horizontal and vertical module 902, frame store module 904, spatio-temporal weighted blender module 906, 2:1 deinterleaver horizontal and vertical module 908, super resolution frame buffers module 910, weights selector module 912, other NGV decoder modules 1102, motion vector mapper module 1004, other reference picture generation and buffer module 1106, prediction modes and reference types selector module 1108, intra prediction generation module 1110, and/or characteristics and motion AP filter compensated predictor module 1012.

FIG. 11 shows a detailed view of the corresponding video decoder 1100 that integrates and utilizes the Super Resolution prediction. The encoded video bitstream (bitstr) may be input into a unit (e.g., other NGV decoder modules 1102) that effectively includes the non SR components of the encoder (e.g., Entropy Decoder, Transform Decoder, Coding & Pred Partitions Assembler, Adder, Deblock (DB) Filtering Generator, Quality Restoration (QR) Filtering Generator, and Picture Structure Reorganizer). The output of this unit may be shown as decoded video (viddec). The prediction loop may be shown external to this unit in order to show how SR integrates in this loop and may be described next.

A decoded picture (dec pic) may be input to Decoded Picture Buffer 119 and may be used by SR Ref Pict Gen & Buf 900*b* that may include an 1:2 Upsampler Horizontal & Vertical 902, Spatio-Temporal Weighted Blender 906, 2:1 Deinterleaver Hor & Vert, and SR Frame Buffers 908 (SR0 Frm a, SR1 Frm b, SR2 Frm c, and SR3 Frm d). The 1:2 Upsampler 902 may upsample decoded pictures by factor of 2 in each direction resulting in a picture that may be 4 times the size of the dec pic. Example filters used for this upsampling were discussed earlier. Next, the Wtd Blender 906 may create a blending of this frame by weighting it by w1, with another frame of same size (from Frame Store) by weighting it by w2=(1−w1), summing and scaling. The blended frame may be then 2:1 deinterleaved in each direction to separate it into 4 smaller frames that may be then stored into SR0 Frm a, SR1 Frm b, SR2 Frm c, and SR3 Frm d, that may be then used as reference pictures by Char & Motion AP Filt Compensated Predictor 1112.

Decoder 1100 may not include a motion estimator or mode analysis but instead uses motion vectors sent by the encoder along with other information such as mode and reference information that indicates prediction mode and reference (SR0, 1, 2, 3 or other types of prediction) used by each partition of a frame as well as the corresponding transform coded of prediction differences. The decoded motion vectors of the partitions that use SR prediction may be then mapped to account for shift in phases for each of SR1 (b pixel block), SR2 (c pixel block), SR3 (d pixel block) frames with respect to SR0 (a pixel block) frame and input to the Char & Motion AP Filt Compensator 1112 that allows use of these motion vectors and the 4 input SR pictures to generate a single higher resolution (4 times normal picture) motion compensated SR frame that may be used for weighted filtering discussed earlier. The generated prediction may be used by decoder 1100 to add to the decoded prediction difference signal thus completing the decoding loop.

Overall the SR system described by this disclosure makes good tradeoffs between gains achievable and complexity as compared to existing theoretical SR approaches published in the literature, and simple direct multiple reference prediction approach used by the standards.

Figure 12:
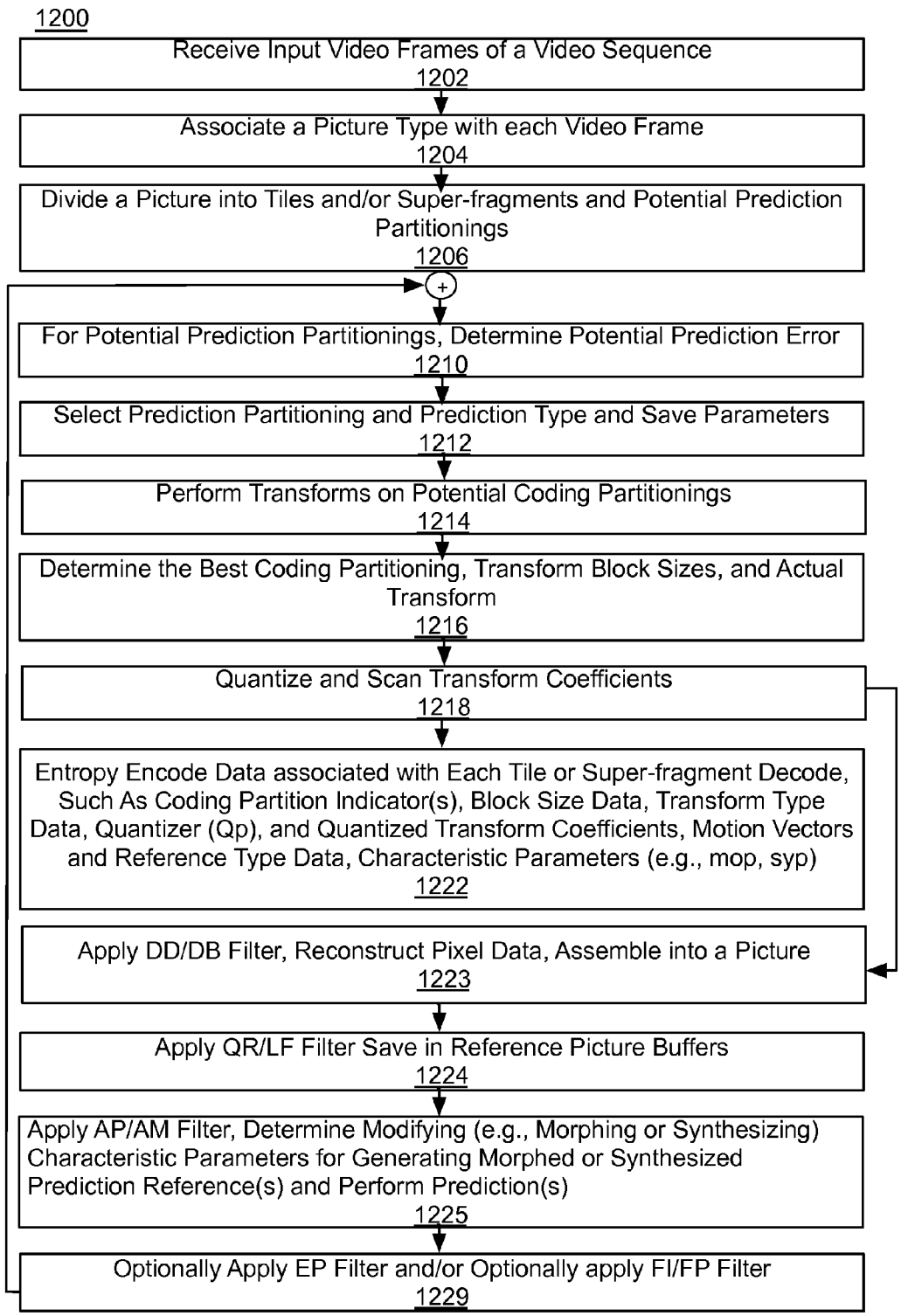
FIG. 12 is a flow diagram illustrating an example encoding process.

FIG. 12 is a flow diagram illustrating an example process 1200, arranged in accordance with at least some implementations of the present disclosure. Process 1200 may include one or more operations, functions or actions as illustrated by one or more operations. Process 1200 may form at least part of a next generation video coding process. By way of non-limiting example, process 1200 may form at least part of a next generation video encoding process as undertaken by encoder system 100 of FIG. 1 and/or any other encoder system or subsystems described herein.

Process 1200 may begin at operation 1202, "Receive Input Video Frames of a Video Sequence", where input video frames of a video sequence may be received via encoder 100 for example.

Process 1200 may continue at operation 1204, "Associate a Picture Type with each Video Frame", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein that may be performed on a frame or picture of a group of pictures and the processing may be repeated for all frames or pictures of a group and then repeated for all groups of pictures in a video sequence.

Process 1200 may continue at operation 1206, "Divide a Picture into Tiles and/or Super-fragments and Potential Prediction Partitionings", where a picture may be divided into tiles or super-fragments and potential prediction partitions via prediction partitions generator 105 for example.

Process 1200 may continue at operation 1210, "For Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 1200 may continue at operation 1212, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based on a rate distortion optimization (RDO).

Process 1200 may continue at operation 1214, "Perform Transforms on Potential Coding Partitionings", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 1200 may continue at operation 1216, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 1200 may continue at operation 1218, "Quantize and Scan Transform Coefficients", where transform coefficients associated with coding partitions (and/or transform blocks) may be quantized and scanned in preparation for entropy coding.

Process 1200 may continue at operation 1222, "Entropy Encode Data associated with Each Tile or Super-fragment Decode, Such As Coding Partition Indicator(s), Block Size Data, Transform Type Data, Quantizer (Qp), and Quantized Transform Coefficients, Motion Vectors and Reference Type Data, Characteristic Parameters (e.g., mop, syp)", where data may be entropy encoded. For example, the entropy encoded data may include the coding partition indicators, block size data, transform type data, quantizer (Qp), quantized transform coefficients, motion vectors and reference type data, characteristic parameters (e.g., mop, syp), the like, and/or combinations thereof. Additionally or alternatively, the entropy encoded data may include prediction partitioning, prediction parameters, the selected coding partitioning, the selected characteristics data, motion vector data, quantized transform coefficients, filter parameters, selection data (such as mode selection data), and indictors.

Process 1200 may continue at operation 1223 "Apply DD/DB Filter, Reconstruct Pixel Data, Assemble into a Picture", where deblock filtering (e.g., DD or DB filters) may be applied, pixel data may be reconstructed, and assembled into a picture. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture.

Process 1200 may continue at operation 1224 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 1200 may continue at operation 1225, "Apply AP/AM Filter, Determine Modifying (e.g., Morphing or Synthesizing) Characteristic Parameters for Generating Morphed or Synthesized Prediction Reference(s) and Perform Prediction(s)", where, modifying (e.g., morphing or synthesizing) characteristic parameters and prediction(s) may be performed and adaptive motion filtering or adaptive precision filtering (e.g., AP/AM Filter) may be applied. For example, modifying (e.g., morphing or synthesizing) characteristic parameters for generating morphed or synthesized prediction reference(s) may be generated and prediction(s) may be performed. Additionally, adaptive motion filtering or adaptive precision filtering may be applied at this point in the process.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to nine reference types may be supported in P-pictures, and up to ten reference types may be supported for F/B-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based on a previously decoded frame generated using at least one of a morphing technique or a synthesizing technique. In such examples, and the bitstream (discussed below with respect to operation 2012) may include a frame reference, morphing parameters, or synthesizing parameters associated with the prediction partition.

Process 1200 may continue at operation 1229 "Optionally Apply EP Filter and/or Optionally apply FI/FP Filter", where enhanced predicted partition (e.g., EP Filtering) or FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

In implementations where both EP Filtering or FI/FP Filtering are available, an indicator may be generated that indicates to the decoder system whether to use the enhanced predicted partition (e.g., EP Filtering) or the predicted partition data as the selected predicted partition for the prediction partition.

Operations 1202 through 1229 may provide for video encoding and bitstream transmission techniques, which may be employed by an encoder system as discussed herein.

FIG. 13 illustrates an example bitstream 1300, arranged in accordance with at least some implementations of the present disclosure. In some examples, bitstream 1300 may correspond to output bitstream 111 as shown in FIG. 1 and/or input bitstream 201 as shown in FIG. 2. Although not shown in FIG. 13 for the sake of clarity of presentation, in some examples bitstream 1300 may include a header portion and a data portion. In various examples, bitstream 1300 may include data, indicators, index values, mode selection data, or the like associated with encoding a video frame as discussed herein.

As discussed, bitstream 1300 may be generated by an encoder such as, for example, encoder 100 and/or received by a decoder 200 for decoding such that decoded video frames may be presented via a display device.

FIG. 14 is a flow diagram illustrating an example process 1400, arranged in accordance with at least some implementations of the present disclosure. Process 1400 may include one or more operations, functions or actions as illustrated by one or more operations. Process 1400 may form at least part of a next generation video coding process. By way of non-limiting example, process 1400 may form at least part of a next generation video decoding process as undertaken by decoder system 200 and/or any other decoder system or subsystems described herein.

Process 1400 may begin at operation 1402, "Receive Encoded Bitstream", where a bitstream may be received. For example, a bitstream encoded as discussed herein may be received at a video decoder. In some examples, bitstream 1300 may be received via decoder 200.

Process 1400 may continue at operation 1404, "Decode the Entropy Encoded Bitstream to Determine Coding Partition Indicator(s), Block Size Data, Transform Type Data, Quantizer (Qp), Quantized Transform Coefficients, Motion Vectors and Reference Type Data, Characteristic Parameters (e.g., mop, syp)", where the bitstream may be decoded to determine coding partition indicators, block size data, transform type data, quantizer (Qp), quantized transform coefficients, motion vectors and reference type data, characteristic parameters (e.g., mop, syp), the like, and/or combinations thereof. Additionally or alternatively, the entropy encoded data may include prediction partitioning, prediction parameters, the selected coding partitioning, the selected characteristics data, motion vector data, quantized transform coefficients, filter parameters, selection data (such as mode selection data), and indictors.

Process 1400 may continue at operation 1406, "Apply Quantizer (Qp) on Quantized Coefficients to Generate Inverse Quantized Transform Coefficients", where quantizer (Qp) may be applied to quantized transform coefficients to generate inverse quantized transform coefficients. For example, operation 1406 may be applied via adaptive inverse quantize module 203.

Process 1400 may continue at operation 1408, "On each Decoded Block of Coefficients in a Coding (or Intra Predicted) Partition Perform Inverse Transform based on Transform Type and Block Size Data to Generate Decoded Prediction Error Partitions", where, on each decode block of transform coefficients in a coding (or intra predicted) partition, an inverse transform based on the transform type and block size data may be performed to generate decoded prediction error partitions. In some examples, the inverse transform may include an inverse fixed transform. In some examples, the inverse transform may include an inverse content adaptive transform. In such examples, performing the inverse content adaptive transform may include determining basis functions associated with the inverse content adaptive transform based on a neighboring block of decoded video data, as discussed herein. Any forward transform used for encoding as discussed herein may be used for decoding using an associated inverse transform. In some examples, the inverse transform may be performed by adaptive inverse transform module 204. In some examples, generating the decoded prediction error partitions may also include assembling coding partitions via coding partitions assembler 205.

Process 1400 may continue at operation 1423 "Apply DD/DB Filter, Reconstruct Pixel Data, Assemble into a Picture", where deblock filtering (e.g., DD or DB filters) may be applied, pixel data may be reconstructed, and assembled into a picture. For example, after inverse scan, inverse transform, and assembling coding partitions, the prediction error data partitions may be added with a prediction partition to generate reconstructed prediction partitions, which may be assembled into tiles or super-fragments. The assembled tiles or super-fragments may be optionally processed via deblock filtering.

Process 1400 may continue at operation 1424 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 1400 may continue at operation 1425, "Apply AP/AM Filter, Use Decoded Modifying Characteristics (e.g., mop, syp) to Generate Modified References for Prediction and Use Motion Vectors and Reference Info, Predicted Partition Info, and Modified References to Generate Predicted Partition", where modified references for prediction may be generated and predicted partitions may be generated as well, and where adaptive motion filtering or adaptive precision filtering (e.g., AP/AM Filter) may be applied. For example, where modified references for prediction may be generated based at least in part on decoded modifying characteristics (e.g., mop, syp) and predicted partitions may be generated based at least in part on motion vectors and reference information, predicted partition information, and modified references. Additionally, adaptive motion filtering or adaptive precision filtering may be applied at this point in the process.

Process 1400 may continue at operation 1429 "Optionally Apply EP Filter and/or Optionally apply FI/FP Filter", where enhanced predicted partition (e.g., EP Filtering) or FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

In implementations where both EP Filtering or FI/FP Filtering are available, an indicator may be received from the encoder system that indicates to the decoder system whether to use the enhanced predicted partition (e.g., EP Filtering) or the predicted partition data as the selected predicted partition for the prediction partition.

Process 1400 may continue at operation 1430, "Add Prediction Partition to the Decoded Prediction Error Data Partition to Generate a Reconstructed Partition", where a prediction partition may be added to the decoded prediction error data partition to generate a reconstructed prediction partition. For example, the decoded prediction error data partition may be added to the associated prediction partition via adder 206.

Process 1400 may continue at operation 1432, "Assemble Reconstructed Partitions to Generate a Tile or Super-Fragment", where the reconstructed prediction partitions may be assembled to generate tiles or super-fragments. For example, the reconstructed prediction partitions may be assembled to generate tiles or super-fragments via prediction partitions assembler module 207.

Process 1400 may continue at operation 1434, "Assemble Tiles or Super-Fragments of a Picture to Generate a Full Decoded Picture", where the tiles or super-fragments of a picture may be assembled to generate a full decoded picture. For example, after optional deblock filtering and/or quality restoration filtering, tiles or super-fragments may be assembled to generate a full decoded picture, which may be stored via decoded picture buffer 210 and/or transmitted for presentment via a display device after processing via adaptive picture re-organizer module 217 and content post-restorer module 218.

Various components of the systems described herein may be implemented in software, firmware, and/or hardware and/or any combination thereof. For example, various components of system 300 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

Some additional and/or alternative details related to process 1200, 1400 and other processes discussed herein may be illustrated in one or more examples of implementations discussed herein and, in particular, with respect to FIG. 15 below.

Figure 15A:
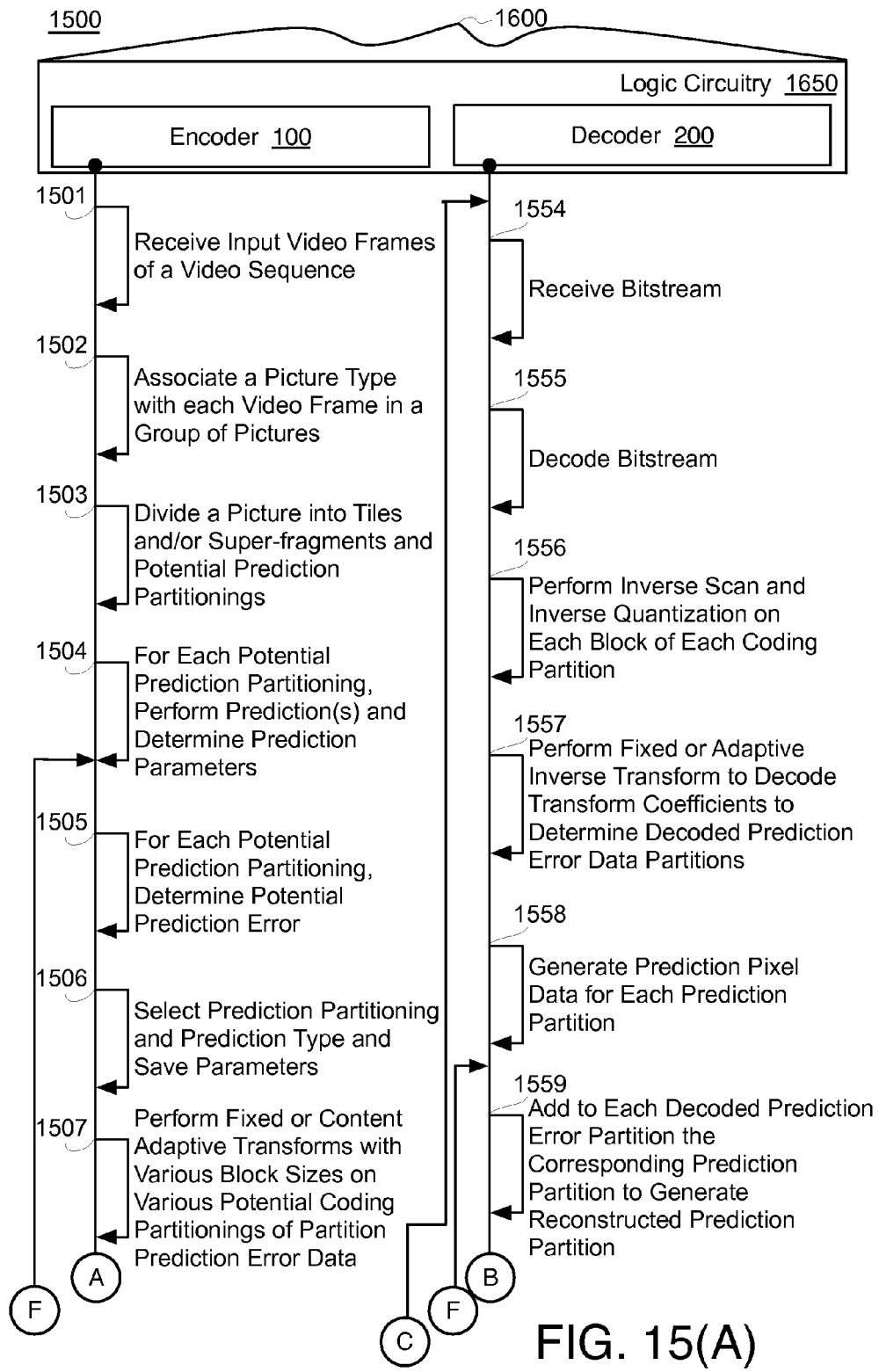
FIGS. 15(A), 15(B), and 15(C) provide an illustrative diagram of an example video coding system and video coding process in operation.
Figure 15B:
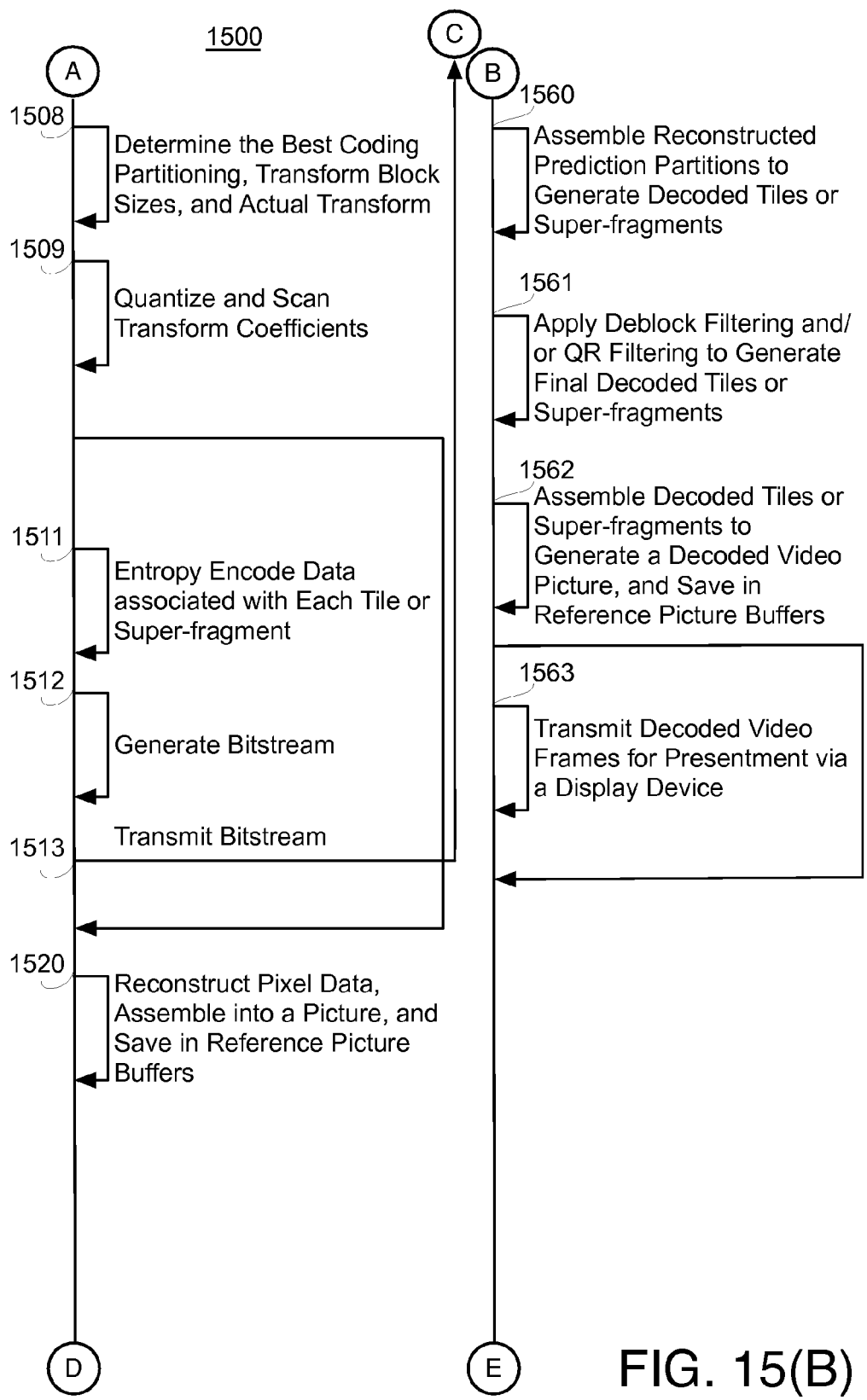
Figure 15C:
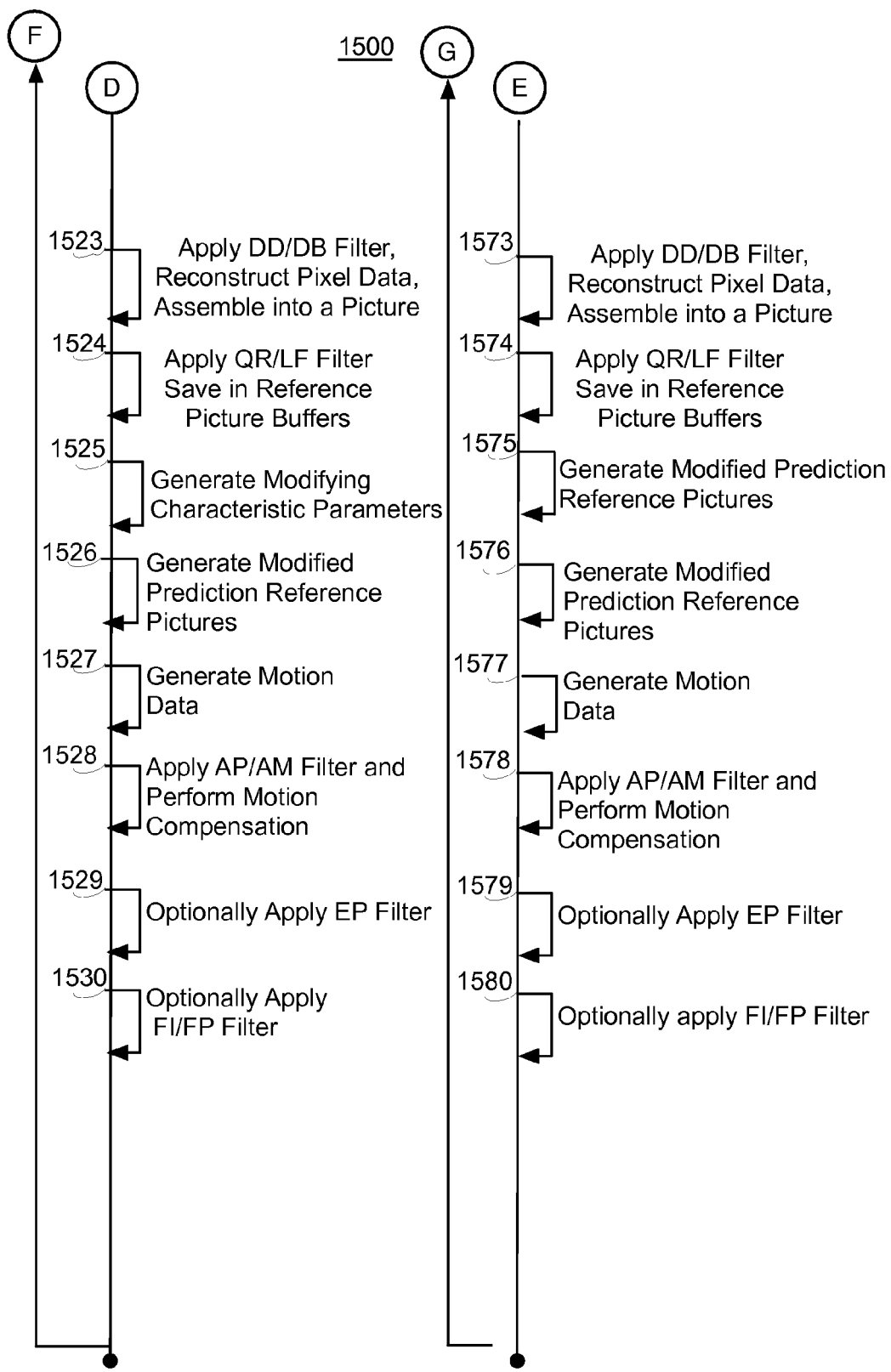

FIGS. 15(A), 15(B), and 15(C) provide an illustrative diagram of an example video coding system 1600 and video coding process 1500 in operation, arranged in accordance with at least some implementations of the present disclosure. In the illustrated implementation, process 1500 may include one or more operations, functions or actions as illustrated by one or more of actions 1501 through 1580. By way of non-limiting example, process 1500 will be described herein with reference to example video coding system 1600 including encoder 100 of FIG. 1 and decoder 200 of FIG. 2, as is discussed further herein below with respect to FIG. 16. In various examples, process 1500 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

In the illustrated implementation, video coding system 1600 may include logic circuitry 1650, the like, and/or combinations thereof. For example, logic circuitry 1650 may include encoder system 100 of FIG. 1 and/or decoder system 200 of FIG. 2 and may include any modules as discussed with respect to any of the encoder systems or subsystems described herein and/or decoder systems or subsystems described herein. Although video coding system 1600, as shown in FIGS. 15(A)-(C) may include one particular set of blocks or actions associated with particular modules, these blocks or actions may be associated with different modules than the particular modules illustrated here. Although process 1500, as illustrated, is directed to encoding and decoding, the concepts and/or operations described may be applied to encoding and/or decoding separately, and, more generally, to video coding.

Process 1500 may begin at operation 1501, "Receive Input Video Frames of a Video Sequence", where input video frames of a video sequence may be received via encoder 100 for example.

Process 1500 may continue at operation 1502, "Associate a Picture Type with each Video Frame in a Group of Pictures", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein (e.g., operations 1503 through 1511) may be performed on a frame or picture of a group of pictures and the processing may be repeated for all frames or pictures of a group and then repeated for all groups of pictures in a video sequence.

Process 1500 may continue at operation 1503, "Divide a Picture into Tiles and/or Super-fragments and Potential Prediction Partitionings", where a picture may be divided into tiles or super-fragments and potential prediction partitions via prediction partitions generator 105 for example.

Process 1500 may continue at operation 1504, "For Each Potential Prediction Partitioning, Perform Prediction(s) and Determine Prediction Parameters", where, for each potential prediction partitionings, prediction(s) may be performed and prediction parameters may be determined. For example, a range of potential prediction partitionings (each having various prediction partitions) may be generated and the associated prediction(s) and prediction parameters may be determined. For example, the prediction(s) may include prediction(s) using characteristics and motion based multi-reference predictions or intra-predictions.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to 9 reference types may be supported in P-pictures, and up to 10 reference types may be supported for F/B-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based on a previously decoded frame generated using at least one of a morphing technique or a synthesizing technique. In such examples, and the bitstream (discussed below with respect to operation 1512) may include a frame reference, morphing parameters, or synthesizing parameters associated with the prediction partition.

Process 1500 may continue at operation 1505, "For Each Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 1500 may continue at operation 1506, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based on a rate distortion optimization (RDO).

Process 1500 may continue at operation 1507, "Perform Fixed or Content Adaptive Transforms with Various Block Sizes on Various Potential Coding Partitionings of Partition Prediction Error Data", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 1500 may continue at operation 1508, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 1500 may continue at operation 1509, "Quantize and Scan Transform Coefficients", where transform coefficients associated with coding partitions (and/or transform blocks) may be quantized and scanned in preparation for entropy coding.

Process 1500 may continue at operation 1511, "Entropy Encode Data associated with Each Tile or Super-fragment", where data associated with each tile or super-fragment may be entropy encoded. For example, data associated with each tile or super-fragment of each picture of each group of pictures of each video sequence may be entropy encoded. The entropy encoded data may include the prediction partitioning, prediction parameters, the selected coding partitioning, the selected characteristics data, motion vector data, quantized transform coefficients, filter parameters, selection data (such as mode selection data), and indictors.

Process 1500 may continue at operation 1512, "Generate Bitstream" where a bitstream may be generated based on the entropy encoded data. As discussed, in some examples, the bitstream may include a frame or picture reference, morphing parameters, or synthesizing parameters associated with a prediction partition.

Process 1500 may continue at operation 1513, "Transmit Bitstream", where the bitstream may be transmitted. For example, video coding system 1600 may transmit output bitstream 111, bitstream 1300, or the like via an antenna 1602 (please refer to FIG. 16).

Process 1500 may continue at operation 1520, "Reconstruct Pixel Data, Assemble into a Picture, and Save in Reference Picture Buffers", where pixel data may be reconstructed, assembled into a picture, and saved in reference picture buffers. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture. The picture may be saved in decoded picture buffer 119 as a reference picture for prediction of other (e.g., following) pictures.

Process 1500 may continue at operation 1523 "Apply DD/DB Filter, Reconstruct Pixel Data, Assemble into a Picture", where deblock filtering (e.g., DD or DB filters) may be applied, pixel data may be reconstructed, and assembled into a picture. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture.

Process 1500 may continue at operation 1524 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 1500 may continue at operation 1525, "Generate Modifying Characteristic Parameters", where, modified characteristic parameters may be generated. For example, a second modified prediction reference picture and second modifying characteristic parameters associated with the second modified prediction reference picture may be generated based at least in part on the second decoded prediction reference picture, where the second modified reference picture may be of a different type than the first modified reference picture.

Process 1500 may continue at operation 1526, "Generate Modified Prediction Reference Pictures", where modified prediction reference pictures may be generated, for example, a first modified prediction reference picture and first modifying characteristic parameters associated with the first modified prediction reference picture may be generated based at least in part on the first decoded prediction reference picture.

Process 1500 may continue at operation 1527, "Generate Motion Data", where, motion estimation data may be generated. For example, motion data associated with a prediction partition of a current picture may be generated based at least in part on one of the first modified prediction reference picture or the second modified prediction reference picture.

Process 1500 may continue at operation 1528, "Apply AP/AM Filter Perform Motion Compensation", where, motion compensation may be performed. For example, motion compensation may be performed based at least in part on the motion data and at least one of the first modified prediction reference picture or the second modified prediction reference picture to generate prediction partition data for the prediction partition and adaptive motion filtering or adaptive precision filtering (e.g., AP/AM Filter) may be applied. Process 1500 may feed this information back to operation 1504 where each decoded prediction error partition (e.g., including zero prediction error partitions) may be added to the corresponding prediction partition to generate a reconstructed prediction partition. Additionally, adaptive motion filtering or adaptive precision filtering may be applied at this point in the process.

Process 1500 may continue at operation 1529 "Optionally Apply EP", where enhanced predicted partition (e.g., EP Filtering) may be optionally applied. In some examples, where both EP Filtering or FI/FP Filtering are available, an indicator may be generated that indicates to the decoder system whether to use the enhanced predicted partition (e.g., EP Filtering) or the predicted partition data as the selected predicted partition for the prediction partition.

Process 1500 may continue at operation 1530 "Optionally apply FI/FP Filter", where FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

Operations 1501 through 1540 may provide for video encoding and bitstream transmission techniques, which may be employed by an encoder system as discussed herein. The following operations, operations 1554 through 1568 may provide for video decoding and video display techniques, which may be employed by a decoder system as discussed herein.

Process 1500 may continue at operation 1554, "Receive Bitstream", where the bitstream may be received. For example, input bitstream 201, bitstream 1300, or the like may be received via decoder 200. In some examples, the bitstream may include data associated with a coding partition, one or more indicators, and/or data defining coding partition(s) as discussed above. In some examples, the bitstream may include the prediction partitioning, prediction parameters, the selected coding partitioning, the selected characteristics data, motion vector data, quantized transform coefficients, filter parameters, selection data (such as mode selection data), and indictors.

Process 1500 may continue at operation 1555, "Decode Bitstream", where the received bitstream may be decoded via adaptive entropy decoder module 202 for example. For example, received bitstream may be entropy decoded to determine the prediction partitioning, prediction parameters, the selected coding partitioning, the selected characteristics data, motion vector data, quantized transform coefficients, filter parameters, selection data (such as mode selection data), and indictors.

Process 1500 may continue at operation 1556, "Perform Inverse Scan and Inverse Quantization on Each Block of Each Coding Partition", where an inverse scan and inverse quantization may be performed on each block of each coding partition for the prediction partition being processed. For example, the inverse scan and inverse quantization may be performed via adaptive inverse quantize module 203.

Process 1500 may continue at operation 1557, "Perform Fixed or Content Adaptive Inverse Transform to Decode Transform Coefficients to Determine Decoded Prediction Error Data Partitions", where a fixed or content adaptive inverse transform may be performed to decode transform coefficients to determine decoded prediction error data partitions. For example, the inverse transform may include an inverse content adaptive transform such as a hybrid parametric Haar inverse transform such that the hybrid parametric Haar inverse transform may include a parametric Haar inverse transform in a direction of the parametric transform direction and a discrete cosine inverse transform in a direction orthogonal to the parametric transform direction. In some examples, the fixed inverse transform may include a discrete cosine inverse transform or a discrete cosine inverse transform approximator. For example, the fixed or content adaptive transform may be performed via adaptive inverse transform module 204. As discussed, the content adaptive inverse transform may be based on other previously decoded data, such as, for example, decoded neighboring partitions or blocks. In some examples, generating the decoded prediction error data partitions may include assembling decoded coding partitions via coding partitions assembler module 205.

Process 1500 may continue at operation 1558, "Generate Prediction Pixel Data for Each Prediction Partition", where prediction pixel data may be generated for each prediction partition. For example, prediction pixel data may be generated using the selected prediction type (e.g., based on characteristics and motion, or intra-, or other types) and associated prediction parameters.

Process 1500 may continue at operation 1559, "Add to Each Decoded Prediction Error Partition the Corresponding Prediction Partition to Generate Reconstructed Prediction Partition", where each decoded prediction error partition (e.g., including zero prediction error partitions) may be added to the corresponding prediction partition to generated a reconstructed prediction partition. For example, prediction partitions may be generated via the decode loop illustrated in FIG. 2 and added via adder 206 to decoded prediction error partitions.

Process 1500 may continue at operation 1560, "Assemble Reconstructed Prediction Partitions to Generate Decoded Tiles or Super-fragments", where reconstructed prediction partitions may be assembled to generate decoded tiles or super-fragments. For example, prediction partitions may be assembled to generate decoded tiles or super-fragments via prediction partitions assembler module 207.

Process 1500 may continue at operation 1561, "Apply Deblock Filtering and/or QR Filtering to Generate Final Decoded Tiles or Super-fragments", where optional deblock filtering and/or quality restoration filtering may be applied to the decoded tiles or super-fragments to generate final decoded tiles or super-fragments. For example, optional deblock filtering may be applied via deblock filtering module 208 and/or optional quality restoration filtering may be applied via quality restoration filtering module 209.

Process 1500 may continue at operation 1562, "Assemble Decoded Tiles or Super-fragments to Generate a Decoded Video Picture, and Save in Reference Picture Buffers", where decoded (or final decoded) tiles or super-fragments may be assembled to generate a decoded video picture, and the decoded video picture may be saved in reference picture buffers (e.g., decoded picture buffer 210) for use in future prediction.

Figure 16:
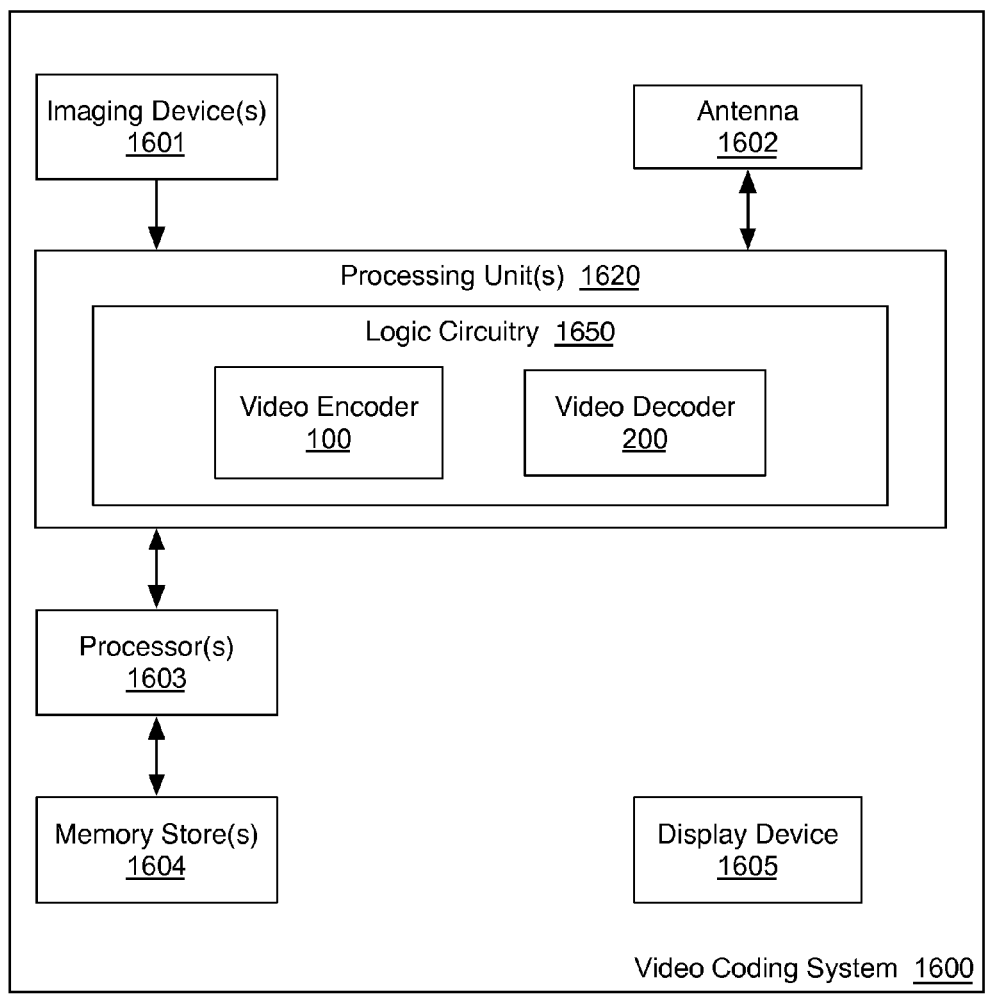
FIG. 16 is an illustrative diagram of an example video coding system.

Process 1500 may continue at operation 1563, "Transmit Decoded Video Frames for Presentment via a Display Device", where decoded video frames may be transmitted for presentment via a display device. For example, decoded video pictures may be further processed via adaptive picture re-organizer 217 and content post restorer module 218 and transmitted to a display device as video frames of display video 219 for presentment to a user. For example, the video frame(s) may be transmitted to a display device 1605 (as shown in FIG. 16) for presentment.

Process 1500 may continue at operation 1573 "Apply DD/DB Filter, Reconstruct Pixel Data, Assemble into a Picture", where deblock filtering (e.g., DD or DB filters) may be applied, pixel data may be reconstructed, and assembled into a picture. For example, after inverse scan, inverse transform, and assembling coding partitions, the prediction error data partitions may be added with a prediction partition to generate reconstructed prediction partitions, which may be assembled into tiles or super-fragments. The assembled tiles or super-fragments may be optionally processed via deblock filtering.

Process 1500 may continue at operation 1574 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in a picture buffer as a reference picture for prediction of other (e.g., following) pictures.

Process 1500 may continue at operation 1576, "Generate Modified Prediction Reference Pictures", where modified prediction reference pictures may be generated, for example, at least a portion of a third modified prediction reference picture may be generated based at least in part on the third modifying characteristic parameters. Similarly, at least a portion a fourth modified prediction reference picture may be generated based at least in part on the second modifying characteristic parameters associated.

Process 1500 may continue at operation 1577, "Generate Motion Data", where, motion estimation data may be generated. For example, motion data associated with a prediction partition of a current picture may be generated based at least in part on one of the third modified prediction reference picture or the third modified prediction reference picture.

Process 1500 may continue at operation 1578, "Apply AP/AM Filter and Perform Motion Compensation", where, motion compensation may be performed and where adaptive motion filtering or adaptive precision filtering (e.g., AP/AM Filter) may be applied. For example, motion compensation may be performed based at least in part on the motion data and at least one of the third modified prediction reference picture or the fourth modified prediction reference picture to generate prediction partition data for the prediction partition. Process 1500 may feed this information back to operation 1559 where each decoded prediction error partition (e.g., including zero prediction error partitions) may be added to the corresponding prediction partition to generate a reconstructed prediction partition. Additionally, adaptive motion filtering or adaptive precision filtering may be applied at this point in the process.

Process 1500 may continue at operation 1579 "Optionally Apply EP Filter", where enhanced predicted partition (e.g., EP Filtering) may be optionally applied. In some examples, where both EP Filtering or FI/FP Filtering are available, an indicator may be received from the encoder system that indicates to the decoder system whether to use the enhanced predicted partition (e.g., EP Filtering) or the predicted partition data as the selected predicted partition for the prediction partition.

Process 1500 may continue at operation 1580 "Optionally apply FI/FP Filter", where FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

Process 1500 may be implemented via any of the coder systems as discussed herein. Further, process 1500 may be repeated either in serial or in parallel on any number of instantiations of video data such as prediction error data partitions, original data partitions, or wavelet data or the like.

Figure 19:
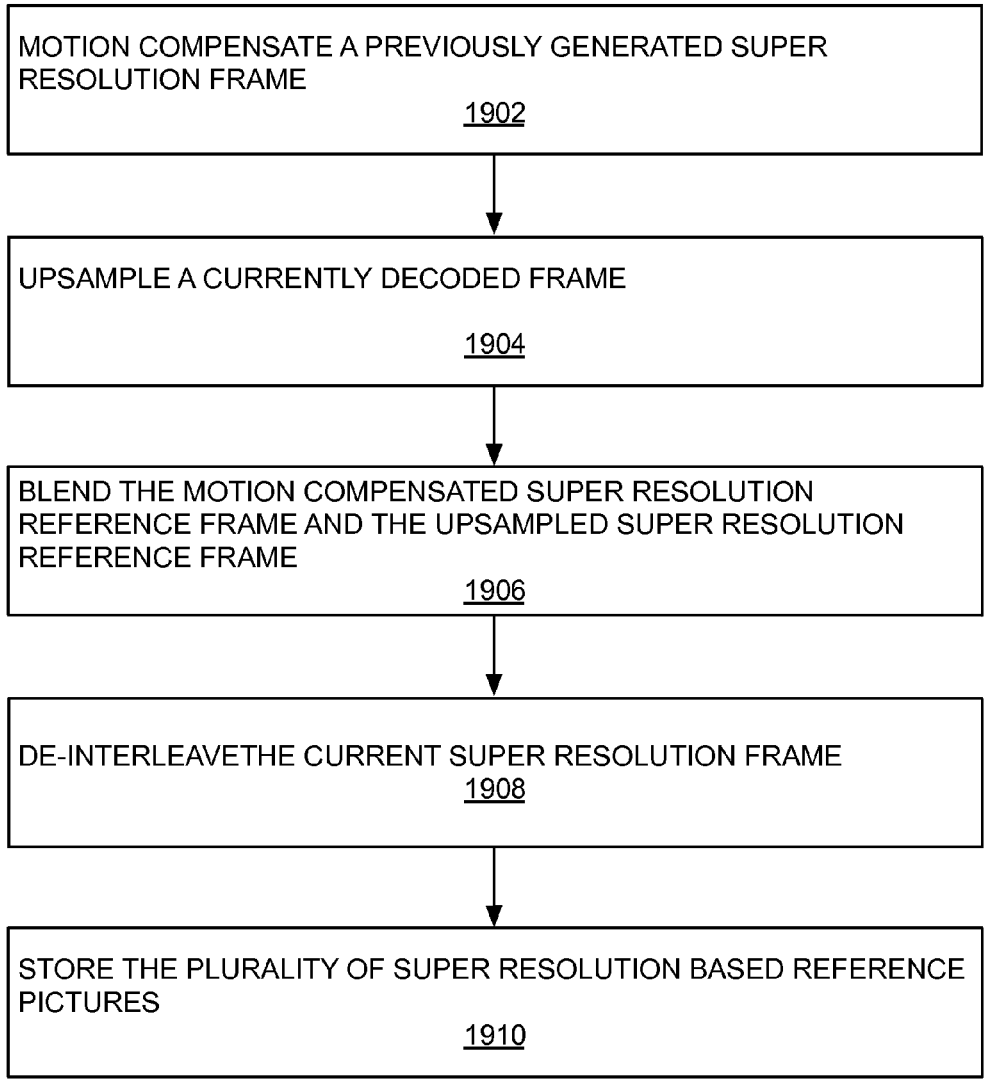
FIG. 19 is a flow diagram illustrating an example encoding process.

FIG. 19 is a flow diagram illustrating an example encoding process, arranged in accordance with at least some implementations of the present disclosure. Process 1900 may include one or more operations, functions or actions as illustrated by one or more operations. Process 1900 may form at least part of a next generation video coding process. By way of non-limiting example, process 1900 may form at least part of a next generation video encoding process as undertaken by encoder system 100 of FIG. 1 and/or any other encoder system or subsystems described herein.

Process 1900 may begin at operation 1902, "MOTION COMPENSATE A PREVIOUSLY GENERATED SUPER RESOLUTION FRAME", where a previously generated super resolution frame may be motion compensated. For example, motion compensation may be performed via a characteristics and motion compensated filtering predictor module on a previously generated super resolution frame to generate a motion compensated super resolution reference frame.

Process 1900 may continue at operation 1904, "UPSAMPLE A CURRENTLY DECODED FRAME", where a currently decoded frame may be upsampled. For example, a currently decoded frame may be upsampled, via a synthesizing analyzer and synthesized picture generation and buffer module, to generate an upsampled super resolution reference frame.

Process 1900 may continue at operation 1906, "BLEND THE MOTION COMPENSATED SUPER RESOLUTION REFERENCE FRAME AND THE UP SAMPLED SUPER RESOLUTION REFERENCE FRAME", where the motion compensated super resolution reference frame and the upsampled super resolution reference frame may be blended. For example, the motion compensated super resolution reference frame and the upsampled super resolution reference frame may be blended, via the synthesizing analyzer and synthesized picture generation and buffer module, to generate a current super resolution frame. The blending may be based at least in part on one or more weighting factors associated with one or more blending factors, where such blending factors may include one or more of the following coding parameters: block prediction/coding mode, prediction reference, and/or number of transform coefficients.

Process 1900 may continue at operation 1908, "DE-INTERLEAVE THE CURRENT SUPER RESOLUTION FRAME", where the current super resolution frame may be de-interleaved. For example, the current super resolution frame may be de-interleaved, via the synthesizing analyzer and synthesized picture generation and buffer module, to provide a plurality of super resolution based reference pictures for motion estimation of a next frame.

Process 1900 may continue at operation 1910, "STORE THE PLURALITY OF SUPER RESOLUTION BASED REFERENCE PICTURES", where the plurality of super resolution based reference pictures may be stored. For example, the plurality of super resolution based reference pictures may be stored, via the synthesizing analyzer and synthesized picture generation and buffer module.

In some implementations, process 1900 may further include upsampling, via the synthesizing analyzer and synthesized picture generation and buffer module, a previously decoded video frame to generate the previously generated super resolution frame. Motion vectors associated with the currently decoded frame and the previously generated super resolution frame may be mapped, via a motion vector mapper and prior to motion compensating the previously generated super resolution frame, to generate super resolution motion vectors for motion compensating the previously generated super resolution frame. Motion data associated with a prediction partition of the next frame may be generated, via the motion estimator module, based at least in part one or more of the plurality of super resolution based reference pictures. Motion compensation may be performed, via the characteristics and motion compensated filtering predictor module, based at least in part on the motion data and the one or more of the plurality of super resolution based reference pictures to generate predicted partition data for the prediction partition. Performing the motion compensation may include filtering a portion of the one or more of the plurality of super resolution based reference pictures using a motion compensation prediction selected from quarter pel precision or eighth pel precision. Upsampling the currently decoded frame may include upsampling using an upsampling filter to a 2× resolution in vertical and 2× resolution in horizontal for a 4× total resolution upsampling. The plurality of super resolution based reference pictures may include 4 super resolution based reference pictures. Blending the motion compensated super resolution reference frame and the upsampled super resolution reference frame may include copying an intra block from the upsampled super resolution reference frame, copying a skip block from the motion compensated super resolution reference frame, and generating a blended inter block of the current super resolution frame by blending a first inter block from the upsampled super resolution reference frame weighted by a first weighting factor and an associated second inter block from the motion compensated super resolution reference frame weighted by a second weighting factor. The first weighting factor and the second weighting factor may be based at least in part on a number of coefficients and a reference frame associated with the first and second inter blocks. The first and second inter blocks may be 4×4 blocks. The number of coefficients may include 4 or more coefficients and the first weighting factor may be 4 and the second weighting factor may be 0. The number of coefficients may include 0 coefficients, the reference frame may be a super resolution reference frame and the first weighting factor may be 1 and the second weighting factor may be 3. Generating the blended inter block may include adding and normalizing a multiplication of the first inter block and the first weighting factor and a multiplication of the second inter block and the second weighting factor. The currently decoded frame may include at least one of a P-picture or an B/F-picture. The previously decoded video frame may include an I-picture. The previously decoded video frame may include at least one of a P-picture or an B/F-picture. The predicted partition data may be differenced, via a differencer, with original pixel data associated with the prediction partition to generate a prediction error data partition. The prediction error data partition may be partitioned, via a coding partitions generator, to generate a plurality of coding partitions. A forward transform may be performed, via an adaptive transform module, on the plurality of coding partitions to generate transform coefficients associated with the plurality of coding partitions. The transform coefficients may be quantized, via an adaptive quantize module, to generate quantized transform coefficients. Quantized transform coefficients, mode and reference data associated with the currently decoded frame, and second quantized transform coefficients associated with the currently decoded frame may be entropy encoded into a bitstream. The mode and reference data may include indicators indicating the intra block, the skip block, the first and second inter block, and the reference frame. The bitstream may be transmitted.

FIG. 20 is a flow diagram illustrating an example encoding process, arranged in accordance with at least some implementations of the present disclosure. Process 2000 may include one or more operations, functions or actions as illustrated by one or more operations. Process 2000 may form at least part of a next generation video coding process. By way of non-limiting example, process 2000 may form at least part of a next generation video encoding process as undertaken by encoder system 100 of FIG. 1 and/or any other encoder system or subsystems described herein.

Process 2000 may begin at operation 2002, "GENERATE, VIA A SYNTHESIZING ANALYZER AND SYNTHESIZED PICTURE GENERATION AND BUFFER MODULE, A PLURALITY OF SUPER RESOLUTION BASED REFERENCE PICTURES", where a plurality of super resolution based reference pictures may be generated. For example, a synthesizing analyzer and synthesized picture generation and buffer module, may generate a plurality of super resolution based reference pictures.

Process 2000 may continue at operation 2004, "GENERATE MOTION DATA ASSOCIATED WITH A PREDICTION PARTITION OF A CURRENT PICTURE", where motion data associated with a prediction partition of a current picture may be generated. For example, motion data associated with a prediction partition of a current picture may be generated, via a motion estimator module, based at least in part one or more of plurality of super resolution based reference pictures.

Process 2000 may continue at operation 2006, "PERFORM MOTION COMPENSATION", where motion compensation may be performed. For example, motion compensation may be performed, via a characteristics and motion compensated filtering predictor module, based at least in part on the motion data and the super resolution prediction reference picture to generate predicted partition data for the prediction partition.

In some implementations, a process 2000 for video coding may further include generating, via the motion estimator module, motion data associated with a prediction partition of the next frame based at least in part one or more of the plurality of super resolution based reference pictures. Motion compensation may be performed, via the characteristics and motion compensated filtering predictor module, based at least in part on the motion data and the one or more of the plurality of super resolution based reference pictures to generate predicted partition data for the prediction partition. The predicted partition data may be differenced, via a differencer, with original pixel data associated with the prediction partition to generate a prediction error data partition. The prediction error data partition may be partitioned, via a coding partitions generator, to generate a plurality of coding partitions. A forward transform may be performed, via an adaptive transform module, on the plurality of coding partitions to generate transform coefficients associated with the plurality of coding partitions. The transform coefficients may be quantized, via an adaptive quantize module, to generate quantized transform coefficients. The quantized transform coefficients and the motion data may be entropy encoded, via an adaptive entropy encoder, into a bitstream.

FIG. 21 is a flow diagram illustrating an example decoding process, all arranged in accordance with at least some implementations of the present disclosure, arranged in accordance with at least some implementations of the present disclosure. Process 2100 may include one or more operations, functions or actions as illustrated by one or more operations. Process 2100 may form at least part of a next generation video coding process. By way of non-limiting example, process 2100 may form at least part of a next generation video encoding process as undertaken by decoder system 200 of FIG. 2 and/or any other decoder system or subsystems described herein.

Process 2100 may begin at operation 2102, "MOTION COMPENSATE A PREVIOUSLY GENERATED SUPER RESOLUTION FRAME TO GENERATE A MOTION COMPENSATED SUPER RESOLUTION REFERENCE FRAME", where a previously generated super resolution frame may be motion compensated to generate a motion compensated super resolution reference frame. For example, motion compensation may be performed via a motion compensated filtering predictor module on a previously generated super resolution frame to generate a motion compensated super resolution reference frame.

Process 2100 may continue at operation 2104, "UPSAMPLE A CURRENTLY DECODED FRAME TO GENERATE AN UPSAMPLED SUPER RESOLUTION REFERENCE FRAME", where a currently decoded frame to generate an upsampled super resolution reference frame may be upsampled. For example, a currently decoded frame may be upsampled, via a synthesized picture generation and buffer module, to generate an upsampled super resolution reference frame.

Process 2100 may continue at operation 2106, "BLEND THE MOTION COMPENSATED SUPER RESOLUTION REFERENCE FRAME AND THE UPSAMPLED SUPER RESOLUTION REFERENCE FRAME TO GENERATE A CURRENT SUPER RESOLUTION FRAME", where the motion compensated super resolution reference frame and the upsampled super resolution reference frame may be blended to generate a current super resolution frame. For example, the motion compensated super resolution reference frame and the upsampled super resolution reference frame may be blended, via the synthesized picture generation and buffer module, to generate a current super resolution frame.

Process 2100 may continue at operation 2108, "DE-INTERLEAVE THE CURRENT SUPER RESOLUTION FRAME TO PROVIDE A PLURALITY OF SUPER RESOLUTION BASED REFERENCE PICTURES FOR MOTION ESTIMATION OF A NEXT FRAME", where the current super resolution frame may be de-interleaved to provide a plurality of super resolution based reference pictures for motion estimation of a next frame. For example, the current super resolution frame may be de-interleaved, via the synthesized picture generation and buffer module, to provide a plurality of super resolution based reference pictures for motion estimation of a next frame.

Process 2100 may continue at operation 2110, "STORE THE PLURALITY OF SUPER RESOLUTION BASED REFERENCE PICTURES", where the plurality of super resolution based reference pictures may be stored. For example, the plurality of super resolution based reference pictures may be stored, via the synthesized picture generation and buffer module.

In some implementations, process 2100 for video coding may further include receiving the bitstream. The bitstream may be entropy decoded, via an adaptive entropy decoder, to determine motion vectors associated with the currently decoded frame, motion data associated with the next frame, first quantized transform coefficients associated with the next frame, mode and reference data associated with the currently decoded frame, and second quantized transform coefficients associated with the currently decoded frame. The mode and reference data may include indicators indicating an intra block, a skip block, a first and second inter block, and a reference frame. An inverse quantization may be performed, via an adaptive inverse quantize module, based at least in part on the first quantized transform coefficients to generate decoded transform coefficients. An inverse transform may be performed, via an adaptive inverse transform module, based at least in part on the decoded transform coefficients to generate a plurality of decoded coding partitions. The plurality of decoded coding partitions may be assembled, via a coding partitions assembler, to generate a decoded prediction error data partition. A previously decoded video frame may be upsampled, via the synthesized picture generation and buffer module, to generate the previously generated super resolution frame. The motion vectors associated with the currently decoded frame may be mapped, via a motion vector mapper and prior to motion compensating the previously generated super resolution frame, to generate super resolution motion vectors for motion compensating the previously generated super resolution frame. Motion compensation may be performed, via the motion compensated filtering predictor module, based at least in part on the motion data and at least one of the plurality of super resolution based reference pictures to generate a first decoded predicted partition. The decoded predicted partition data may be added, via an adder, to the first decoded predicted partition to generate a first reconstructed prediction partition. The first reconstructed prediction partition and a second reconstructed prediction partition may be assembled, via a prediction partitions assembler module, to generate at least one of a first tile or a first super-fragment. At least one of a deblock filtering or a quality restoration filtering may be applied, via a deblock filtering module and/or a quality restoration filtering module, to the first tile or the first super-fragment to generate a first final decoded tile or super-fragment. The first final decoded tile or super-fragment and a second final decoded tile or super-fragment may be assembled to generate a decoded video frame. The decoded video frame may be transmitted for presentment via a display device. Upsampling the currently decoded frame may include upsampling using an upsampling filter to a 2× resolution in vertical and 2× resolution in horizontal for a 4× total resolution upsampling. The plurality of super resolution based reference pictures may include 4 super resolution based reference pictures. Blending the motion compensated super resolution reference frame and the upsampled super resolution reference frame may include copying an intra block from the upsampled super resolution reference frame, the blending may be based at least in part on one or more weighting factors associated with one or more blending factors, where such blending factors may include one or more of the following coding parameters: block prediction/coding mode, prediction reference, and/or number of transform coefficients, copying a skip block from the motion compensated super resolution reference frame, and generating a blended inter block of the current super resolution frame by blending a first inter block from the upsampled super resolution reference frame weighted by a first weighting factor and an associated second inter block from the motion compensated super resolution reference frame weighted by a second weighting factor. The first weighting factor and the second weighting factor may be based at least in part on a number of coefficients and a reference frame associated with the first and second inter blocks. The first and second inter blocks may be 4×4 blocks. The number of coefficients may include 4 or more coefficients and the first weighting factor may be 4 and the second weighting factor may be 0. The number of coefficients may include 0 coefficients, the reference frame may be a super resolution reference frame and the first weighting factor may be 1 and the second weighting factor may be 3. Generating the blended inter block may include adding and normalizing a multiplication of the first inter block and the first weighting factor and a multiplication of the second inter block and the second weighting factor. The currently decoded frame may include at least one of a P-picture or an B/F-picture. The previously decoded video frame may include an I-picture. The previously decoded video frame may include at least one of a P-picture or an B/F-picture.

FIG. 16 is an illustrative diagram of example video coding system 1600, arranged in accordance with at least some implementations of the present disclosure. In the illustrated implementation, video coding system 1600 may include imaging device(s) 1601, video encoder 100, video decoder 200 (and/or a video coder implemented via logic circuitry 1650 of processing unit(s) 1620), an antenna 1602, one or more processor(s) 1603, one or more memory store(s) 1604, and/or a display device 1605.

As illustrated, imaging device(s) 1601, antenna 1602, processing unit(s) 1620, logic circuitry 1650, video encoder 100, video decoder 200, processor(s) 1603, memory store(s) 1604, and/or display device 1605 may be capable of communication with one another. As discussed, although illustrated with both video encoder 100 and video decoder 200, video coding system 1600 may include only video encoder 100 or only video decoder 200 in various examples.

As shown, in some examples, video coding system 1600 may include antenna 1602. Antenna 1602 may be configured to transmit or receive an encoded bitstream of video data, for example. Further, in some examples, video coding system 1600 may include display device 1605. Display device 1605 may be configured to present video data. As shown, in some examples, logic circuitry 1650 may be implemented via processing unit(s) 1620. Processing unit(s) 1620 may include application-specific integrated circuit (ASIC) logic, graphics processor(s), general purpose processor(s), or the like. Video coding system 1600 also may include optional processor(s) 1603, which may similarly include application-specific integrated circuit (ASIC) logic, graphics processor(s), general purpose processor(s), or the like. In some examples, logic circuitry 1650 may be implemented via hardware, video coding dedicated hardware, or the like, and processor(s) 1603 may implemented general purpose software, operating systems, or the like. In addition, memory store(s) 1604 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 1604 may be implemented by cache memory. In some examples, logic circuitry 1650 may access memory store(s) 1604 (for implementation of an image buffer for example). In other examples, logic circuitry 1650 and/or processing unit(s) 1620 may include memory stores (e.g., cache or the like) for the implementation of an image buffer or the like.

In some examples, video encoder 100 implemented via logic circuitry may include an image buffer (e.g., via either processing unit(s) 1620 or memory store(s) 1604)) and a graphics processing unit (e.g., via processing unit(s) 1620). The graphics processing unit may be communicatively coupled to the image buffer. The graphics processing unit may include video encoder 100 as implemented via logic circuitry 1650 to embody the various modules as discussed with respect to FIG. 1 and/or any other encoder system or subsystem described herein. For example, the graphics processing unit may include coding partitions generator logic circuitry, adaptive transform logic circuitry, content pre-analyzer, encode controller logic circuitry, adaptive entropy encoder logic circuitry, and so on. The logic circuitry may be configured to perform the various operations as discussed herein.

In some implementations, the video encoder may include an image buffer and a graphics processing unit. The graphics processing unit may be configured to motion compensate a previously generated super resolution frame to generate a motion compensated super resolution reference frame. The graphics processing unit may be further configured to upsample a currently decoded frame to generate an upsampled super resolution reference frame. The graphics processing unit may be further configured to blend the motion compensated super resolution reference frame and the upsampled super resolution reference frame to generate a current super resolution frame. The graphics processing unit may be further configured to de-interleave the current super resolution frame to provide a plurality of super resolution based reference pictures for motion estimation of a next frame. The graphics processing unit may be further configured to store the plurality of super resolution based reference pictures.

In some examples, the graphics processing unit may be further configured to upsample a previously decoded video frame to generate the previously generated super resolution frame. The graphics processing unit may be further configured to map, prior to motion compensating the previously generated super resolution frame, motion vectors associated with the currently decoded frame and the previously generated super resolution frame to generate super resolution motion vectors for motion compensating the previously generated super resolution frame. The graphics processing unit may be further configured to generate motion data associated with a prediction partition of the next frame based at least in part one or more of the plurality of super resolution based reference pictures. The graphics processing unit may be further configured to perform motion compensation based at least in part on the motion data and the one or more of the plurality of super resolution based reference pictures to generate predicted partition data for the prediction partition. To perform the motion compensation may include the graphics processing unit being configured to filter a portion of the one or more of the plurality of super resolution based reference pictures based on a motion compensation prediction selected from quarter pel precision or eighth pel precision. To upsample the currently decoded frame may include the graphics processing unit being configured to upsample based on an upsampling filter to a 2× resolution in vertical and 2× resolution in horizontal for a 4× total resolution upsampling. The plurality of super resolution based reference pictures may include 4 super resolution based reference pictures. To blend the motion compensated super resolution reference frame and the upsampled super resolution reference frame may include the graphics processing unit being configured to copy an intra block from the upsampled super resolution reference frame, the blending may be based at least in part on one or more weighting factors associated with one or more blending factors, where such blending factors may include one or more of the following coding parameters: block prediction/coding mode, prediction reference, and/or number of transform coefficients, copy a skip block from the motion compensated super resolution reference frame, and generate a blended inter block of the current super resolution frame based on a first inter block from the upsampled super resolution reference frame weighted by a first weighting factor and an associated second inter block from the motion compensated super resolution reference frame weighted by a second weighting factor. The first weighting factor and the second weighting factor may be based at least in part on a number of coefficients and a reference frame associated with the first and second inter blocks. The first and second inter blocks may be 4×4 blocks. The number of coefficients may include 4 or more coefficients and the first weighting factor may be 4 and the second weighting factor may be 0. The number of coefficients may include 0 coefficients, the reference frame may be a super resolution reference frame and the first weighting factor may be 1 and the second weighting factor may be 3. To generate the blended inter block may include the graphics processing unit being configured to add and normalize a multiplication of the first inter block and the first weighting factor and a multiplication of the second inter block and the second weighting factor. The currently decoded frame may include at least one of a P-picture or an B/F-picture. The previously decoded video frame may include an I-picture. The previously decoded video frame may include at least one of a P-picture or an B/F-picture. The graphics processing unit may be further configured to difference the predicted partition data with original pixel data associated with the prediction partition to generate a prediction error data partition. The graphics processing unit may be further configured to partition the prediction error data partition to generate a plurality of coding partitions. The graphics processing unit may be further configured to perform a forward transform on the plurality of coding partitions to generate transform coefficients associated with the plurality of coding partitions. The graphics processing unit may be further configured to quantize the transform coefficients to generate quantized transform coefficients. The graphics processing unit may be further configured to entropy encode the quantized transform coefficients, mode and reference data associated with the currently decoded frame, and second quantized transform coefficients associated with the currently decoded frame into a bitstream. The mode and reference data may include indicators indicating the intra block, the skip block, the first and second inter block, and the reference frame. The graphics processing unit may be further configured to transmit the bitstream.

Video decoder 200 may be implemented in a similar manner as implemented via logic circuitry 1650 to embody the various modules as discussed with respect to decoder 200 of FIG. 2 and/or any other decoder system or subsystem described herein.

In some examples, antenna 1602 of video coding system 1600 may be configured to receive an encoded bitstream of video data. As discussed, the encoded bitstream may include data associated with the coding partition (e.g., transform coefficients or quantized transform coefficients, optional indicators (as discussed), and/or data defining the coding partition (e.g., data associated with defining bi-tree partitions or k-d tree partitions using a symbol-run coding or codebook technique or the like)). Video coding system 1600 may also include video decoder 200 coupled to antenna 1602 and configured to decode the encoded bitstream.

In some implementations, the decoder system may include a video decoder configured to decode an encoded bitstream. The video decoder may be configured to motion compensate a previously generated super resolution frame to generate a motion compensated super resolution reference frame. The video decoder may be configured to upsample a currently decoded frame to generate an upsampled super resolution reference frame. The video decoder may be configured to blend the motion compensated super resolution reference frame and the upsampled super resolution reference frame to generate a current super resolution frame. The video decoder may be configured to de-interleave the current super resolution frame to provide a plurality of super resolution based reference pictures for motion estimation of a next frame. The video decoder may be configured to store the plurality of super resolution based reference pictures.

In some examples, the video decoder may be further configured to receive the bitstream. The video decoder may be further configured to entropy decode the bitstream to determine motion vectors associated with the currently decoded frame, motion data associated with the next frame, first quantized transform coefficients associated with the next frame, mode and reference data associated with the currently decoded frame, and second quantized transform coefficients associated with the currently decoded frame. The mode and reference data may include indicators indicating an intra block, a skip block, a first and second inter block, and a reference frame. The video decoder may be further configured to perform an inverse quantization based at least in part on the first quantized transform coefficients to generate decoded transform coefficients. The video decoder may be further configured to perform an inverse transform based at least in part on the decoded transform coefficients to generate a plurality of decoded coding partitions. The video decoder may be further configured to assemble the plurality of decoded coding partitions to generate a decoded prediction error data partition. The video decoder may be further configured to upsample a previously decoded video frame to generate the previously generated super resolution frame. The video decoder may be further configured to map, prior to motion compensating the previously generated super resolution frame, the motion vectors associated with the currently decoded frame to generate super resolution motion vectors for motion compensating the previously generated super resolution frame. The video decoder may be further configured to perform motion compensation based at least in part on the motion data and at least one of the plurality of super resolution based reference pictures to generate a first decoded predicted partition. The video decoder may be further configured to add the decoded predicted partition data to the first decoded predicted partition to generate a first reconstructed prediction partition. The video decoder may be further configured to assemble the first reconstructed prediction partition and a second reconstructed prediction partition to generate at least one of a first tile or a first super-fragment. The video decoder may be further configured to apply at least one of a deblock filtering or a quality restoration filtering to the first tile or the first super-fragment to generate a first final decoded tile or super-fragment. The video decoder may be further configured to assemble the first final decoded tile or super-fragment and a second final decoded tile or super-fragment to generate a decoded video frame. The video decoder may be further configured to transmit the decoded video frame for presentment via a display device. To upsample the currently decoded frame may include the video decoder being configured to upsample based on an upsampling filter to a 2× resolution in vertical and 2× resolution in horizontal for a 4× total resolution upsampling. The plurality of super resolution based reference pictures may include 4 super resolution based reference pictures. To blend the motion compensated super resolution reference frame and the upsampled super resolution reference frame may include the video decoder being configured to copy an intra block from the upsampled super resolution reference frame, the blending may be based at least in part on one or more weighting factors associated with one or more blending factors, where such blending factors may include one or more of the following coding parameters: block prediction/coding mode, prediction reference, and/or number of transform coefficients, copy a skip block from the motion compensated super resolution reference frame, and generate a blended inter block of the current super resolution frame based on a first inter block from the upsampled super resolution reference frame weighted by a first weighting factor and an associated second inter block from the motion compensated super resolution reference frame weighted by a second weighting factor. The first weighting factor and the second weighting factor may be based at least in part on a number of coefficients and a reference frame associated with the first and second inter blocks. The first and second inter blocks may be 4×4 blocks. The number of coefficients may include 4 or more coefficients and the first weighting factor may be 4 and the second weighting factor may be 0. The number of coefficients may include 0 coefficients, the reference frame may be a super resolution reference frame and the first weighting factor may be 1 and the second weighting factor may be 3. To generate the blended inter block may include the video decoder being configured to add and normalize a multiplication of the first inter block and the first weighting factor and a multiplication of the second inter block and the second weighting factor. The currently decoded frame may include at least one of a P-picture or an B/F-picture. The previously decoded video frame may include an I-picture. The previously decoded video frame may include at least one of a P-picture or an B/F-picture.

In some embodiments, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein.

Figure 17:
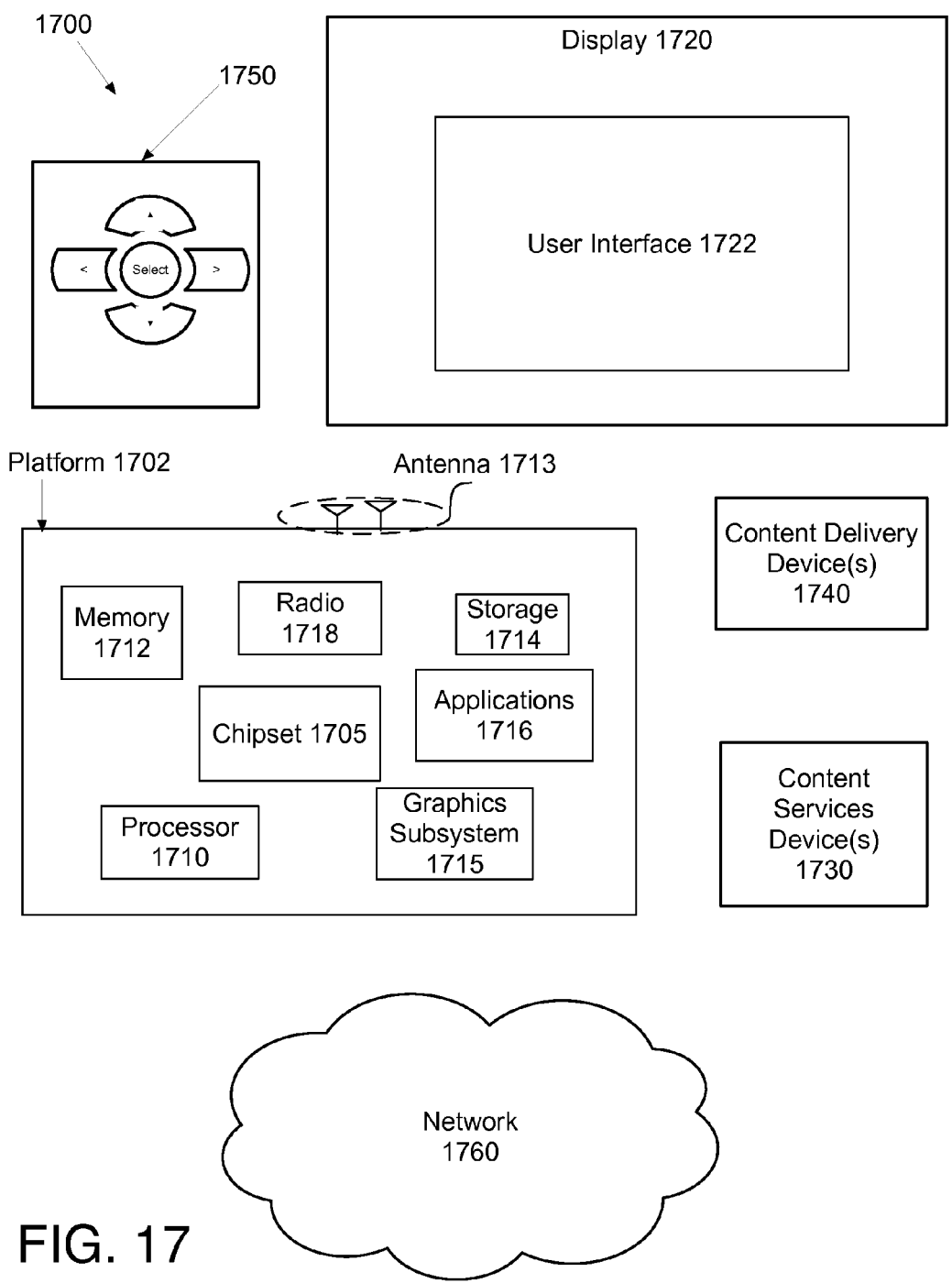
FIG. 17 is an illustrative diagram of an example system.

FIG. 17 is an illustrative diagram of an example system 1700, arranged in accordance with at least some implementations of the present disclosure. In various implementations, system 1700 may be a media system although system 1700 is not limited to this context. For example, system 1700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1700 includes a platform 1702 coupled to a display 1720. Platform 1702 may receive content from a content device such as content services device(s) 1730 or content delivery device(s) 1740 or other similar content sources. A navigation controller 1750 including one or more navigation features may be used to interact with, for example, platform 1702 and/or display 1720. Each of these components is described in greater detail below.

In various implementations, platform 1702 may include any combination of a chipset 1705, processor 1710, memory 1712, antenna 1713, storage 1714, graphics subsystem 1715, applications 1716 and/or radio 1718. Chipset 1705 may provide intercommunication among processor 1710, memory 1712, storage 1714, graphics subsystem 1715, applications 1716 and/or radio 1718. For example, chipset 1705 may include a storage adapter (not depicted) capable of providing intercommunication with storage 1714.

Processor 1710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1710 may be dual-core processor(s), dual-core mobile processor(s), and so forth.

Memory 1712 may be implemented as a volatile memory device such as, but not limited to, a Random Access Memory (RAM), Dynamic Random Access Memory (DRAM), or Static RAM (SRAM).

Storage 1714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1714 may include technology to increase the storage performance enhanced protection for valuable digital media when multiple hard drives are included, for example.

Graphics subsystem 1715 may perform processing of images such as still or video for display. Graphics subsystem 1715 may be a graphics processing unit (GPU) or a visual processing unit (VPU), for example. An analog or digital interface may be used to communicatively couple graphics subsystem 1715 and display 1720. For example, the interface may be any of a High-Definition Multimedia Interface, DisplayPort, wireless HDMI, and/or wireless HD compliant techniques. Graphics subsystem 1715 may be integrated into processor 1710 or chipset 1705. In some implementations, graphics subsystem 1715 may be a stand-alone device communicatively coupled to chipset 1705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1718 may operate in accordance with one or more applicable standards in any version.

In various implementations, display 1720 may include any television type monitor or display. Display 1720 may include, for example, a computer display screen, touch screen display, video monitor, television-like device, and/or a television. Display 1720 may be digital and/or analog. In various implementations, display 1720 may be a holographic display. Also, display 1720 may be a transparent surface that may receive a visual projection. Such projections may convey various forms of information, images, and/or objects. For example, such projections may be a visual overlay for a mobile augmented reality (MAR) application. Under the control of one or more software applications 1716, platform 1702 may display user interface 1722 on display 1720.

In various implementations, content services device(s) 1730 may be hosted by any national, international and/or independent service and thus accessible to platform 1702 via the Internet, for example. Content services device(s) 1730 may be coupled to platform 1702 and/or to display 1720. Platform 1702 and/or content services device(s) 1730 may be coupled to a network 1760 to communicate (e.g., send and/or receive) media information to and from network 1760. Content delivery device(s) 1740 also may be coupled to platform 1702 and/or to display 1720.

In various implementations, content services device(s) 1730 may include a cable television box, personal computer, network, telephone, Internet enabled devices or appliance capable of delivering digital information and/or content, and any other similar device capable of unidirectionally or bidirectionally communicating content between content providers and platform 1702 and/display 1720, via network 1760 or directly. It will be appreciated that the content may be communicated unidirectionally and/or bidirectionally to and from any one of the components in system 1700 and a content provider via network 1760. Examples of content may include any media information including, for example, video, music, medical and gaming information, and so forth.

Content services device(s) 1730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1702 may receive control signals from navigation controller 1750 having one or more navigation features. The navigation features of controller 1750 may be used to interact with user interface 1722, for example. In various embodiments, navigation controller 1750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1750 may be replicated on a display (e.g., display 1720) by movements of a pointer, cursor, focus ring, or other visual indicators displayed on the display. For example, under the control of software applications 1716, the navigation features located on navigation controller 1750 may be mapped to virtual navigation features displayed on user interface 1722. In various embodiments, controller 1750 may not be a separate component but may be integrated into platform 1702 and/or display 1720. The present disclosure, however, is not limited to the elements or in the context shown or described herein.

In various implementations, drivers (not shown) may include technology to enable users to instantly turn on and off platform 1702 like a television with the touch of a button after initial boot-up, when enabled, for example. Program logic may allow platform 1702 to stream content to media adaptors or other content services device(s) 1730 or content delivery device(s) 1740 even when the platform is turned "off." In addition, chipset 1705 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1700 may be integrated. For example, platform 1702 and content services device(s) 1730 may be integrated, or platform 1702 and content delivery device(s) 1740 may be integrated, or platform 1702, content services device(s) 1730, and content delivery device(s) 1740 may be integrated, for example. In various embodiments, platform 1702 and display 1720 may be an integrated unit. Display 1720 and content service device(s) 1730 may be integrated, or display 1720 and content delivery device(s) 1740 may be integrated, for example. These examples are not meant to limit the present disclosure.

In various embodiments, system 1700 may be implemented as a wireless system, a wired system, or a combination of both. When implemented as a wireless system, system 1700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 17.

Figure 18:
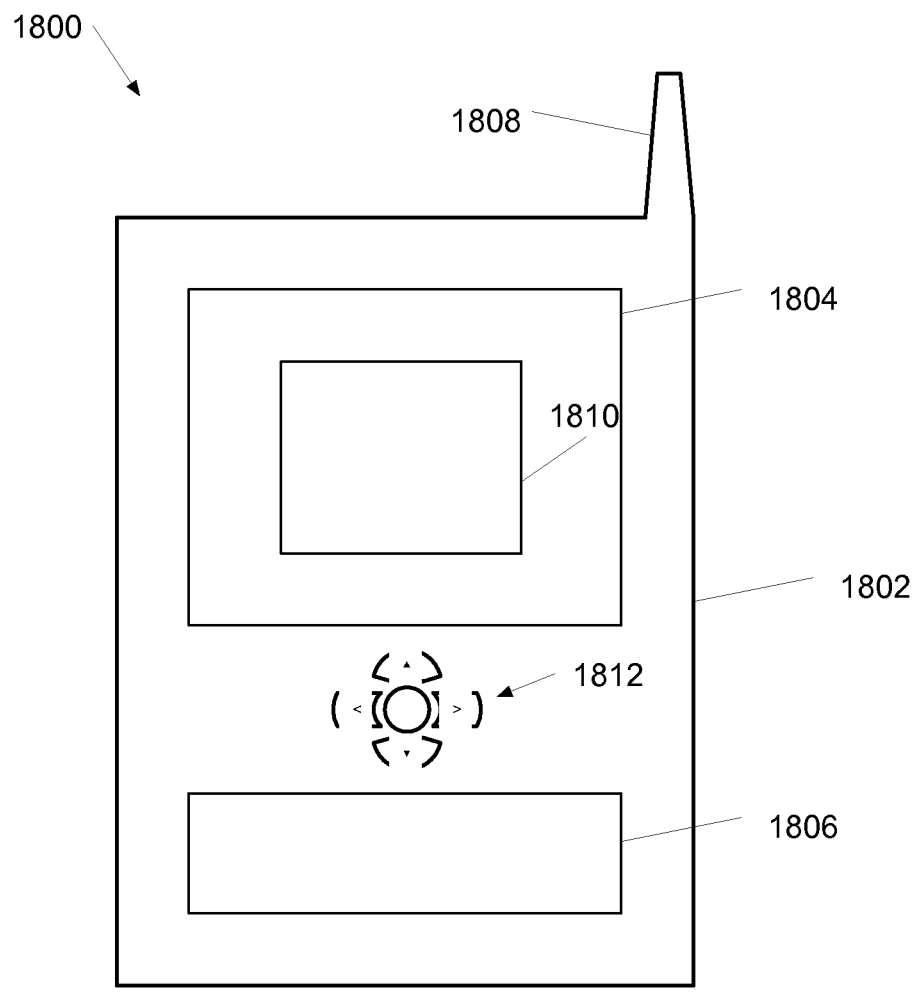
FIG. 18 illustrates an example device.

As described above, system 1700 may be embodied in varying physical styles or form factors. FIG. 18 illustrates implementations of a small form factor device 1800 in which system 1800 may be embodied. In various embodiments, for example, device 1800 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 18, device 1800 may include a housing 1802, a display 1804 which may include a user interface 1810, an input/output (I/O) device 1806, and an antenna 1808. Device 1800 also may include navigation features 1812. Display 1804 may include any suitable display unit for displaying information appropriate for a mobile computing device. I/O device 1806 may include any suitable I/O device for entering information into a mobile computing device. Examples for I/O device 1806 may include an alphanumeric keyboard, a numeric keypad, a touch pad, input keys, buttons, switches, rocker switches, microphones, speakers, voice recognition device and software, and so forth. Information also may be entered into device 1800 by way of microphone (not shown). Such information may be digitized by a voice recognition device (not shown). The embodiments are not limited in this context.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the video systems as discussed herein.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for video coding may include motion compensating, via a motion compensated filtering predictor module, a previously generated super resolution frame to generate a motion compensated super resolution reference frame. A currently decoded frame may be upsampled, via a synthesizing analyzer and synthesized picture generation and buffer module, to generate an upsampled super resolution reference frame. The motion compensated super resolution reference frame and the upsampled super resolution reference frame may be blended, via the synthesizing analyzer and synthesized picture generation and buffer module, to generate a current super resolution frame. The blending may be based at least in part on one or more weighting factors associated with one or more blending factors, where such blending factors may include one or more of the following coding parameters: block prediction/coding mode, prediction reference, and/or number of transform coefficients. The current super resolution frame may be de-interleaved, via the synthesizing analyzer and synthesized picture generation and buffer module, to provide a plurality of super resolution based reference pictures for motion estimation of a next frame. The plurality of super resolution based reference pictures may be stored, via the synthesizing analyzer and synthesized picture generation and buffer module.

In some implementations, a computer-implemented method for video coding may further include upsampling, via the synthesizing analyzer and synthesized picture generation and buffer module, a previously decoded video frame to generate the previously generated super resolution frame.

In some implementations, a computer-implemented method for video coding may further include upsampling, via the synthesizing analyzer and synthesized picture generation and buffer module, a previously decoded video frame to generate the previously generated super resolution frame. The previously decoded video frame may include an I-picture. The currently decoded frame may include at least one of a P-picture or an B/F-picture.

In some implementations, a computer-implemented method for video coding may further include mapping, via a motion vector mapper and prior to motion compensating the previously generated super resolution frame, motion vectors associated with the currently decoded frame and the previously generated super resolution frame to generate super resolution motion vectors for motion compensating the previously generated super resolution frame.

In some implementations, a computer-implemented method for video coding may further include generating, via the motion estimator module, motion data associated with a prediction partition of the next frame based at least in part one or more of the plurality of super resolution based reference pictures.

In some implementations, upsampling the currently decoded frame may include upsampling using an upsampling filter to a 2× resolution in vertical and 2× resolution in horizontal for a 4× total resolution upsampling.

In some implementations, the plurality of super resolution based reference pictures may include 4 super resolution based reference pictures.

In some implementations, blending the motion compensated super resolution reference frame and the upsampled super resolution reference frame may include copying an intra block from the upsampled super resolution reference frame.

In some implementations, blending the motion compensated super resolution reference frame and the upsampled super resolution reference frame may include copying a skip block from the motion compensated super resolution reference frame.

In some implementations, blending the motion compensated super resolution reference frame and the upsampled super resolution reference frame may include generating a blended inter block of the current super resolution frame by blending a first inter block from the upsampled super resolution reference frame weighted by a first weighting factor and an associated second inter block from the motion compensated super resolution reference frame weighted by a second weighting factor.

In some implementations, a computer-implemented method for video coding may further include upsampling, via the synthesizing analyzer and synthesized picture generation and buffer module, a previously decoded video frame to generate the previously generated super resolution frame. Motion vectors associated with the currently decoded frame and the previously generated super resolution frame may be mapped, via a motion vector mapper and prior to motion compensating the previously generated super resolution frame, to generate super resolution motion vectors for motion compensating the previously generated super resolution frame. Motion data associated with a prediction partition of the next frame may be generated, via the motion estimator module, based at least in part one or more of the plurality of super resolution based reference pictures. Motion compensation may be performed, via the motion compensated filtering predictor module, based at least in part on the motion data and the one or more of the plurality of super resolution based reference pictures to generate predicted partition data for the prediction partition. Performing the motion compensation may include filtering a portion of the one or more of the plurality of super resolution based reference pictures using a motion compensation prediction selected from quarter pel precision or eighth pel precision. Upsampling the currently decoded frame may include upsampling using an upsampling filter to a 2× resolution in vertical and 2× resolution in horizontal for a 4× total resolution upsampling. The plurality of super resolution based reference pictures may include 4 super resolution based reference pictures. Blending the motion compensated super resolution reference frame and the upsampled super resolution reference frame may include copying an intra block from the upsampled super resolution reference frame, copying a skip block from the motion compensated super resolution reference frame, and generating a blended inter block of the current super resolution frame by blending a first inter block from the upsampled super resolution reference frame weighted by a first weighting factor and an associated second inter block from the motion compensated super resolution reference frame weighted by a second weighting factor. The first weighting factor and the second weighting factor may be based at least in part on a number of coefficients and a reference frame associated with the first and second inter blocks. The first and second inter blocks may be 4×4 blocks. The number of coefficients may include 4 or more coefficients and the first weighting factor may be 4 and the second weighting factor may be 0. The number of coefficients may include 0 coefficients, the reference frame may be a super resolution reference frame and the first weighting factor may be 1 and the second weighting factor may be 3. Generating the blended inter block may include adding and normalizing a multiplication of the first inter block and the first weighting factor and a multiplication of the second inter block and the second weighting factor. The currently decoded frame may include at least one of a P-picture or an B/F-picture. The previously decoded video frame may include an I-picture. The previously decoded video frame may include at least one of a P-picture or an B/F-picture. The predicted partition data may be differenced, via a differencer, with original pixel data associated with the prediction partition to generate a prediction error data partition. The prediction error data partition may be partitioned, via a coding partitions generator, to generate a plurality of coding partitions. A forward transform may be performed, via an adaptive transform module, on the plurality of coding partitions to generate transform coefficients associated with the plurality of coding partitions. The transform coefficients may be quantized, via an adaptive quantize module, to generate quantized transform coefficients. Quantized transform coefficients, mode and reference data associated with the currently decoded frame, and second quantized transform coefficients associated with the currently decoded frame may be entropy encoded into a bitstream. The mode and reference data may include indicators indicating the intra block, the skip block, the first and second inter block, and the reference frame. The bitstream may be transmitted.

In another example, a computer-implemented method for video coding may include generating, via a synthesizing analyzer and synthesized picture generation and buffer module, a plurality of super resolution based reference pictures. Motion data associated with a prediction partition of a current picture may be generated, via a motion estimator module, based at least in part one or more of plurality of super resolution based reference pictures. Motion compensation may be performed, via a motion compensated filtering predictor module, based at least in part on the motion data and the super resolution prediction reference picture to generate predicted partition data for the prediction partition.

In some implementations, generating the plurality of super-resolution based reference pictures may include blending, via the synthesizing analyzer and synthesized picture generation and buffer module, a motion compensated super resolution reference frame and an upsampled super resolution reference frame to generate a current super resolution frame. The current super resolution frame may be de-interleaved, via the synthesizing analyzer and synthesized picture generation and buffer module, to provide the plurality of super resolution based reference pictures.

In some implementations, a computer-implemented method for video coding may further include generating, via the motion estimator module, motion data associated with a prediction partition of the next frame based at least in part one or more of the plurality of super resolution based reference pictures. Motion compensation may be performed, via the motion compensated filtering predictor module, based at least in part on the motion data and the one or more of the plurality of super resolution based reference pictures to generate predicted partition data for the prediction partition. The predicted partition data may be differenced, via a differencer, with original pixel data associated with the prediction partition to generate a prediction error data partition. The prediction error data partition may be partitioned, via a coding partitions generator, to generate a plurality of coding partitions. A forward transform may be performed, via an adaptive transform module, on the plurality of coding partitions to generate transform coefficients associated with the plurality of coding partitions. The transform coefficients may be quantized, via an adaptive quantize module, to generate quantized transform coefficients. The quantized transform coefficients and the motion data may be entropy encoded, via an adaptive entropy encoder, into a bitstream.

In yet another example, a computer-implemented method for video coding may include motion compensating, via a motion compensated filtering predictor module, a previously generated super resolution frame to generate a motion compensated super resolution reference frame. A currently decoded frame may be upsampled, via a synthesizing analyzer and synthesized picture generation and buffer module, to generate an upsampled super resolution reference frame. A currently decoded inter residual frame may be upsampled, via a synthesizing analyzer and synthesized picture generation and buffer module, to generate an upsampled super resolution inter residual frame. The motion compensated super resolution reference frame, the upsampled super resolution inter residual frame, and the currently decoded inter residual frame may be blended, via the synthesizing analyzer and synthesized picture generation and buffer module, to generate a current super resolution frame. The blending may include copying an intra block from the upsampled super resolution reference frame. A skip block may be copied from the motion compensated super resolution reference frame. An inter block of the current super resolution frame may be generated by adding associated blocks of the motion compensated super resolution reference frame and the currently decoded inter residual frame. The current super resolution frame may be de-interleaved, via the synthesizing analyzer and synthesized picture generation and buffer module, to provide a plurality of super resolution based reference pictures for motion estimation of a next frame. The plurality of super resolution based reference pictures may be stored, via the synthesizing analyzer and synthesized picture generation and buffer module.

In some implementations, a computer-implemented method for video coding may further include upsampling, via the synthesizing analyzer and synthesized picture generation and buffer module, a previously decoded video frame to generate the previously generated super resolution frame.

In some implementations, a computer-implemented method for video coding may further include mapping, via a motion vector mapper and prior to motion compensating the previously generated super resolution frame, motion vectors associated with the currently decoded frame and the previously generated super resolution frame to generate super resolution motion vectors for motion compensating the previously generated super resolution frame.

In some implementations, the previously decoded video frame may include an I-picture and the currently decoded frame may include at least one of a P-picture or an B/F-picture.

In some implementations, a computer-implemented method for video coding may further include generating, via the motion estimator module, motion data associated with a prediction partition of the next frame based at least in part one or more of the plurality of super resolution based reference pictures.

In some implementations, a computer-implemented method for video coding may further include generating, via the motion estimator module, motion data associated with a prediction partition of the next frame based at least in part one or more of the plurality of super resolution based reference pictures. Motion compensation may be performed, via the motion compensated filtering predictor module, based at least in part on the motion data and the one or more of the plurality of super resolution based reference pictures to generate predicted partition data for the prediction partition. The predicted partition data may be differenced, via a differencer, with original pixel data associated with the prediction partition to generate a prediction error data partition. The prediction error data partition may be partitioned, via a coding partitions generator, to generate a plurality of coding partitions. A forward transform may be performed, via an adaptive transform module, on the plurality of coding partitions to generate transform coefficients associated with the plurality of coding partitions. The transform coefficients may be quantized, via an adaptive quantize module, to generate quantized transform coefficients. The quantized transform coefficients and the motion data may be entropy encoded, via an adaptive entropy encoder, into a bitstream.

In still another example, a computer-implemented method for video decoding may include motion compensating, via a motion compensated filtering predictor module, a previously generated super resolution frame to generate a motion compensated super resolution reference frame. A currently decoded frame may be upsampled, via a synthesized picture generation and buffer module, to generate an upsampled super resolution reference frame. The motion compensated super resolution reference frame and the upsampled super resolution reference frame may be blended, via the synthesized picture generation and buffer module, to generate a current super resolution frame. The current super resolution frame may be de-interleaved, via the synthesized picture generation and buffer module, to provide a plurality of super resolution based reference pictures for motion estimation of a next frame. The plurality of super resolution based reference pictures may be stored, via the synthesized picture generation and buffer module.

In some implementations, a computer-implemented method for video coding may further include upsampling, via the synthesized picture generation and buffer module, a previously decoded video frame to generate the previously generated super resolution frame.

In some implementations, a computer-implemented method for video coding may further include mapping, via a motion vector mapper and prior to motion compensating the previously generated super resolution frame, the motion vectors associated with the currently decoded frame to generate super resolution motion vectors for motion compensating the previously generated super resolution frame.

In some implementations, a computer-implemented method for video coding may further include performing, via the motion compensated filtering predictor module, motion compensation based at least in part on the motion data and at least one of the plurality of super resolution based reference pictures to generate a first decoded predicted partition.

In some implementations, upsampling the currently decoded frame may include upsampling using an upsampling filter to a 2× resolution in vertical and 2× resolution in horizontal for a 4× total resolution upsampling.

In some implementations, the plurality of super resolution based reference pictures may include 4 super resolution based reference pictures.

In some implementations, blending the motion compensated super resolution reference frame and the upsampled super resolution reference frame may include copying an intra block from the upsampled super resolution reference frame.

In some implementations, blending the motion compensated super resolution reference frame and the upsampled super resolution reference frame may include copying a skip block from the motion compensated super resolution reference frame.

In some implementations, blending the motion compensated super resolution reference frame and the upsampled super resolution reference frame may include generating a blended inter block of the current super resolution frame by blending a first inter block from the upsampled super resolution reference frame weighted by a first weighting factor and an associated second inter block from the motion compensated super resolution reference frame weighted by a second weighting factor.

In some implementations, a computer-implemented method for video coding may further include receiving the bitstream. The bitstream may be entropy decoded, via an adaptive entropy decoder, to determine motion vectors associated with the currently decoded frame, motion data associated with the next frame, first quantized transform coefficients associated with the next frame, mode and reference data associated with the currently decoded frame, and second quantized transform coefficients associated with the currently decoded frame. The mode and reference data may include indicators indicating an intra block, a skip block, a first and second inter block, and a reference frame. An inverse quantization may be performed, via an adaptive inverse quantize module, based at least in part on the first quantized transform coefficients to generate decoded transform coefficients. An inverse transform may be performed, via an adaptive inverse transform module, based at least in part on the decoded transform coefficients to generate a plurality of decoded coding partitions. The plurality of decoded coding partitions may be assembled, via a coding partitions assembler, to generate a decoded prediction error data partition. A previously decoded video frame may be upsampled, via the synthesized picture generation and buffer module, to generate the previously generated super resolution frame. The motion vectors associated with the currently decoded frame may be mapped, via a motion vector mapper and prior to motion compensating the previously generated super resolution frame, to generate super resolution motion vectors for motion compensating the previously generated super resolution frame. Motion compensation may be performed, via the motion compensated filtering predictor module, based at least in part on the motion data and at least one of the plurality of super resolution based reference pictures to generate a first decoded predicted partition. The decoded predicted partition data may be added, via an adder, to the first decoded predicted partition to generate a first reconstructed prediction partition. The first reconstructed prediction partition and a second reconstructed prediction partition may be assembled, via a prediction partitions assembler module, to generate at least one of a first tile or a first super-fragment. At least one of a deblock filtering or a quality restoration filtering may be applied, via a deblock filtering module and/or a quality restoration filtering module, to the first tile or the first super-fragment to generate a first final decoded tile or super-fragment. The first final decoded tile or super-fragment and a second final decoded tile or super-fragment may be assembled to generate a decoded video frame. The decoded video frame may be transmitted for presentment via a display device. Upsampling the currently decoded frame may include upsampling using an upsampling filter to a 2× resolution in vertical and 2× resolution in horizontal for a 4× total resolution upsampling. The plurality of super resolution based reference pictures may include 4 super resolution based reference pictures. Blending the motion compensated super resolution reference frame and the upsampled super resolution reference frame may include copying an intra block from the upsampled super resolution reference frame, the blending may be based at least in part on one or more weighting factors associated with one or more blending factors, where such blending factors may include one or more of the following coding parameters: block prediction/coding mode, prediction reference, and/or number of transform coefficients, copying a skip block from the motion compensated super resolution reference frame, and generating a blended inter block of the current super resolution frame by blending a first inter block from the upsampled super resolution reference frame weighted by a first weighting factor and an associated second inter block from the motion compensated super resolution reference frame weighted by a second weighting factor. The first weighting factor and the second weighting factor may be based at least in part on a number of coefficients and a reference frame associated with the first and second inter blocks. The first and second inter blocks may be 4×4 blocks. The number of coefficients may include 4 or more coefficients and the first weighting factor may be 4 and the second weighting factor may be 0. The number of coefficients may include 0 coefficients, the reference frame may be a super resolution reference frame and the first weighting factor may be 1 and the second weighting factor may be 3. Generating the blended inter block may include adding and normalizing a multiplication of the first inter block and the first weighting factor and a multiplication of the second inter block and the second weighting factor. The currently decoded frame may include at least one of a P-picture or an B/F-picture. The previously decoded video frame may include an I-picture. The previously decoded video frame may include at least one of a P-picture or an B/F-picture.

In yet another example, a video encoder may include an image buffer and a graphics processing unit. The graphics processing unit may be configured to motion compensate a previously generated super resolution frame to generate a motion compensated super resolution reference frame. The graphics processing unit may be further configured to upsample a currently decoded frame to generate an upsampled super resolution reference frame. The graphics processing unit may be further configured to blend the motion compensated super resolution reference frame and the upsampled super resolution reference frame to generate a current super resolution frame. The graphics processing unit may be further configured to de-interleave the current super resolution frame to provide a plurality of super resolution based reference pictures for motion estimation of a next frame. The graphics processing unit may be further configured to store the plurality of super resolution based reference pictures.

In some implementations, the graphics processing unit may be further configured to upsample a previously decoded video frame to generate the previously generated super resolution frame.

In some implementations, the graphics processing unit may be further configured to upsample a previously decoded video frame to generate the previously generated super resolution frame. The previously decoded video frame may include an I-picture and the currently decoded frame may include at least one of a P-picture or an B/F-picture.

In some implementations, the graphics processing unit may be further configured to map, prior to motion compensating the previously generated super resolution frame, motion vectors associated with the currently decoded frame and the previously generated super resolution frame to generate super resolution motion vectors for motion compensating the previously generated super resolution frame.

In some implementations, the graphics processing unit may be further configured to generate motion data associated with a prediction partition of the next frame based at least in part one or more of the plurality of super resolution based reference pictures.

In some implementations, to upsample the currently decoded frame may include the graphics processing unit being configured to upsample based on an upsampling filter to a 2× resolution in vertical and 2× resolution in horizontal for a 4× total resolution upsampling.

In some implementations, the plurality of super resolution based reference pictures may include 4 super resolution based reference pictures.

In some implementations, to blend the motion compensated super resolution reference frame and the upsampled super resolution reference frame may include the graphics processing unit being configured to copy an intra block from the upsampled super resolution reference frame.

In some implementations, to blend the motion compensated super resolution reference frame and the upsampled super resolution reference frame may include the graphics processing unit being configured to copy a skip block from the motion compensated super resolution reference frame.

In some implementations, to blend the motion compensated super resolution reference frame and the upsampled super resolution reference frame may include the graphics processing unit being configured to generate a blended inter block of the current super resolution frame based on a first inter block from the upsampled super resolution reference frame weighted by a first weighting factor and an associated second inter block from the motion compensated super resolution reference frame weighted by a second weighting factor.

In some implementations, the graphics processing unit may be further configured to upsample a previously decoded video frame to generate the previously generated super resolution frame. The graphics processing unit may be further configured to map, prior to motion compensating the previously generated super resolution frame, motion vectors associated with the currently decoded frame and the previously generated super resolution frame to generate super resolution motion vectors for motion compensating the previously generated super resolution frame. The graphics processing unit may be further configured to generate motion data associated with a prediction partition of the next frame based at least in part one or more of the plurality of super resolution based reference pictures. The graphics processing unit may be further configured to perform motion compensation based at least in part on the motion data and the one or more of the plurality of super resolution based reference pictures to generate predicted partition data for the prediction partition. To perform the motion compensation may include the graphics processing unit being configured to filter a portion of the one or more of the plurality of super resolution based reference pictures based on a motion compensation prediction selected from quarter pel precision or eighth pel precision. To upsample the currently decoded frame may include the graphics processing unit being configured to upsample based on an upsampling filter to a 2× resolution in vertical and 2× resolution in horizontal for a 4× total resolution upsampling. The plurality of super resolution based reference pictures may include 4 super resolution based reference pictures. To blend the motion compensated super resolution reference frame and the upsampled super resolution reference frame may include the graphics processing unit being configured to copy an intra block from the upsampled super resolution reference frame, the blending may be based at least in part on one or more weighting factors associated with one or more blending factors, where such blending factors may include one or more of the following coding parameters: block prediction/coding mode, prediction reference, and/or number of transform coefficients, copy a skip block from the motion compensated super resolution reference frame, and generate a blended inter block of the current super resolution frame based on a first inter block from the upsampled super resolution reference frame weighted by a first weighting factor and an associated second inter block from the motion compensated super resolution reference frame weighted by a second weighting factor. The first weighting factor and the second weighting factor may be based at least in part on a number of coefficients and a reference frame associated with the first and second inter blocks. The first and second inter blocks may be 4×4 blocks. The number of coefficients may include 4 or more coefficients and the first weighting factor may be 4 and the second weighting factor may be 0. The number of coefficients may include 0 coefficients, the reference frame may be a super resolution reference frame and the first weighting factor may be 1 and the second weighting factor may be 3. To generate the blended inter block may include the graphics processing unit being configured to add and normalize a multiplication of the first inter block and the first weighting factor and a multiplication of the second inter block and the second weighting factor. The currently decoded frame may include at least one of a P-picture or an B/F-picture. The previously decoded video frame may include an I-picture. The previously decoded video frame may include at least one of a P-picture or an B/F-picture. The graphics processing unit may be further configured to difference the predicted partition data with original pixel data associated with the prediction partition to generate a prediction error data partition. The graphics processing unit may be further configured to partition the prediction error data partition to generate a plurality of coding partitions. The graphics processing unit may be further configured to perform a forward transform on the plurality of coding partitions to generate transform coefficients associated with the plurality of coding partitions. The graphics processing unit may be further configured to quantize the transform coefficients to generate quantized transform coefficients. The graphics processing unit may be further configured to entropy encode the quantized transform coefficients, mode and reference data associated with the currently decoded frame, and second quantized transform coefficients associated with the currently decoded frame into a bitstream. The mode and reference data may include indicators indicating the intra block, the skip block, the first and second inter block, and the reference frame. The graphics processing unit may be further configured to transmit the bitstream.

In an additional example, a decoder system may include a video decoder configured to decode an encoded bitstream. The video decoder may be configured to motion compensate a previously generated super resolution frame to generate a motion compensated super resolution reference frame. The video decoder may be configured to upsample a currently decoded frame to generate an upsampled super resolution reference frame. The video decoder may be configured to blend the motion compensated super resolution reference frame and the upsampled super resolution reference frame to generate a current super resolution frame. The video decoder may be configured to de-interleave the current super resolution frame to provide a plurality of super resolution based reference pictures for motion estimation of a next frame. The video decoder may be configured to store the plurality of super resolution based reference pictures.

In some implementations, a decoder system further may include an antenna communicatively coupled to the video decoder and configured to receive the encoded bitstream of video data, and a display device configured to present video frames.

In some implementations, the video decoder may be further configured to upsample a previously decoded video frame to generate the previously generated super resolution frame.

In some implementations, the video decoder may be further configured to map the motion vectors associated with the currently decoded frame to generate super resolution motion vectors for motion compensating the previously generated super resolution frame.

In some implementations, the video decoder may be further configured to perform motion compensation based at least in part on the motion data and at least one of the plurality of super resolution based reference pictures to generate a first decoded predicted partition.

In some implementations, to upsample the currently decoded frame may include the video decoder being configured to upsample based on an upsampling filter to a 2× resolution in vertical and 2× resolution in horizontal for a 4× total resolution upsampling.

In some implementations, the plurality of super resolution based reference pictures may include 4 super resolution based reference pictures.

In some implementations, to blend the motion compensated super resolution reference frame and the upsampled super resolution reference frame may include the video decoder being configured to copy an intra block from the upsampled super resolution reference frame.

In some implementations, to blend the motion compensated super resolution reference frame and the upsampled super resolution reference frame may include the video decoder being configured to copy a skip block from the motion compensated super resolution reference frame.

In some implementations, to blend the motion compensated super resolution reference frame and the upsampled super resolution reference frame may include the video decoder being configured to generate a blended inter block of the current super resolution frame based on a first inter block from the upsampled super resolution reference frame weighted by a first weighting factor and an associated second inter block from the motion compensated super resolution reference frame weighted by a second weighting factor.

In some implementations, the video decoder may be further configured to receive the bitstream. The video decoder may be further configured to entropy decode the bitstream to determine motion vectors associated with the currently decoded frame, motion data associated with the next frame, first quantized transform coefficients associated with the next frame, mode and reference data associated with the currently decoded frame, and second quantized transform coefficients associated with the currently decoded frame. The mode and reference data may include indicators indicating an intra block, a skip block, a first and second inter block, and a reference frame. The video decoder may be further configured to perform an inverse quantization based at least in part on the first quantized transform coefficients to generate decoded transform coefficients. The video decoder may be further configured to perform an inverse transform based at least in part on the decoded transform coefficients to generate a plurality of decoded coding partitions. The video decoder may be further configured to assemble the plurality of decoded coding partitions to generate a decoded prediction error data partition. The video decoder may be further configured to upsample a previously decoded video frame to generate the previously generated super resolution frame. The video decoder may be further configured to map, prior to motion compensating the previously generated super resolution frame, the motion vectors associated with the currently decoded frame to generate super resolution motion vectors for motion compensating the previously generated super resolution frame.

The video decoder may be further configured to perform motion compensation based at least in part on the motion data and at least one of the plurality of super resolution based reference pictures to generate a first decoded predicted partition. The video decoder may be further configured to add the decoded predicted partition data to the first decoded predicted partition to generate a first reconstructed prediction partition. The video decoder may be further configured to assemble the first reconstructed prediction partition and a second reconstructed prediction partition to generate at least one of a first tile or a first super-fragment. The video decoder may be further configured to apply at least one of a deblock filtering or a quality restoration filtering to the first tile or the first super-fragment to generate a first final decoded tile or super-fragment. The video decoder may be further configured to assemble the first final decoded tile or super-fragment and a second final decoded tile or super-fragment to generate a decoded video frame. The video decoder may be further configured to transmit the decoded video frame for presentment via a display device. To upsample the currently decoded frame may include the video decoder being configured to upsample based on an upsampling filter to a 2× resolution in vertical and 2× resolution in horizontal for a 4× total resolution upsampling. The plurality of super resolution based reference pictures may include 4 super resolution based reference pictures. To blend the motion compensated super resolution reference frame and the upsampled super resolution reference frame may include the video decoder being configured to copy an intra block from the upsampled super resolution reference frame, the blending may be based at least in part on one or more weighting factors associated with one or more blending factors, where such blending factors may include one or more of the following coding parameters: block prediction/coding mode, prediction reference, and/or number of transform coefficients, copy a skip block from the motion compensated super resolution reference frame, and generate a blended inter block of the current super resolution frame based on a first inter block from the upsampled super resolution reference frame weighted by a first weighting factor and an associated second inter block from the motion compensated super resolution reference frame weighted by a second weighting factor. The first weighting factor and the second weighting factor may be based at least in part on a number of coefficients and a reference frame associated with the first and second inter blocks. The first and second inter blocks may be 4×4 blocks. The number of coefficients may include 4 or more coefficients and the first weighting factor may be 4 and the second weighting factor may be 0. The number of coefficients may include 0 coefficients, the reference frame may be a super resolution reference frame and the first weighting factor may be 1 and the second weighting factor may be 3. To generate the blended inter block may include the video decoder being configured to add and normalize a multiplication of the first inter block and the first weighting factor and a multiplication of the second inter block and the second weighting factor. The currently decoded frame may include at least one of a P-picture or an B/F-picture. The previously decoded video frame may include an I-picture. The previously decoded video frame may include at least one of a P-picture or an B/F-picture.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for video coding, comprising:
   motion compensating, via a motion compensated filtering predictor module, a previously generated super resolution frame to generate a motion compensated super resolution reference frame;
   upsampling, via a synthesizing analyzer and synthesized picture generation and buffer module, a currently decoded frame to generate an upsampled super resolution reference frame;
   blending, via the synthesizing analyzer and synthesized picture generation and buffer module, the motion compensated super resolution reference frame and the upsampled super resolution reference frame to generate a current super resolution frame, wherein the blending is based at least in part on one or more weighting factors associated with one or more blending factors used in blending process to combine an upsampled intra block and a motion compensated prediction block, wherein such blending factors include one or more of the following coding parameters: block prediction/coding mode, prediction reference, and/or number of transform coefficients, wherein blending the motion compensated super resolution reference frame and the upsampled super resolution reference frame comprises copying a skip block from the motion compensated super resolution reference frame;
   de-interleaving, via the synthesizing analyzer and synthesized picture generation and buffer module, the current super resolution frame to provide a plurality of super resolution based reference pictures for motion estimation of a next frame; and
   storing, via the synthesizing analyzer and synthesized picture generation and buffer module, the plurality of super resolution based reference pictures.

2. The method of claim 1, further comprising:
   upsampling, via the synthesizing analyzer and synthesized picture generation and buffer module, a previously decoded video frame to generate the previously generated super resolution frame.

3. The method of claim 1, further comprising:
   upsampling, via the synthesizing analyzer and synthesized picture generation and buffer module, a previously decoded video frame to generate the previously generated super resolution frame, wherein the previously decoded video frame comprises an I-picture and the currently decoded frame comprises at least one of a P-picture or an B/F-picture.

4. The method of claim 1, further comprising:
   mapping, via a motion vector mapper and prior to motion compensating the previously generated super resolution frame, motion vectors associated with the currently decoded frame and the previously generated super resolution frame to generate super resolution motion vectors for motion compensating the previously generated super resolution frame.

5. The method of claim 1, further comprising:
generating, via the motion estimator module, motion data associated with a prediction partition of the next frame based at least in part one or more of the plurality of super resolution based reference pictures.

6. The method of claim 1, wherein upsampling the currently decoded frame comprises upsampling using an upsampling filter to a 2× resolution in vertical and 2× resolution in horizontal for a 4× total resolution upsampling.

7. The method of claim 1, wherein the plurality of super resolution based reference pictures comprises 4 super resolution based reference pictures.

8. The method of claim 1, wherein blending the motion compensated super resolution reference frame and the upsampled super resolution reference frame comprises copying an intra block from the upsampled super resolution reference frame.

9. The method of claim 1, wherein blending the motion compensated super resolution reference frame and the upsampled super resolution reference frame comprises generating a blended inter block of the current super resolution frame by blending a first inter block from the upsampled super resolution reference frame weighted by a first weighting factor and an associated second inter block from the motion compensated super resolution reference frame weighted by a second weighting factor.

10. The method of claim 1, further comprising
upsampling, via the synthesizing analyzer and synthesized picture generation and buffer module, a previously decoded video frame to generate the previously generated super resolution frame;
mapping, via a motion vector mapper and prior to motion compensating the previously generated super resolution frame, motion vectors associated with the currently decoded frame and the previously generated super resolution frame to generate super resolution motion vectors for motion compensating the previously generated super resolution frame;
generating, via the motion estimator module, motion data associated with a prediction partition of the next frame based at least in part one or more of the plurality of super resolution based reference pictures;
performing, via the motion compensated filtering predictor module, motion compensation based at least in part on the motion data and the one or more of the plurality of super resolution based reference pictures to generate predicted partition data for the prediction partition, wherein performing the motion compensation comprises filtering a portion of the one or more of the plurality of super resolution based reference pictures using a motion compensation prediction selected from quarter pel precision or eighth pel precision,
wherein upsampling the currently decoded frame comprises upsampling using an upsampling filter to a 2× resolution in vertical and 2× resolution in horizontal for a 4× total resolution upsampling,
wherein the plurality of super resolution based reference pictures comprises 4 super resolution based reference pictures,
wherein blending the motion compensated super resolution reference frame and the upsampled super resolution reference frame comprises copying an intra block from the upsampled super resolution reference frame, copying the skip block from the motion compensated super resolution reference frame, and generating a blended inter block of the current super resolution frame by blending a first inter block from the upsampled super resolution reference frame weighted by a first weighting factor and an associated second inter block from the motion compensated super resolution reference frame weighted by a second weighting factor, wherein the first weighting factor and the second weighting factor are based at least in part on a number of coefficients and a reference frame associated with the first and second inter blocks, wherein the first and second inter blocks are 4×4 blocks, wherein the number of coefficients comprises 4 or more coefficients and the first weighting factor is 4 and the second weighting factor is 0, wherein the number of coefficients comprises 0 coefficients, the reference frame is a super resolution reference frame and the first weighting factor is 1 and the second weighting factor is 3, wherein generating the blended inter block comprises adding and normalizing a multiplication of the first inter block and the first weighting factor and a multiplication of the second inter block and the second weighting factor,
wherein the currently decoded frame comprises at least one of a P-picture or an B/F-picture,
wherein the previously decoded video frame comprises an I-picture, and
wherein the previously decoded video frame comprises at least one of a P-picture or an B/F-picture;
differencing, via a differencer, the predicted partition data with original pixel data associated with the prediction partition to generate a prediction error data partition;
partitioning, via a coding partitions generator, the prediction error data partition to generate a plurality of coding partitions;
performing, via an adaptive transform module, a forward transform on the plurality of coding partitions to generate transform coefficients associated with the plurality of coding partitions;
quantizing, via an adaptive quantize module, the transform coefficients to generate quantized transform coefficients;
entropy encoding, via an adaptive entropy encoder, the quantized transform coefficients, mode and reference data associated with the currently decoded frame, and second quantized transform coefficients associated with the currently decoded frame into a bitstream, wherein the mode and reference data comprises indicators indicating the intra block, the skip block, the first and second inter block, and the reference frame; and
transmitting the bitstream.

11. A computer-implemented method for video coding, comprising:
motion compensating, via a motion compensated filtering predictor module, a previously generated super resolution frame to generate a motion compensated super resolution reference frame;
upsampling, via a synthesizing analyzer and synthesized picture generation and buffer module, a currently decoded frame to generate an upsampled super resolution reference frame;
upsampling, via a synthesizing analyzer and synthesized picture generation and buffer module, a currently decoded inter residual frame to generate an upsampled super resolution inter residual frame;
blending, via the synthesizing analyzer and synthesized picture generation and buffer module, the motion compensated super resolution reference frame, the upsampled super resolution inter residual frame, and the currently decoded inter residual frame to generate a current super resolution frame, wherein the blending comprises:
copying an intra block from the upsampled super resolution reference frame;
copying a skip block from the motion compensated super resolution reference frame; and
generating an inter block of the current super resolution frame by adding associated blocks of the motion compensated super resolution reference frame and the currently decoded inter residual frame;
de-interleaving, via the synthesizing analyzer and synthesized picture generation and buffer module, the current super resolution frame to provide a plurality of super resolution based reference pictures for motion estimation of a next frame; and
storing, via the synthesizing analyzer and synthesized picture generation and buffer module, the plurality of super resolution based reference pictures.

12. The method of claim 11, further comprising:
upsampling, via the synthesizing analyzer and synthesized picture generation and buffer module, a previously decoded video frame to generate the previously generated super resolution frame.

13. The method of claim 11, further comprising:
mapping, via a motion vector mapper and prior to motion compensating the previously generated super resolution frame, motion vectors associated with the currently decoded frame and the previously generated super resolution frame to generate super resolution motion vectors for motion compensating the previously generated super resolution frame.

14. The method of claim 11, wherein the previously decoded video frame comprises an I-picture and the currently decoded frame comprises at least one of a P-picture or an B/F-picture.

15. The method of claim 11, further comprising:
generating, via the motion estimator module, motion data associated with a prediction partition of the next frame based at least in part one or more of the plurality of super resolution based reference pictures.

16. The method of claim 11, further comprising:
generating, via the motion estimator module, motion data associated with a prediction partition of the next frame based at least in part one or more of the plurality of super resolution based reference pictures;
performing, via the motion compensated filtering predictor module, motion compensation based at least in part on the motion data and the one or more of the plurality of super resolution based reference pictures to generate predicted partition data for the prediction partition;
differencing, via a differencer, the predicted partition data with original pixel data associated with the prediction partition to generate a prediction error data partition;
partitioning, via a coding partitions generator, the prediction error data partition to generate a plurality of coding partitions;
performing, via an adaptive transform module, a forward transform on the plurality of coding partitions to generate transform coefficients associated with the plurality of coding partitions; and
quantizing, via an adaptive quantize module, the transform coefficients to generate quantized transform coefficients; and
entropy encoding, via an adaptive entropy encoder, the quantized transform coefficients and the motion data into a bitstream.

17. A computer-implemented method for video decoding, comprising:
motion compensating, via a motion compensated filtering predictor module, a previously generated super resolution frame to generate a motion compensated super resolution reference frame;
upsampling, via a synthesized picture generation and buffer module, a currently decoded frame to generate an upsampled super resolution reference frame;
blending, via the synthesized picture generation and buffer module, the motion compensated super resolution reference frame and the upsampled super resolution reference frame to generate a current super resolution frame, wherein the blending is based at least in part on one or more weighting factors associated with one or more blending factors, wherein such blending factors include one or more of the following coding parameters: block prediction/coding mode, prediction reference, and/or number of transform coefficients, wherein blending the motion compensated super resolution reference frame and the upsampled super resolution reference frame comprises copying a skip block from the motion compensated super resolution reference frame;
de-interleaving, via the synthesized picture generation and buffer module, the current super resolution frame to provide a plurality of super resolution based reference pictures for motion estimation of a next frame; and
storing, via the synthesized picture generation and buffer module, the plurality of super resolution based reference pictures.

18. The method of claim 17, further comprising:
receiving the bitstream;
entropy decoding, via an adaptive entropy decoder, the bitstream to determine motion vectors associated with the currently decoded frame, motion data associated with the next frame, first quantized transform coefficients associated with the next frame, mode and reference data associated with the currently decoded frame, and second quantized transform coefficients associated with the currently decoded frame, wherein the mode and reference data comprises indicators indicating an intra block, a skip block, a first and second inter block, and a reference frame;
performing, via an adaptive inverse quantize module, an inverse quantization based at least in part on the first quantized transform coefficients to generate decoded transform coefficients;
performing, via an adaptive inverse transform module, an inverse transform based at least in part on the decoded transform coefficients to generate a plurality of decoded coding partitions;
assembling, via a coding partitions assembler, the plurality of decoded coding partitions to generate a decoded prediction error data partition;
upsampling, via the synthesized picture generation and buffer module, a previously decoded video frame to generate the previously generated super resolution frame;
mapping, via a motion vector mapper and prior to motion compensating the previously generated super resolution frame, the motion vectors associated with the currently decoded frame to generate super resolution motion vectors for motion compensating the previously generated super resolution frame;
performing, via the motion compensated filtering predictor module, motion compensation based at least in part on the motion data and at least one of the plurality of super resolution based reference pictures to generate a first decoded predicted partition;
adding, via an adder, the decoded predicted partition data to the first decoded predicted partition to generate a first reconstructed prediction partition;
assembling, via a prediction partitions assembler module, the first reconstructed prediction partition and a second reconstructed prediction partition to generate at least one of a first tile or a first super-fragment;
applying, via a deblock filtering module and/or a quality restoration filtering module, at least one of a deblock filtering or a quality restoration filtering to the first tile or the first super-fragment to generate a first final decoded tile or super-fragment;
assembling the first final decoded tile or super-fragment and a second final decoded tile or super-fragment to generate a decoded video frame; and
transmitting the decoded video frame for presentment via a display device,
wherein upsampling the currently decoded frame comprises upsampling using an upsampling filter to a 2× resolution in vertical and 2× resolution in horizontal for a 4× total resolution upsampling,
wherein the plurality of super resolution based reference pictures comprises 4 super resolution based reference pictures,
wherein blending the motion compensated super resolution reference frame and the upsampled super resolution reference frame comprises copying an intra block from the upsampled super resolution reference frame, copying the skip block from the motion compensated super resolution reference frame, and generating a blended inter block of the current super resolution frame by blending a first inter block from the upsampled super resolution reference frame weighted by a first weighting factor and an associated second inter block from the motion compensated super resolution reference frame weighted by a second weighting factor, wherein the first weighting factor and the second weighting factor are based at least in part on a number of coefficients and a reference frame associated with the first and second inter blocks, wherein the first and second inter blocks are 4×4 blocks, wherein the number of coefficients comprises 4 or more coefficients and the first weighting factor is 4 and the second weighting factor is 0, wherein the number of coefficients comprises 0 coefficients, the reference frame is a super resolution reference frame and the first weighting factor is 1 and the second weighting factor is 3, wherein generating the blended inter block comprises adding and normalizing a multiplication of the first inter block and the first weighting factor and a multiplication of the second inter block and the second weighting factor,
wherein the currently decoded frame comprises at least one of a P-picture or an B/F-picture,
wherein the previously decoded video frame comprises an I-picture, and
wherein the previously decoded video frame comprises at least one of a P-picture or an B/F-picture.

19. A video encoder comprising:
an image buffer; and
a graphics processing unit configured to:
  motion compensate a previously generated super resolution frame to generate a motion compensated super resolution reference frame;
  upsample a currently decoded frame to generate an upsampled super resolution reference frame;
  blend the motion compensated super resolution reference frame and the upsampled super resolution reference frame to generate a current super resolution frame, wherein the blending is based at least in part on one or more weighting factors associated with one or more blending factors, wherein such blending factors include one or more of the following coding parameters: block prediction/coding mode, prediction reference, and/or number of transform coefficients, wherein blending the motion compensated super resolution reference frame and the upsampled super resolution reference frame comprises copying a skip block from the motion compensated super resolution reference frame;
  de-interleave the current super resolution frame to provide a plurality of super resolution based reference pictures for motion estimation of a next frame; and
  store the plurality of super resolution based reference pictures.

20. The video encoder of claim 19, wherein the graphics processing unit is further configured to:
  upsample a previously decoded video frame to generate the previously generated super resolution frame;
  map, prior to motion compensating the previously generated super resolution frame, motion vectors associated with the currently decoded frame and the previously generated super resolution frame to generate super resolution motion vectors for motion compensating the previously generated super resolution frame;
  generate motion data associated with a prediction partition of the next frame based at least in part one or more of the plurality of super resolution based reference pictures;
  perform motion compensation based at least in part on the motion data and the one or more of the plurality of super resolution based reference pictures to generate predicted partition data for the prediction partition, wherein to perform the motion compensation comprises the graphics processing unit being configured to filter a portion of the one or more of the plurality of super resolution based reference pictures based on a motion compensation prediction selected from quarter pel precision or eighth pel precision,
  wherein to upsample the currently decoded frame comprises the graphics processing unit being configured to upsample based on an upsampling filter to a 2× resolution in vertical and 2× resolution in horizontal for a 4× total resolution upsampling,
  wherein the plurality of super resolution based reference pictures comprises 4 super resolution based reference pictures,
  wherein to blend the motion compensated super resolution reference frame and the upsampled super resolution reference frame comprises the graphics processing unit being configured to copy an intra block from the upsampled super resolution reference frame, copy the skip block from the motion compensated super resolution reference frame, and generate a blended inter block of the current super resolution frame based on a first inter block from the upsampled super resolution reference frame weighted by a first weighting factor and an associated second inter block from the motion compensated super resolution reference frame weighted by a second weighting factor, wherein the first weighting factor and the second weighting factor are based at least in part on a number of coefficients and a reference frame associated with the first and second inter blocks, wherein the first and second inter blocks are 4×4 blocks, wherein the number of coefficients comprises 4 or more coefficients and the first weighting factor is 4 and the second weighting factor is 0, wherein the number of coefficients comprises 0 coefficients, the reference frame is a super resolution reference frame and the first weighting factor is 1 and the second weighting factor is 3, wherein to generate the blended inter block comprises the graphics processing unit being configured to add and normalize a multiplication of the first inter block and the first weighting factor and a multiplication of the second inter block and the second weighting factor, wherein the currently decoded frame comprises at least one of a P-picture or an B/F-picture, wherein the previously decoded video frame comprises an I-picture, and wherein the previously decoded video frame comprises at least one of a P-picture or an B/F-picture;

difference the predicted partition data with original pixel data associated with the prediction partition to generate a prediction error data partition;

partition the prediction error data partition to generate a plurality of coding partitions;

perform a forward transform on the plurality of coding partitions to generate transform coefficients associated with the plurality of coding partitions;

quantize the transform coefficients to generate quantized transform coefficients;

entropy encode the quantized transform coefficients, mode and reference data associated with the currently decoded frame, and second quantized transform coefficients associated with the currently decoded frame into a bitstream, wherein the mode and reference data comprises indicators indicating the intra block, the skip block, the first and second inter block, and the reference frame; and transmit the bitstream.

21. A decoder system comprising:
a video decoder configured to decode an encoded bitstream, wherein the video decoder is configured to:
motion compensate a previously generated super resolution frame to generate a motion compensated super resolution reference frame;
upsample a currently decoded frame to generate an upsampled super resolution reference frame;
blend the motion compensated super resolution reference frame and the upsampled super resolution reference frame to generate a current super resolution frame, wherein the blending is based at least in part on one or more weighting factors associated with one or more blending factors, wherein such blending factors include one or more of the following coding parameters: block prediction/coding mode, prediction reference, and/or number of transform coefficients, wherein blending the motion compensated super resolution reference frame and the upsampled super resolution reference frame comprises copying a skip block from the motion compensated super resolution reference frame;
de-interleave the current super resolution frame to provide a plurality of super resolution based reference pictures for motion estimation of a next frame; and
store the plurality of super resolution based reference pictures.

22. The decoder system of claim 21, wherein the video decoder is further configured to:

receive the bitstream;
entropy decode the bitstream to determine motion vectors associated with the currently decoded frame, motion data associated with the next frame, first quantized transform coefficients associated with the next frame, mode and reference data associated with the currently decoded frame, and second quantized transform coefficients associated with the currently decoded frame, wherein the mode and reference data comprises indicators indicating an intra block, a skip block, a first and second inter block, and a reference frame;
perform an inverse quantization based at least in part on the first quantized transform coefficients to generate decoded transform coefficients;
perform an inverse transform based at least in part on the decoded transform coefficients to generate a plurality of decoded coding partitions;
assemble the plurality of decoded coding partitions to generate a decoded prediction error data partition;
upsample a previously decoded video frame to generate the previously generated super resolution frame;
map, prior to motion compensating the previously generated super resolution frame, the motion vectors associated with the currently decoded frame to generate super resolution motion vectors for motion compensating the previously generated super resolution frame;
perform motion compensation based at least in part on the motion data and at least one of the plurality of super resolution based reference pictures to generate a first decoded predicted partition;
add the decoded predicted partition data to the first decoded predicted partition to generate a first reconstructed prediction partition;
assemble the first reconstructed prediction partition and a second reconstructed prediction partition to generate at least one of a first tile or a first super-fragment;
apply at least one of a deblock filtering or a quality restoration filtering to the first tile or the first super-fragment to generate a first final decoded tile or super-fragment;
assemble the first final decoded tile or super-fragment and a second final decoded tile or super-fragment to generate a decoded video frame; and
transmit the decoded video frame for presentment via a display device,
wherein to upsample the currently decoded frame comprises the video decoder being configured to upsample based on an upsampling filter to a 2× resolution in vertical and 2× resolution in horizontal for a 4× total resolution upsampling,
wherein the plurality of super resolution based reference pictures comprises 4 super resolution based reference pictures,
wherein to blend the motion compensated super resolution reference frame and the upsampled super resolution reference frame comprises the video decoder being configured to copy an intra block from the upsampled super resolution reference frame, copy the skip block from the motion compensated super resolution reference frame, and generate a blended inter block of the current super resolution frame based on a first inter block from the upsampled super resolution reference frame weighted by a first weighting factor and an associated second inter block from the motion compensated super resolution reference frame weighted by a second weighting factor, wherein the first weighting factor and the second weighting factor are based at least in part on a number of coefficients and a reference frame associated with the first and second inter blocks, wherein the first and second inter blocks are 4×4 blocks, wherein the number of coefficients comprises 4 or more coefficients and the first weighting factor is 4 and the second weighting factor is 0, wherein the number of coefficients comprises 0 coefficients, the reference frame is a super resolution reference frame and the first weighting factor is 1 and the second weighting factor is 3, wherein to generate the blended inter block comprises the video decoder being configured to add and normalize a multiplication of the first inter block and the first weighting factor and a multiplication of the second inter block and the second weighting factor, wherein the currently decoded frame comprises at least one of a P-picture or an B/F-picture, wherein the previously decoded video frame comprises an I-picture, and wherein the previously decoded video frame comprises at least one of a P-picture or an B/F-picture.

23. At least one non-transitory machine readable medium comprising a plurality of instructions that in response to being executed on a computing device, cause the computing device to:

motion compensate, via a motion compensated filtering predictor module, a previously generated super resolution frame to generate a motion compensated super resolution reference frame;

upsample, via a synthesizing analyzer and synthesized picture generation and buffer module, a currently decoded frame to generate an upsampled super resolution reference frame;

blend, via the synthesizing analyzer and synthesized picture generation and buffer module, the motion compensated super resolution reference frame and the upsampled super resolution reference frame to generate a current super resolution frame, wherein the blending is based at least in part on one or more weighting factors associated with one or more blending factors used in blending process to combine an upsampled intra block and a motion compensated prediction block, wherein such blending factors include one or more of the following coding parameters: block prediction/coding mode, prediction reference, and/or number of transform coefficients, wherein blending the motion compensated super resolution reference frame and the upsampled super resolution reference frame comprises copying a skip block from the motion compensated super resolution reference frame;

de-interleave, via the synthesizing analyzer and synthesized picture generation and buffer module, the current super resolution frame to provide a plurality of super resolution based reference pictures for motion estimation of a next frame; and store, via the synthesizing analyzer and synthesized picture generation and buffer module, the plurality of super resolution based reference pictures.

24. The non-transitory machine readable medium of claim 23, further comprising instructions that in response to being executed on the computing device, cause the computing device to:

upsample, via the synthesizing analyzer and synthesized picture generation and buffer module, a previously decoded video frame to generate the previously generated super resolution frame;

map, via a motion vector mapper and prior to motion compensating the previously generated super resolution frame, motion vectors associated with the currently decoded frame and the previously generated super resolution frame to generate super resolution motion vectors for motion compensating the previously generated super resolution frame;

generate, via the motion estimator module, motion data associated with a prediction partition of the next frame based at least in part one or more of the plurality of super resolution based reference pictures;

perform, via the motion compensated filtering predictor module, motion compensation based at least in part on the motion data and the one or more of the plurality of super resolution based reference pictures to generate predicted partition data for the prediction partition, wherein performing the motion compensation comprises filtering a portion of the one or more of the plurality of super resolution based reference pictures using a motion compensation prediction selected from quarter pel precision or eighth pel precision, wherein upsampling the currently decoded frame comprises upsampling using an upsampling filter to a 2× resolution in vertical and 2× resolution in horizontal for a 4× total resolution upsampling, wherein the plurality of super resolution based reference pictures comprises 4 super resolution based reference pictures, wherein blending the motion compensated super resolution reference frame and the upsampled super resolution reference frame comprises copying an intra block from the upsampled super resolution reference frame, copying the skip block from the motion compensated super resolution reference frame, and generating a blended inter block of the current super resolution frame by blending a first inter block from the upsampled super resolution reference frame weighted by a first weighting factor and an associated second inter block from the motion compensated super resolution reference frame weighted by a second weighting factor, wherein the first weighting factor and the second weighting factor are based at least in part on a number of coefficients and a reference frame associated with the first and second inter blocks, wherein the first and second inter blocks are 4×4 blocks, wherein the number of coefficients comprises 4 or more coefficients and the first weighting factor is 4 and the second weighting factor is 0, wherein the number of coefficients comprises 0 coefficients, the reference frame is a super resolution reference frame and the first weighting factor is 1 and the second weighting factor is 3, wherein generating the blended inter block comprises adding and normalizing a multiplication of the first inter block and the first weighting factor and a multiplication of the second inter block and the second weighting factor, wherein the currently decoded frame comprises at least one of a P-picture or an B/F-picture, wherein the previously decoded video frame comprises an I-picture, and wherein the previously decoded video frame comprises at least one of a P-picture or an B/F-picture;

difference, via a differencer, the predicted partition data with original pixel data associated with the prediction partition to generate a prediction error data partition;

partition, via a coding partitions generator, the prediction error data partition to generate a plurality of coding partitions;

perform, via an adaptive transform module, a forward transform on the plurality of coding partitions to generate transform coefficients associated with the plurality of coding partitions;

quantize, via an adaptive quantize module, the transform coefficients to generate quantized transform coefficients;

entropy encode, via an adaptive entropy encoder, the quantized transform coefficients, mode and reference data associated with the currently decoded frame, and second quantized transform coefficients associated with the currently decoded frame into a bitstream, wherein the mode and reference data comprises indicators indicating the intra block, the skip block, the first and second inter block, and the reference frame; and transmit the bitstream.

* * * * *